US012756891B2

(12) United States Patent
Yang et al.

(10) Patent No.: US 12,756,891 B2
(45) Date of Patent: Oct. 6, 2026

(54) DATA CACHING METHOD AND ELECTRONIC DEVICE

(71) Applicant: Huawei Technologies Co., Ltd., Shenzhen (CN)

(72) Inventors: Rui Yang, Beijing (CN); Fenghui Dou, Beijing (CN); Hui Jin, Shenzhen (CN); Haiquan Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/180,967

(22) Filed: Mar. 9, 2023

(65) Prior Publication Data

US 2023/0232065 A1 Jul. 20, 2023

Related U.S. Application Data

(63) Continuation of application No. PCT/CN2021/116165, filed on Sep. 2, 2021.

(30) Foreign Application Priority Data

Sep. 10, 2020 (CN) ......................... 202010950649.5

(51) Int. Cl.

*H04N 21/433* (2011.01)
*H04N 21/4402* (2011.01)
*H04N 21/442* (2011.01)

(52) U.S. Cl.

CPC ................... *H04N 21/4331* (2013.01); *H04N 21/440281* (2013.01); *H04N 21/44209* (2013.01)

(58) Field of Classification Search

CPC ....... H04N 21/4331; H04N 21/440281; H04N 21/44209

See application file for complete search history.

(56) References Cited

U.S. PATENT DOCUMENTS

| | | | | |
|---|---|---|---|---|
| 10,405,017 | B1 * | 9/2019 | Roka | H04N 21/25841 |
| 2009/0143078 | A1 * | 6/2009 | Tu | G01S 5/02524 455/456.3 |
| 2015/0312301 | A1 | 10/2015 | Dasher et al. | |
| 2016/0065995 | A1 | 3/2016 | Phillips | |

(Continued)

FOREIGN PATENT DOCUMENTS

| | | | |
|---|---|---|---|
| CN | 102257868 | A | 11/2011 |
| CN | 104583963 | A | 4/2015 |

(Continued)

*Primary Examiner* — Joshua D Taylor
(74) *Attorney, Agent, or Firm* — Slater Matsil, LLP

(57) ABSTRACT

A method includes: running the target application, and caching data of the target application based on a first cache policy, where the first cache policy may include downloading the data of the target application at a first download rate. The target application receives first indication information sent by the control component, where the first indication information is used to indicate that an abnormal area exists in a forward direction of the electronic device. After receiving the first indication information, the target application caches data of the target application based on a second cache policy, where the second cache policy may include downloading the data of the target application at a second download rate, where the second download rate is greater than the first download rate.

20 Claims, 25 Drawing Sheets

(56) References Cited

U.S. PATENT DOCUMENTS

| | | | | |
|---|---|---|---|---|
| 2017/0188331 | A1* | 6/2017 | Rao | H04L 65/80 |
| 2019/0075541 | A1* | 3/2019 | Schrader | H04W 64/003 |
| 2019/0342419 | A1 | 11/2019 | Bromand et al. | |
| 2020/0005211 | A1* | 1/2020 | Tsuji | A61B 5/1112 |
| 2020/0213384 | A1* | 7/2020 | Rasool | H04L 67/04 |

FOREIGN PATENT DOCUMENTS

| | | | |
|---|---|---|---|
| JP | 2011128700 | A | 6/2011 |
| JP | 2018522441 | A | 8/2018 |
| JP | 2018523383 | A | 8/2018 |

* cited by examiner

Electronic device 100

Electronic device 100

Electronic device 100

Electronic device 100

DATA CACHING METHOD AND ELECTRONIC DEVICE

CROSS-REFERENCE TO RELATED APPLICATIONS

This application is a continuation of International Application No. PCT/CN2021/116165, filed on Sep. 2, 2021, which claims priority to Chinese Patent Application No. 202010950649.5, filed on Sep. 10, 2020. The disclosures of the aforementioned applications are hereby incorporated by reference in their entireties.

TECHNICAL FIELD

This application relates to the field of electronic device technologies, and in particular, to a data caching method and an electronic device.

BACKGROUND

Use of an online application, such as an audio application, or a video application, usually requires a good network environment. However, currently, there are still a plurality of abnormal areas with weak network coverage and even no network coverage, and when a user passes through the abnormal areas, a network service of an electronic device is abnormal. For example, the user may pass through a plurality of cells that provide network services for the user on a daily commute route. When passing through some cells with good network quality, the user can normally use the online application such as an audio application, a video application, or a learning application. However, when passing through some cells with poor network quality, the user cannot normally use the online application (for example, frame freezing occurs during audio and video playing), which affects user experience.

SUMMARY

Embodiments of this application disclose a data caching method and an electronic device, to avoid a case in which a user cannot normally use an online application such as an audio application or a video application when passing through an area in which a network service is abnormal, and improve user experience.

According to a first aspect, an embodiment of this application provides a data caching method, applied to an electronic device. The electronic device includes a target application and a control component, and the method includes: The electronic device runs the target application, and caches data of the target application based on a first cache policy, where the first cache policy includes at least one of the following: downloading the data of the target application at a first download rate; downloading the data of the target application at a first bit rate; downloading the data of the target application at a first resolution; downloading the data of the target application at a first frame rate; requesting the data of the target application by using a first quantity of request times, where the first quantity of request times is a quantity of request times in a unit time; caching first-type data and second-type data, where the first type is different from the second type; downloading the data of the target application at a first sampling frequency, downloading the data of the target application by using a first quantity of sampling bits; and downloading the data of the target application by using a first quantity of sound channels. The target application receives first indication information sent by the control component. The target application caches data of the target application based on a second cache policy after receiving the first indication information, where the second cache policy includes at least one of the following: downloading the data of the target application at a second download rate, where the second download rate is greater than the first download rate; downloading the data of the target application at a second bit rate, where the second bit rate is less than the first bit rate; downloading the data of the target application at a second resolution, where the second resolution is less than the first resolution; downloading the data of the target application in a second frame rate, where the second frame rate is less than the first frame rate; requesting the data of the target application by using a second quantity of request times, where the second quantity of request times is a quantity of request times in a unit time, and the second quantity of request times is greater than the first quantity of request times, caching the first-type data and skipping caching the second-type data; downloading the data of the target application at a second sampling frequency, where the second sampling frequency is less than the first sampling frequency; downloading the data of the target application by using a second quantity of sampling bits, where the second quantity of sampling bits is less than the first quantity of sampling bits; and downloading the data of the target application by using a second quantity of sound channels, where the second quantity of sound channels is less than the first quantity of sound channels.

The first indication information is used to indicate that an abnormal area exists in a forward direction of the electronic device, and the abnormal area is at least one of the following areas: an area whose signal quality is lower than a preset threshold; a network-disconnected area; a standard falling area, where the standard falling is changing from a first network standard to a second network standard lower than the first network standard; and an area whose quality of experience QoE is lower than a first QoE level.

In this embodiment of this application, the target application caches the data of the target application based on different cache policies before and after receiving the first indication information. Use duration of an amount of data downloaded in a unit time based on the first cache policy before the first indication information is received is less than use duration of an amount of data downloaded in a unit time based on the second cache policy after the first indication information is received. In other words, after receiving the first indication information used to indicate that the abnormal area exists in the forward direction, the target application caches the data based on the second cache policy, so as to increase use duration of the amount of the data downloaded in the unit time, so that the user can normally use the target application as much as possible when passing through the abnormal area. This avoids service freezing and improves user experience.

In a possible implementation, before the target application receives first indication information sent by the control component, the method further includes: The target application sends a registration message to the control component, where the registration message is used to obtain the first indication information, the first indication information is used to indicate that an abnormal area exists in a forward direction of the electronic device, and the abnormal area is at least one of the following areas: an area whose signal quality is lower than a preset threshold; a network-disconnected area; a standard falling area, where the standard falling is changing from a first network standard to a second network standard lower than the first network standard; and an area whose quality of experience QoE is lower than a first QoE level.

In this embodiment of this application, the target application that receives the first indication information and caches the data based on the second cache policy is an application that sends the registration message to the control component. Therefore, the target application can autonomously choose whether to receive the first indication information and cache the data based on the second cache policy. This greatly improves implementation flexibility.

In a possible implementation, a first location exists between the abnormal area and a current location, no other cell exists between the current location and the first location, and the first location is a location at which the control component sends the first indication information, or the abnormal area is an area whose distance from the current location is within a first distance range.

In this embodiment of this application, the first location still exists between the current location and the abnormal area, and a distance between the current location and the abnormal area is not excessively short. Therefore, duration (namely, duration from the first location to the abnormal area) for caching the data by the target application based on the second cache policy is not excessively short (for example, the duration is not 0). More data is downloaded, so that the target application can be used appropriately when the abnormal area is passed through. This avoids service freezing and improves user experience.

In a possible implementation, the method further includes: The control component sends the first indication information to the target application when duration in which the electronic device enters the abnormal area from the current location falls within a first preset time range.

In this embodiment of this application, the duration for which the target application caches the data based on the second cache policy is within the first preset time range. The duration for which the target application caches the data based on the second cache policy can be controlled by controlling the first preset time range. The first preset time range can be determined according to a requirement. For example, when power is low, the first preset time range can be decreased, to avoid a case in which power consumption is excessively high because the target application downloads the data at the second download rate, for example, when duration of the abnormal area is long, the first preset time range can be increased, so that the target application can be normally used as much as possible when the abnormal area is passed through. This avoids service freezing and improves user experience.

In a possible implementation, that the target application sends a registration message to the control component includes: The target application sends the registration information to the control component when detecting that the target application is switched from background running to foreground running or is started.

In this embodiment of this application, the target application can send the registration message to the control component when the target application is used, so that the control component sends the first indication information only when the target application is used. This can avoid a case in which user experience is affected due to fast power consumption, poor definition of watched content, and incomplete watched content caused because the target application caches the data based on the second cache policy when the target application is not used.

In a possible implementation, the method further includes: obtaining current cell information of the electronic device; determining, in a data file of the abnormal area, whether an abnormal area record corresponding to the current cell information exists; and when the abnormal area exists, the control component generates the first indication information; or obtaining current location information of the electronic device; determining, in a data file of the abnormal area, whether an abnormal area record corresponding to the current location information exists; and when the abnormal area exists, the control component generates the first indication information; or obtaining the current cell information and the current location information of the electronic device; determining, in a data file of the abnormal area, whether an abnormal area record corresponding to the current cell information and the current location information exists; and when the abnormal area exists, the control component generates the first indication information.

In a possible implementation, the method further includes: determining whether an abnormal area record corresponding to the current cell information exists in a data file of the abnormal area; and the control component generates the first indication information when the abnormal area record exists, where the current location information is used to determine a moment for sending the first indication information.

In this embodiment of this application, there are various manners of generating the first indication information. For example, when the current location information cannot be obtained, the electronic device can obtain the current cell information to determine whether to generate the first indication information. This is applicable to a plurality of scenarios, and has good availability.

In a possible implementation, the method further includes: obtaining information about a cell that the electronic device passes through; when detecting a service abnormality notification event, determining, in the information about the cell that the electronic device passes through, whether the electronic device passes through at least one cell before a second preset time range; and adding a first abnormal area record to the data file of the abnormal area or updating a second abnormal area record in the data file of the abnormal area if the electronic device passes through the at least one cell, where the first abnormal area record or the second abnormal area record includes information about the at least one cell, and the service abnormality notification event is used to indicate at least one piece of the following information: signal quality is lower than a preset threshold, a network is disconnected, a first network standard is changed to a second network standard lower than the first network standard, and QoE is lower than a first QoE level; or when detecting the service abnormality notification event, obtaining location information of the electronic device, and adding a third abnormal area record to the data file of the abnormal area, or updating a fourth abnormal area record in the data file of the abnormal area, where location information in the third abnormal area record or the fourth abnormal area record is obtained based on the location information of the electronic device.

In this embodiment of this application, the data file of the abnormal area is used to generate the first indication information, that is, used to determine whether the abnormal area exists in the forward direction. The electronic device can update the data file of the abnormal area based on the currently obtained information when detecting the service abnormality notification event. A data source in the data file of the abnormal area used to generate the first indication information is authentic, reliable, timely, and effective. This greatly improves accuracy of determining whether the abnormal area exists, tries to avoid a case in which data is cached based on the second cache policy when no abnormal area exists or no abnormal area is detected when the abnormal area exists, and improves user experience.

In a possible implementation, the adding a first abnormal area record to the data file of the abnormal area or updating a second abnormal area record in the data file of the abnormal area if the electronic device passes through the at least one cell includes: if the electronic device passes through the at least one cell, obtaining the location information of the electronic device, and adding the first abnormal area record to the data file of the abnormal area, or updating the second abnormal area record in the data file of the abnormal area, where the first abnormal area record or the second abnormal area record includes the information about the at least one cell, and location information in the first abnormal area record or the second abnormal area record is obtained based on the location information of the electronic device.

In this embodiment of this application, the abnormal area record in the data file of the abnormal area not only can be obtained by updating the cell information, but also can be obtained based on the location information. For an area whose location information can be obtained, the electronic device can generate the first indication information based on real-time location information and the location information recorded in the abnormal area in the data file of the abnormal area. This improves accuracy of determining whether the abnormal area exists, tries to avoid the case in which data is cached based on the second cache policy when no abnormal area exists or no abnormal area is detected when the abnormal area exists, and improves user experience.

In a possible implementation, the adding a first abnormal area record to the data file of the abnormal area or updating a second abnormal area record in the data file of the abnormal area if the electronic device passes through the at least one cell includes: if the electronic device passes through the at least one cell, obtaining at least one piece of the following information: time of entering the abnormal area, time of leaving the abnormal area, and duration of the abnormal area; and adding the first abnormal area record to the data file of the abnormal area, or updating the second abnormal area record in the data file of the abnormal area, where time of entering an abnormal area in the first abnormal area record or the second abnormal area record is obtained based on the time of entering the abnormal area, or time of leaving an abnormal area in the first abnormal area record or the second abnormal area record is obtained based on the time of leaving the abnormal area, or duration of an abnormal area in the first abnormal area record or the second abnormal area record is obtained based on the duration of the abnormal area.

In this embodiment of this application, the abnormal area record in the data file of the abnormal area can further include historically recorded information such as time of entering the abnormal area, time of leaving the abnormal area, and duration of the abnormal area. For both generating the first indication information and sending the first indication information by the control component, refer to the foregoing information in the database file of the abnormal area, so as to assist in determining the time of actually entering the abnormal area, the time of actually leaving the abnormal area, and the duration of the abnormal area. This improves accuracy of determining whether the abnormal area exists, tries to avoid the case in which the data is cached based on the second cache policy when no abnormal area exists or no abnormal area is detected when the abnormal area exists, and improves user experience.

In a possible implementation, after the caching data of the target application based on a second cache policy after the target application receives the first indication information, the method further includes: when being in an abnormal area, the electronic device uses at least one of the following manners: downloading the data of the target application at a third download rate, where the third download rate is less than the first download rate; downloading the data of the target application at a third bit rate, where the third bit rate is less than or equal to the second bit rate; downloading the data of the target application at a third resolution, where the third resolution is less than or equal to the second resolution; downloading the data of the target application at a third frame rate, where the third frame rate is less than or equal to the second frame rate; and requesting the data of the target application by using a third quantity of request times, where the third quantity of request times is a quantity of request times in a unit time, and the third quantity of request times is less than or equal to the first quantity of request times; and caching the data of the target application based on the first cache policy after leaving the abnormal area.

In this embodiment of this application, when the electronic device is in the abnormal area, the target application can further reduce parameters such as a resolution, a bit rate, and a frame rate for downloading the data, to increase use duration of data downloaded in a unit time, so that the user can also use the target application in the abnormal area as much as possible. When the electronic device leaves the abnormal area, the data of the target application is recovered to be cached based on the first cache policy, so that the user can continue to normally use the target application.

In a possible implementation, the caching data of the target application based on a first cache policy includes: stopping caching the data of the target application when playing duration of an amount of the data of the target application that is cached based on the first cache policy is greater than first preset duration; and the caching data of the target application based on a second cache policy includes: continuing caching the data of the target application when playing duration of an amount of the data of the target application that is cached based on the second cache policy is greater than the first preset duration.

In this embodiment of this application, within same duration, use duration of the data cached by the target application based on the first cache policy is less than use duration of the data cached by the target application based on the second cache policy. Therefore, when the abnormal area exists in the forward direction, the target application caches the data based on the second cache policy, so that duration for using the target application when the user passes through the abnormal area can be longer. This avoids service freezing as much as possible and improves user experience.

In a possible implementation, the caching data of the target application based on a second cache policy after the target application receives the first indication information includes: caching the data of the target application based on the second cache policy in response to receiving the first indication information; and/or starting, within second preset duration in which the first indication information is received, the step of caching data of the target application based on a second cache policy, where the second preset duration is less than 1 second.

In this embodiment of this application, after receiving the first indication information, the target application caches the data of the target application in short time based on the second cache policy, so that use duration of the data cached before the abnormal area is entered is as long as possible, so that duration for using the target application when the user passes through the abnormal area is longer. This avoids service freezing as much as possible and improves user experience.

In a possible implementation, the first indication information further includes first time information, where the first time information is used to indicate time of entering an abnormal area; and/or the first indication information further includes second time information, where the second time information is used to indicate time of leaving the abnormal area; and/or the first indication information further includes third time information, where the third time information is used to indicate duration of the abnormal area.

In this embodiment of this application, the first indication information can further include the detailed time of entering the abnormal area, time of leaving the abnormal area, or duration of the abnormal area. The target application can select the second cache policy based on the first indication information, for example, when the duration of the abnormal area is long, the second download rate can be a little higher to download more data. This greatly improves implementation flexibility and has high availability.

In a possible implementation, the caching data of the target application based on a second cache policy after the target application receives the first indication information includes: after receiving the first indication information, the target application caches, based on the second cache policy, the data of the target application whose playing duration is third preset duration, where the third preset duration is duration obtained based on the first time information and the second time information, or the third preset duration is duration indicated by the third duration information.

In this embodiment of this application, the playing duration of the data downloaded by the target application before the target application enters the abnormal area can be equal to the duration of the abnormal area. This ensures that the target application can be normally used when the user passes through the abnormal area.

In a possible implementation, the target application is a video application, and the second cache policy includes at least one of the following: downloading the data of the target application at the second download rate; downloading the data of the target application at the second bit rate; downloading the data of the target application at the second resolution; downloading the data of the target application at the second frame rate; and requesting the data of the target application by using the second quantity of request times; or the target application is an audio application, and the second cache policy includes at least one of the following: downloading the data of the target application at the second download rate; requesting the data of the target application by using the second quantity of request times, downloading the data of the target application at the second sampling frequency; downloading the data of the target application by using the second quantity of sampling bits, and downloading the data of the target application by using the second quantity of sound channels.

This embodiment of this application is applied to different target applications, for example, the video application and the audio application. For different applications, second cache policies can be different. Therefore, application scenarios are wider, and availability is high.

According to a second aspect, an embodiment of this application provides a chip. The chip includes at least one processor and an interface circuit. Optionally, the chip further includes a memory. The memory, the interface circuit, and the at least one processor are interconnected through a line, and the memory stores a computer program. When the computer program is executed by the at least one processor, the following is implemented: receiving a registration message sent by a target application, where the registration message is used to register a first notification event; generating first indication information, where the first indication information is used to indicate that an abnormal area exists in a forward direction of the chip, and the abnormal area is at least one of the following areas: an area whose signal quality is lower than a preset threshold, a network-disconnected area, a standard falling area, and an area whose quality of experience QoE is lower than a first QoE level, where the standard falling is changing from a first network standard to a second network standard lower than the first network standard; and sending the first indication information to the target application on which the first notification event is registered.

In this embodiment of this application, the chip can send the first indication information to the target application on which the first notification time is registered, where the first indication information is used to indicate that the abnormal area exists in the forward direction, so that the target application can perform a corresponding action based on the first indication information, for example, increase a download rate, and the user can normally use the target application as much as possible when passing through the abnormal area. This avoids service freezing and improves user experience.

In a possible implementation, when generating first indication information, the chip specifically implements the following step: obtaining current cell information, determining, in a data file of the abnormal area, whether an abnormal area record corresponding to the current cell information exists, and when the abnormal area exists, generating, by a control component, the first indication information; or obtaining current location information; determining, in the data file of the abnormal area, whether an abnormal area record corresponding to the current location information exists, and when the abnormal area exists, generating, by the control component, the first indication information; or obtaining the current cell information and the current location information, determining, in the data file of the abnormal area, whether an abnormal area record corresponding to the current cell information and the current location information exists, and when the abnormal area exists, generating, by the control component, the first indication information.

In a possible implementation, when generating first indication information, the chip specifically implements the following steps: obtaining current cell information and current location information of the chip; determining whether an abnormal area record corresponding to the current cell information exists in a data file of the abnormal area; and generating, by a control component, the first indication information when the abnormal area record exists, where the current location information is used to determine a moment for sending the first indication information.

In this embodiment of this application, there are various manners of generating the first indication information. For example, when the current location information cannot be obtained, the chip can obtain the current cell information to determine whether to generate the first indication information. This is applicable to a plurality of scenarios, and has good availability.

In a possible implementation, the chip is further configured to implement the following step: obtaining information about a cell that the chip passes through, and when detecting a service abnormality notification event, determining, in the information about the cell that the chip passes through, whether the chip passes through at least one cell before a second preset time range, and adding a first abnormal area record to the data file of the abnormal area or updating a second abnormal area record in the data file of the abnormal area if the chip passes through the at least one cell, where the first abnormal area record or the second abnormal area record includes information about the at least one cell, and the service abnormality notification event is used to indicate at least one piece of the following information: signal quality is lower than a preset threshold, a network is disconnected, a first network standard is changed to a second network standard lower than the first network standard, and QoE is less than a first QoE level; or when detecting the service abnormality notification event, obtaining location information of the chip, and adding a third abnormal area record to the data file of the abnormal area, or updating a fourth abnormal are record in the data file of the abnormal area, where location information in the third abnormal area record or the fourth abnormal area record is obtained based on the location information of the chip.

In this embodiment of this application, the data file of the abnormal area is used to generate the first indication information, that is, used to determine whether the abnormal area exists in the forward direction. The chip can update the data file of the abnormal area based on the currently obtained information when detecting the service abnormality notification event. A data source in the data file of the abnormal area used to generate the first indication information is authentic, reliable, timely, and effective. This greatly improves accuracy of determining whether the abnormal area exists, tries to avoid a case in which data is cached based on the second cache policy when no abnormal area exists or no abnormal area is detected when the abnormal area exists, and improves user experience.

In a possible implementation, adding a first abnormal area record to the data file of the abnormal area or updating a second abnormal area record in the data file of the abnormal area if the chip passes through the at least one cell is specifically implemented as follows: if the chip passes through the at least one cell, obtaining the location information of the chip, and adding the first abnormal area record to the data file of the abnormal area, or updating the second abnormal area record in the data file of the abnormal area, where the first abnormal area record or the second abnormal area record includes the information about the at least one cell, and location information in the first abnormal area record or the second abnormal area record is obtained based on the location information of the chip.

In this embodiment of this application, the abnormal area record in the data file of the abnormal area not only can be obtained by updating the cell information, but also can be obtained based on the location information. For an area whose location information can be obtained, the chip can generate the first indication information based on real-time location information and the location information recorded in the abnormal area in the data file of the abnormal area. This improves accuracy of determining whether the abnormal area exists, tries to avoid the case in which data is cached based on the second cache policy when no abnormal area exists or no abnormal area is detected when the abnormal area exists, and improves user experience.

In a possible implementation, adding a first abnormal area record to the data file of the abnormal area or updating a second abnormal area record in the data file of the abnormal area if the chip passes through the at least one cell is specifically implemented as follows: if the chip passes through the at least one cell, obtaining at least one piece of the following information: time of entering the abnormal area, time of leaving the abnormal area, and duration of the abnormal area; and adding the first abnormal area record to the data file of the abnormal area, or updating the second abnormal area record in the data file of the abnormal area, where time of entering an abnormal area in the first abnormal area record or the second abnormal area record is obtained based on the time of entering the abnormal area, or time of leaving an abnormal area in the first abnormal area record or the second abnormal area record is obtained based on the time of leaving the abnormal area, or duration of an abnormal area in the first abnormal area record or the second abnormal area record is obtained based on the duration of the abnormal area.

In this embodiment of this application, the abnormal area record in the data file of the abnormal area can further include historically recorded information such as time of entering the abnormal area, time of leaving the abnormal area, and duration of the abnormal area. For both generating the first indication information and sending the first indication information by the control component, refer to the foregoing information in the database file of the abnormal area, so as to assist in determining the time of actually entering the abnormal area, the time of actually leaving the abnormal area, and the duration of the abnormal area. This improves accuracy of determining whether the abnormal area exists, tries to avoid the case in which data is cached based on the second cache policy when no abnormal area exists or no abnormal area is detected when the abnormal area exists, and improves user experience.

In a possible implementation, the chip is further configured to implement the following step: receiving a deregistration message sent by the target application, where the deregistration message is used to cancel registration of the first notification event.

In this embodiment of this application, the target application can send the deregistration message to the chip when the target application does not need to obtain the first indication information. In other words, the target application can autonomously choose whether to receive the first indication information. This greatly improves implementation flexibility.

According to a third aspect, an embodiment of this application provides an electronic device, including a transceiver, a processor, and a memory. The memory is configured to store computer program code, the computer program code includes computer instructions, and the processor invokes the computer instructions, so that the foregoing user equipment performs the data caching method provided in any one of the first aspect or the implementations of the first aspect in embodiments of this application.

According to a fourth aspect, an embodiment of this application provides a computer storage medium. The computer storage medium stores a computer program, the computer program includes program instructions, and when the program instructions are executed by a processor, the data caching method provided in any one of the first aspect or the implementations of the first aspect in embodiments of this application is performed.

According to a fifth aspect, an embodiment of this application provides a computer program product. When the computer program product runs on a communication device, the communication device is enabled to perform the data caching method provided in any one of the first aspect or the implementations of the first aspect in embodiments of this application.

According to a sixth aspect, an embodiment of this application provides an electronic device. The electronic device includes the method or apparatus for performing any embodiment of this application. The electronic device is, for example, a chip.

It may be understood that the electronic device provided in the third aspect, the computer storage medium provided in the fourth aspect, the computer program product provided in the fifth aspect, and the electronic device provided in the sixth aspect are all configured to perform the data caching method provided in the first aspect. Therefore, for beneficial effects that can be achieved, refer to beneficial effects in the data caching method provided in the first aspect. Details are not described herein again.

BRIEF DESCRIPTION OF THE DRAWINGS

The following describes the accompanying drawings used in embodiments of this application.

DETAILED DESCRIPTION OF ILLUSTRATIVE EMBODIMENTS

The technical solutions according to embodiments of this application are clearly and completely described in the following with reference to the accompanying drawings. Terms used in implementations of embodiments of this application are merely used to explain specific embodiments of this application, and are not intended to limit this application.

The following describes an application scenario in which a user passes through an abnormal area on a route to a company. The abnormal area is an area in which signal quality is lower than a preset threshold. When the user passes through the abnormal area, there is a high probability that a network service abnormality occurs on an electronic device used by the user. The network service abnormality may include but is not limited to: no network signal (namely, network disconnection), falling to a lower network standard (for example, falling from a 5th-generation mobile (5G) communication technology to a 3rd-generation (3G) mobile communication technology), signal quality is poor, and application experience quality is poor. That signal quality is poor may be that a parameter (a signal quality parameter for short) used to represent the signal quality does not meet a preset condition. For example, a signal-to-noise ratio, reference signal received power (RSRP), or reference signal received quality (RSRQ) is less than a preset threshold, and a packet loss rate is greater than a preset threshold. That application experience quality is poor may be that, for example, quality of experience (QoE) is less than a first QoE level. A lower QoE level indicates poorer user experience. For example, there are three QoE levels: 0, 1, and 2. 0 indicates poor user experience, 1 indicates average user experience, and 2 indicates good user experience. The first QoE level is 2, and the abnormal area is an area whose QoE level is 0 or 1.

Figure 1A:
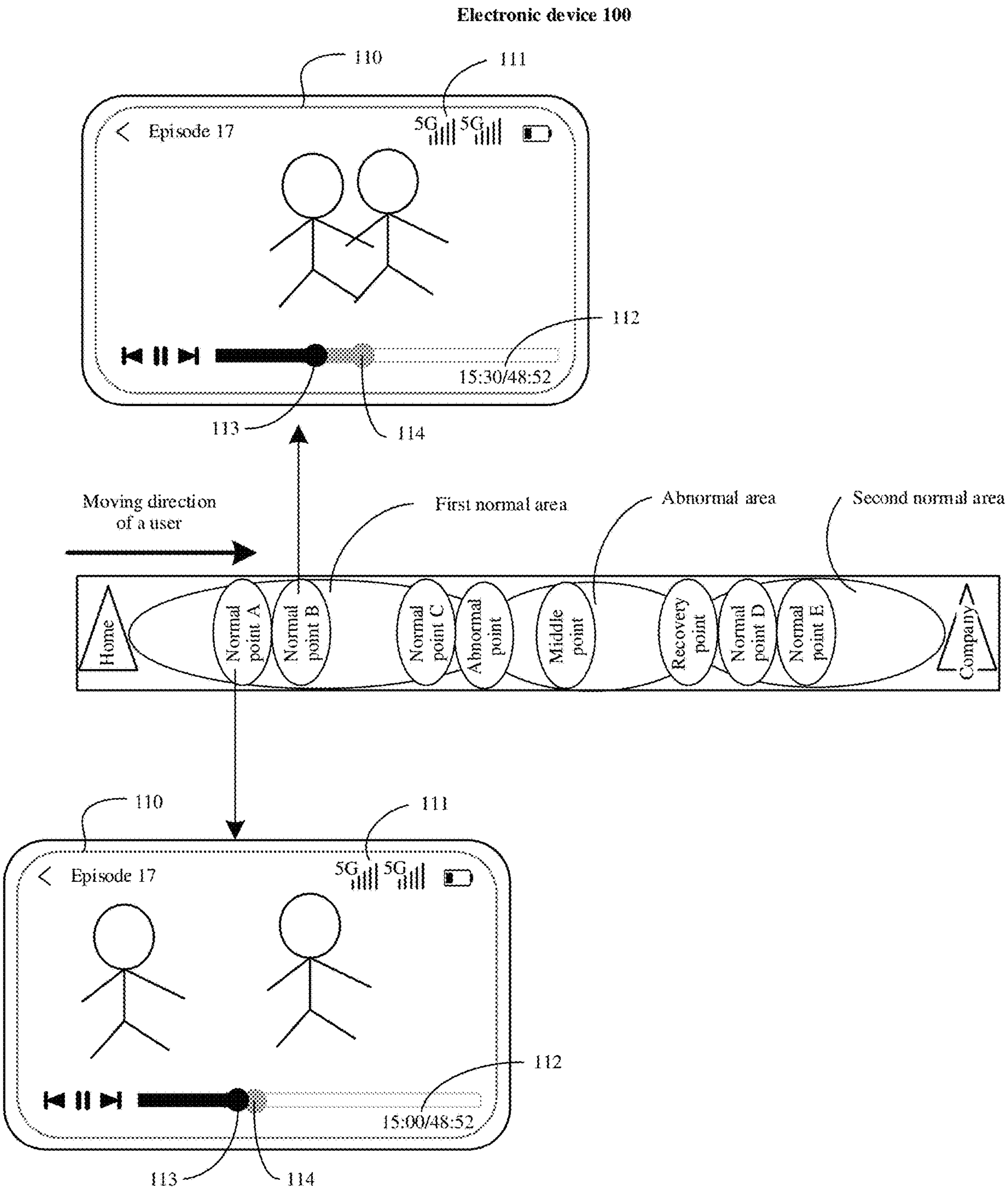
FIG. 1A to FIG. 1M are schematic diagrams of some application scenarios according to an embodiment of this application.

As shown in FIG. 1A, a user opens a video application on an electronic device 100 before leaving from home, and watches a video on the video application in a process of moving from home to a company. There are two normal areas and one abnormal area on the route to the company. A normal area may be a coverage area of a normal cell. When the user passes through the normal area, the electronic device 100 of the user may access the normal cell and can be normally used. For example, when the video application on the electronic device 100 plays a video, there is no frame freezing or short frame freezing time (for example, less than 3 seconds). An abnormal area may be a network coverage area of an abnormal cell, a weak network coverage area of a normal cell, or an area without network coverage. The abnormal cell cannot provide a normal network service for the electronic device. For example, the abnormal cell cannot provide a network for the electronic device, or can provide only a 2rd-generation telephone communication technology (2G) specification network for the electronic device. Therefore, when the user passes through the abnormal area, the electronic device 100 cannot be normally used. For example, when the video application on the electronic device 100 plays a video, freezing time is long (for example, greater than 20 seconds) or the video cannot be played.

As shown in FIG. 1A, when the user reaches a normal point A in a first normal area, the electronic device 100 may display a user interface no of the video application. The user interface no may include a signal quality identifier 111, a time identifier 112, a black dot 113, and a gray dot 114. The signal quality identifier 111 is used to represent that the electronic device 100 is currently connected to a 5G network with five signal bars (that is, full bars). In this case, signal quality is good. The time identifier 112 is “15:00/48:52”, where “48:52” is used to indicate that total duration of the video (namely, a 17th episode video) currently played by the video application is 48 minutes and 52 seconds, and “15:00” indicates that an image currently played by the video application is an image of the video at 15 minutes. Corresponding to the time identifier 112, the black dot 113 is used to indicate that the video is played to 15 minutes. The gray dot 114 is used to indicates that the video is cached to 15 minutes and 30 seconds.

The video application may cache video data based on a first cache policy when being in the normal area. The first cache policy includes at least one of the following: downloading the data of the target application at a first download rate; downloading the data of the target application at a first bit rate; downloading the data of the target application at a first resolution; downloading the data of the target application at a first frame rate; and requesting the data of the target application by using a first quantity of request times, where the first quantity of request times is a quantity of request times in a unit time. For example, when the video application caches the video data based on the first cache policy, the first download rate is downloading the video data whose playing duration is 10 seconds per second. When the playing duration of the video data downloaded by the video application is equal to first use duration (300 seconds, namely, 5 minutes), the video data is stopped caching. When the playing duration of the video data downloaded by the video application is less than or equal to second use duration (30 seconds), the video data continues to be cached, that is, video data of the first use duration is cached each time, until use duration of a remaining cache size is less than or equal to the second use duration, the video data continues to be cached.

This is not limited to the foregoing example. In specific implementation, the first use duration and the second use duration may also be other values.

As shown in FIG. 1A, when the user passes through the first normal area, the electronic device 100 accesses the 5G network with the five signal bars (namely, full bars). The signal quality is good, and the video application on the electronic device 100 caches the video data based on the first cache policy. When the user reaches the normal point A, a current cache duration in the user interface no is 15 minutes and 30 seconds, a current played duration is 15 minutes, and a difference between the two values is equal to 30 seconds. Therefore, after 30 seconds from this moment, that is, in a process in which the user moves from the normal point A to a normal point B, the first download rate is remained as downloading the video data whose duration is 10 seconds per second. Therefore, the video data of 5 minutes is downloaded within the 30 seconds. Correspondingly, the black dot 113 and the gray dot 114 in the user interface no move, and the time identifier 112 also changes. When the user reaches the normal point B, the black dot 113 in the user interface no is used to indicate that the video is played to 15 minutes and 30 seconds, and the gray dot 114 is used to indicate that the video is cached to 20 minutes and 30 seconds.

Figure 1B:
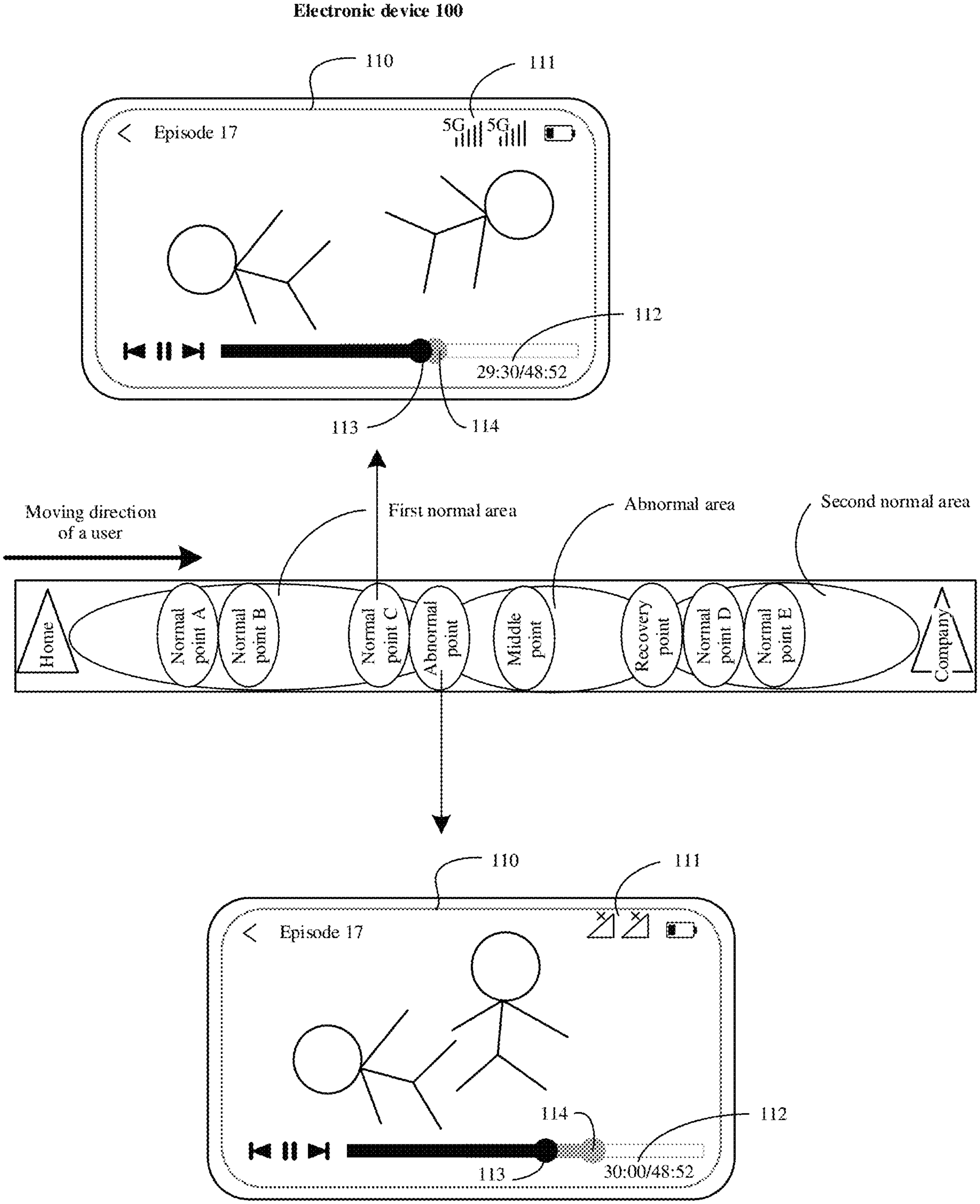

As shown in FIG. 1B, when the user continues to move from the normal point B for 14 minutes to reach a normal point C, the black dot 113 and the gray dot 114 in the user interface no move, and the time identifier 112 also changes. When the user reaches the normal point C, the black dot 113 is used to indicate that the video is played to 29 minutes and 30 seconds, and the gray dot 114 is used to indicate that the video is cached to 30 minutes. The difference between the two values is 30 seconds. Therefore, in next 30 seconds, that is, when the user moves from the normal point C to an abnormal point, the video data of 5 minutes is downloaded. When the user reaches the abnormal point, the black dot 113 in the user interface no is used to indicate that the video is played to 30 minutes, and the gray dot 114 is used to indicate that the video is cached to 35 minutes. Starting from this moment, that is, when the user passes through the abnormal area, the signal quality identifier 111 in the user interface no is used to represent that the electronic device 100 cannot access the network and is disconnected from the network. In this case, a rate of downloading the video data is 0.

Figure 1C:
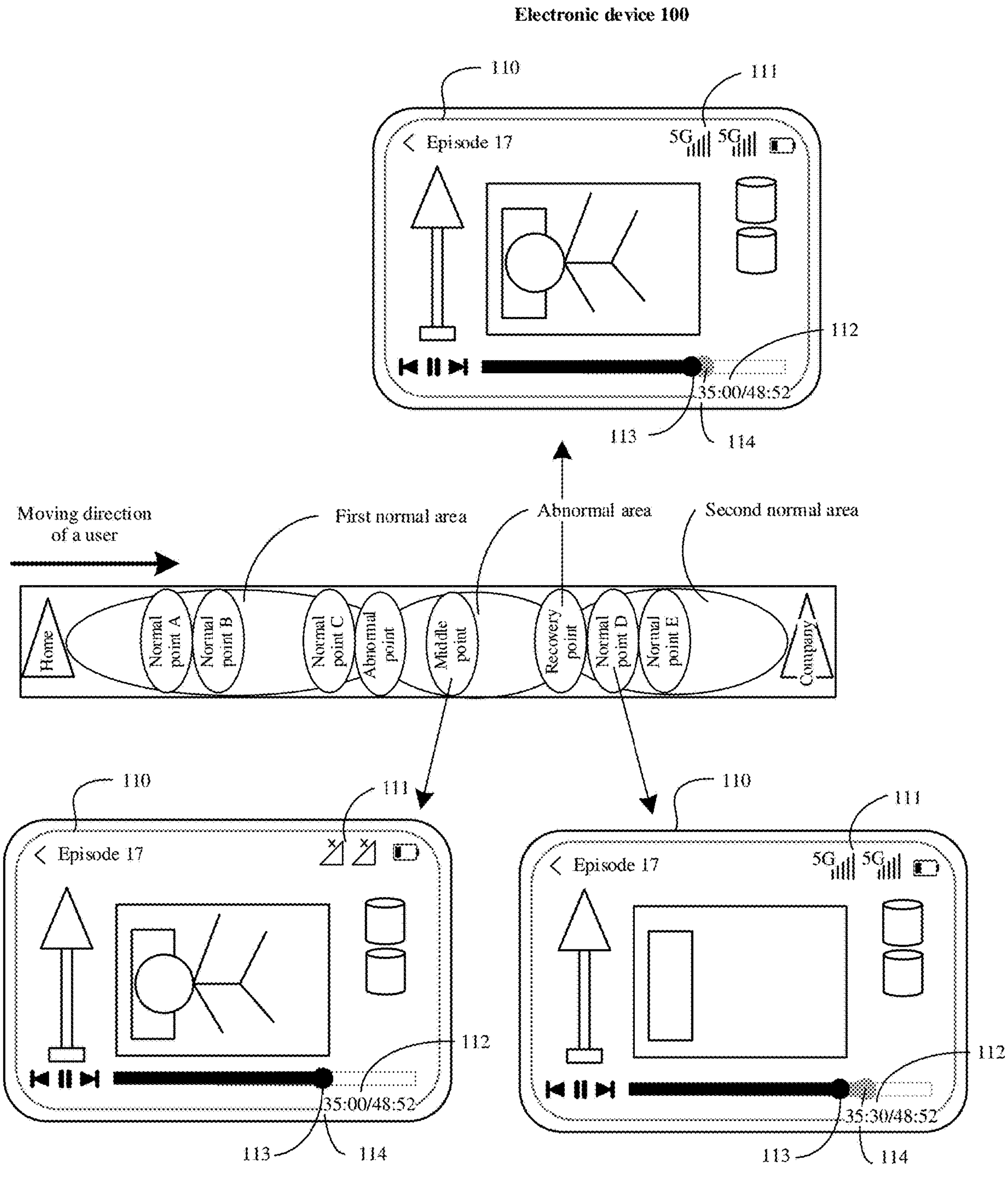

As shown in FIG. 1C, when the user continues to move from the abnormal point for 5 minutes to a middle point, the user may continue to watch the video. In this case, the black dot 113 in the user interface no moves, and the time identifier 112 also changes. However, because the download rate in the abnormal area is 0, that is, the video data cannot be downloaded, the gray dot 114 in the user interface no does not move. When the user reaches the middle point, the black dot 113 in the user interface no is used to indicate that the video is played to 35 minutes, and the gray dot 114 is still used to indicate that the video is cached to 35 minutes. In this case, the black dot 113 coincides with the gray dot 114. When the user continues to move from the middle point for 10 minutes (before reaching a recovery point), the gray dot 114 in the user interface no cannot move. Therefore, the user cannot continue to watch the video, and the black dot 113 and the time identifier 112 cannot move either.

As shown in FIG. 1C, when the user reaches the recovery point, the signal quality identifier 111 in the user interface no is used to represent that the electronic device 100 accesses the 5G network with the five signal bars (namely, full bars). The signal quality is good, therefore the video data may continue to be downloaded based on the first cache policy, and the gray dot 114 may move. In this case, the gray dot 114 may be used to indicate that the video is cached to 35 minutes and 30 seconds. Subsequently, when the user continues to move from the recovery point to the company (namely, when the user is in a second normal area), the network service is normal, the video application on the electronic device 100 may continue to work normally based on the first cache policy, and the user may also continue to watch the video on the video application. When the user arrives at a normal point D, the black dot 113 in the user interface no displayed by the electronic device 100 is used to indicate that the video is played to 35 minutes and 30 seconds.

In the foregoing abnormal area, the user cannot watch the video on the video application, resulting in poor user experience. Therefore, embodiments of this application provide a data caching method. The method is applied to an electronic device, or is applied to a chip or a processing system in the electronic device, for example, Huawei mobile services (HMS) or an Android system. The electronic device may predict service abnormality in a moving process of a user. When predicting that the user is about to enter an abnormal area, the electronic device performs a pre-cache operation on a target application. The target application is an application that sends a registration message to a control component of a system during installation or running, and the registration message is used to obtain first indication information that is sent by the control component and that is used to indicate that an abnormal area exists in a forward direction. The control component may be a component in a processing system, for example, a Huawei device communication mobile service (HMS HiD2D) in an HMS system or a processing module in an Android system. Alternatively, the control component may be a chip or a module in the chip, for example, a module in a modem chip.

The pre-cache operation may include at least one of the following: increasing a download rate, reducing an amount of data used in downloaded data in a unit time, and increasing a quantity of requests in a unit time. Increasing the download rate may include increasing a quantity of requests in a unit time and increasing a data amount of a single request.

For example, reducing the amount of data used in the downloaded data in the unit time may be reducing an amount of data played in the downloaded video data in the unit time, for example, reducing a resolution, a frame rate, and a bit rate of the downloaded video data. For example, reducing the amount of data used in the downloaded data in the unit time may also be reducing the amount of data played in the downloaded audio data in the unit time, for example, reducing a sampling rate, a quantity of sampling bits, and a quantity of channels of the downloaded audio data.

Therefore, according to the data caching method provided in embodiments of this application, even if duration of continuously traversing the abnormal area such as a tunnel is long, the user can normally use the target application on the electronic device 100 as much as possible when passing through the abnormal area. This improves user experience.

Based on the foregoing-provided application scenario in which the user passes through the abnormal area on the route to the company, the following describes a process of performing the data caching method in embodiments of this application. For details of the route to the company, refer to the route shown in FIG. 1A to FIG. 1C. Before leaving from home, the user opens the video application on the electronic device 100. In this case, the video application sends the registration message to the control component in the electronic device 100, to obtain the first indication information. In the process in which the user moves from home to the company, the user watches the video on the video application, and the control component continuously performs a prediction process and obtains the first indication information. For description of the prediction process, refer to embodiments shown in FIG. 8A and FIG. 8B to FIG. 13. Details are not described temporarily.

When the user passes through the first normal area, the electronic device 100 accesses the 5G network with the five signal bars (namely, full bars), the signal quality is good, and the video application on the electronic device 100 works based on the first cache policy. A process in which the user moves from home to the normal point C (namely, when the user is in the first normal area) is consistent with the process shown in FIG. 1A. For details, refer to the description in FIG. 1A.

Figure 1D:
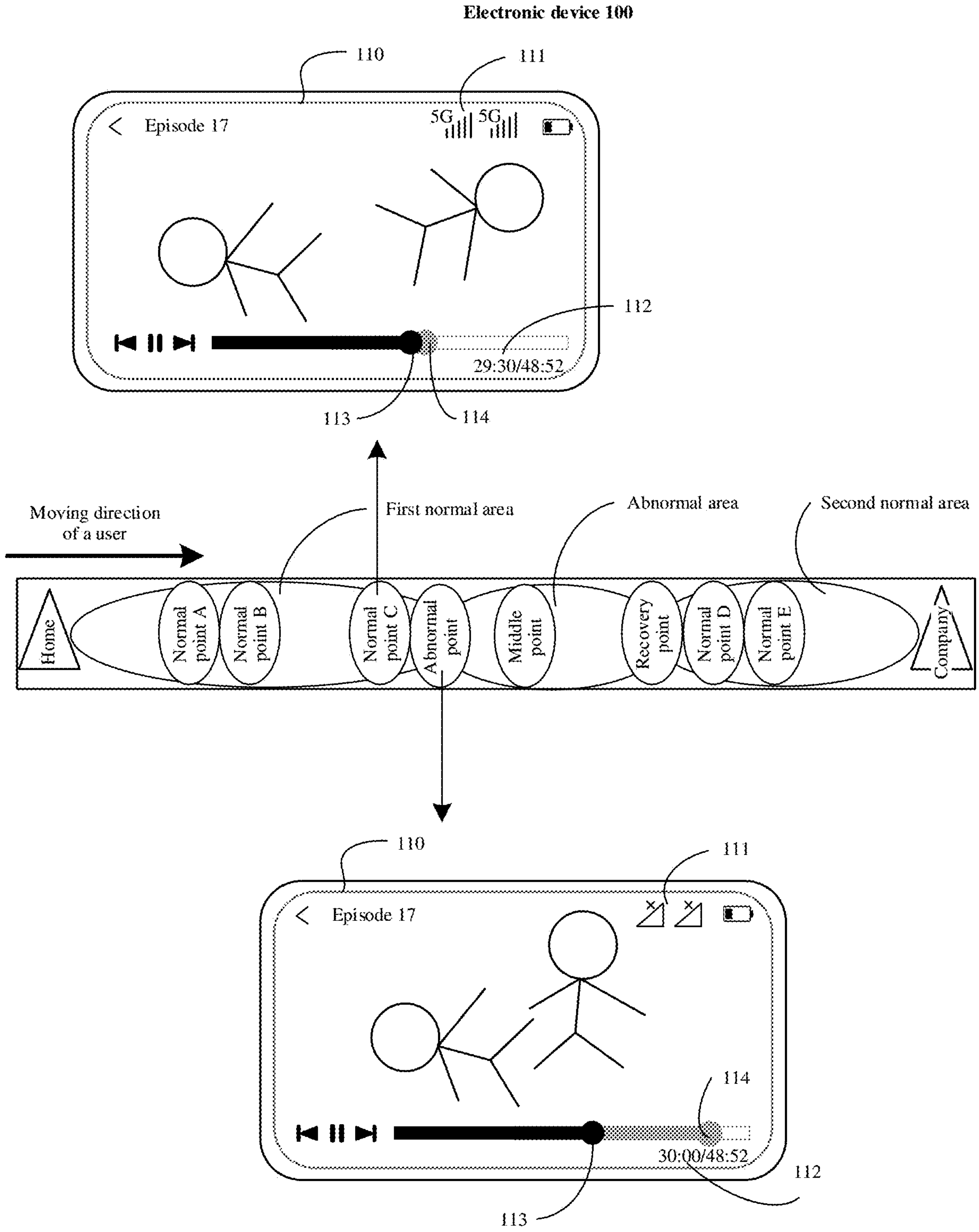

As shown in FIG. 1D, when the user reaches the normal point C, the control component sends the first indication information to the video application. The first indication information may include a type. Optionally, the first indication information may further include first time $t_1$. Optionally, the first indication information may further include second time $t_2$. Optionally, the first indication information may further include third time $t_3$. If the type is a first value, it indicates that the abnormal area exists. If the type is a second value, it indicates that a previously sent broadcast message is invalid. $t_1$ may be a moment of entering the abnormal area, or may be duration from a current location to entering the abnormal area (namely, duration of 30 seconds from the normal point C to the abnormal point). $t_2$ may be a moment of leaving the abnormal area, or may be duration from the current location to leaving the abnormal area. $t_3$ may be duration from entering the abnormal area to leaving the abnormal area (namely, duration from the abnormal point to the recovery point), that is, duration of the abnormal area. The video application receives the first indication information sent by the control component, and performs the pre-cache operation in response to the first indication information. Optionally, the video application performs the pre-cache operation within preset execution duration (for example, 5 milliseconds, 10 milliseconds, 1 second, or 3 seconds) in which the first indication information is received. Playing duration of the cached video data may be prolonged, or use duration of other cached data may be prolonged through the pre-cache operation.

When performing the pre-cache operation, the video application caches the data of the video application based on a second cache policy. The second cache policy includes at least one of the following: downloading the data of the target application at a second download rate, downloading the data of the target application at a second bit rate, downloading the data of the target application at a second resolution, downloading the data of the target application at a second frame rate, and requesting the data of the target application by using a second quantity of request times, where the second quantity of request times is a quantity of request times in a unit time. The second download rate is greater than the first download rate, the second bit rate is less than the first bit rate, the second resolution is less than the first resolution, the second frame rate is less than the first frame rate, and the second quantity of request times is greater than the first quantity of request times.

It is assumed that the pre-cache operation is to increase the download rate to preset times (for example, 1.8 times or 3 times) of the original rate. For example, the preset times is 3 times, video data whose duration is 30 seconds is downloaded per second, and after content that reaches first use duration is downloaded and cached, the cache is not stopped. Instead, the cache continues. It is assumed that in a period in which the user moves from the normal point C for 30 seconds to the abnormal point, the video application caches the video data based on the second cache policy. The second download rate is three times the first download rate, the first resolution is the same as the second resolution or the second resolution is less than the first resolution, the first frame rate is the same as the second frame rate or the second frame rate is less than the first frame rate, and the first bit rate is the same as the second bit rate or the second bit rate is less than the first bit rate. Optionally, in this period, a quantity of data request times in a unit time may be larger, that is, the second quantity of request times is greater than the first quantity of request times. Optionally, that the second download rate is greater than the first download rate may be specifically that the second quantity of request times is greater than the first quantity of request times. The electronic device may adjust one or more parameters of the download rate, the bit rate, the frame rate, the resolution, and the quantity of data request times in the unit time, and the electronic device may adjust any combination of the five parameters.

As shown in FIG. 1D, assuming that the video application performs the pre-cache operation in a period (namely, within $t_1$) in which the user moves from the normal point C to the abnormal point, the video application downloads, within $t_1$, video data whose duration is 15 minutes. Therefore, when the user reaches the abnormal point, the black dot 113 in the user interface no is used to indicate that the video is played to 30 minutes, and the gray dot 114 is used to indicate that the video is cached to 45 minutes. In this case, duration of cached content (15 minutes) is greater than first preset duration (300 s). From this moment, that is, when the user passes through the abnormal area, the video application downloads the video data at a third download rate, where the third download rate is less than the first download rate, or downloads the video data at a third bit rate, where the third bit rate is less than or equal to the second bit rate, or downloads the video data at a third resolution, where the third resolution is less than or equal to the second resolution, or downloads the video data at a third frame rate, where the third frame rate is less than or equal to the second frame rate, or downloads the video data by using a third quantity of request times, where the third quantity of request times is a quantity of request times in a unit time, and the third quantity of request times is less than or equal to the first quantity of request times. The signal quality identifier 111 in the user interface no is used to represent that the electronic device

100 cannot access the network and is disconnected from the network. Therefore, the third download rate is 0.

Figure 1E:
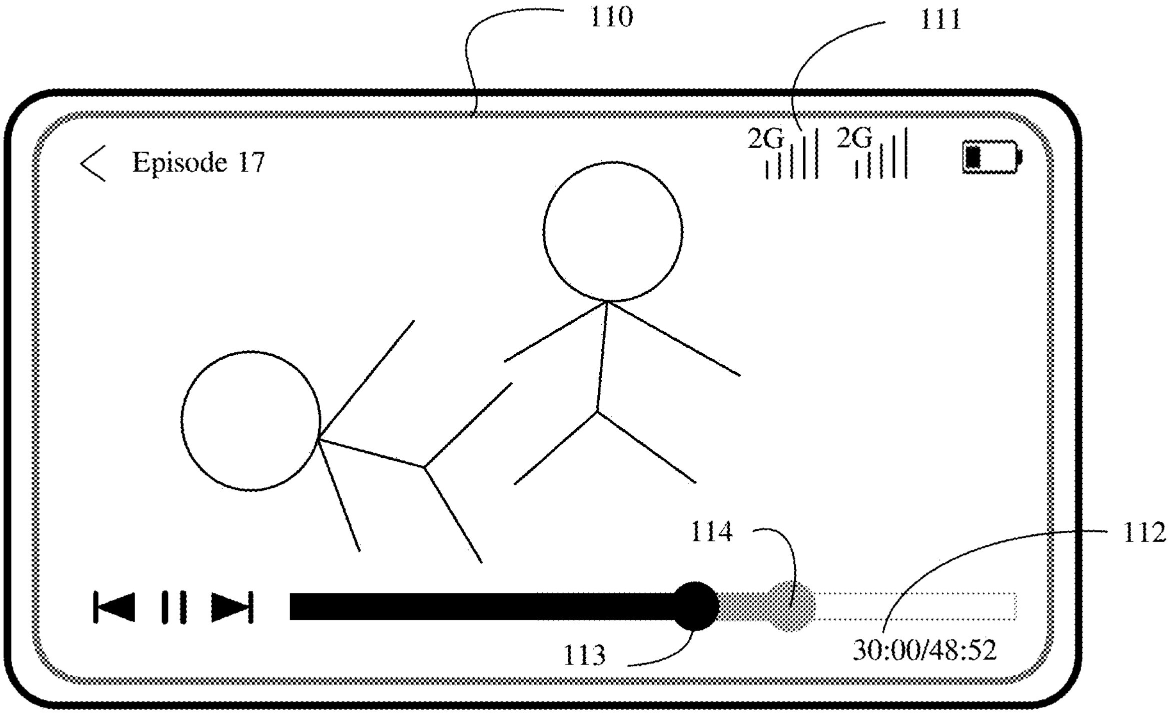
Figure 1F:
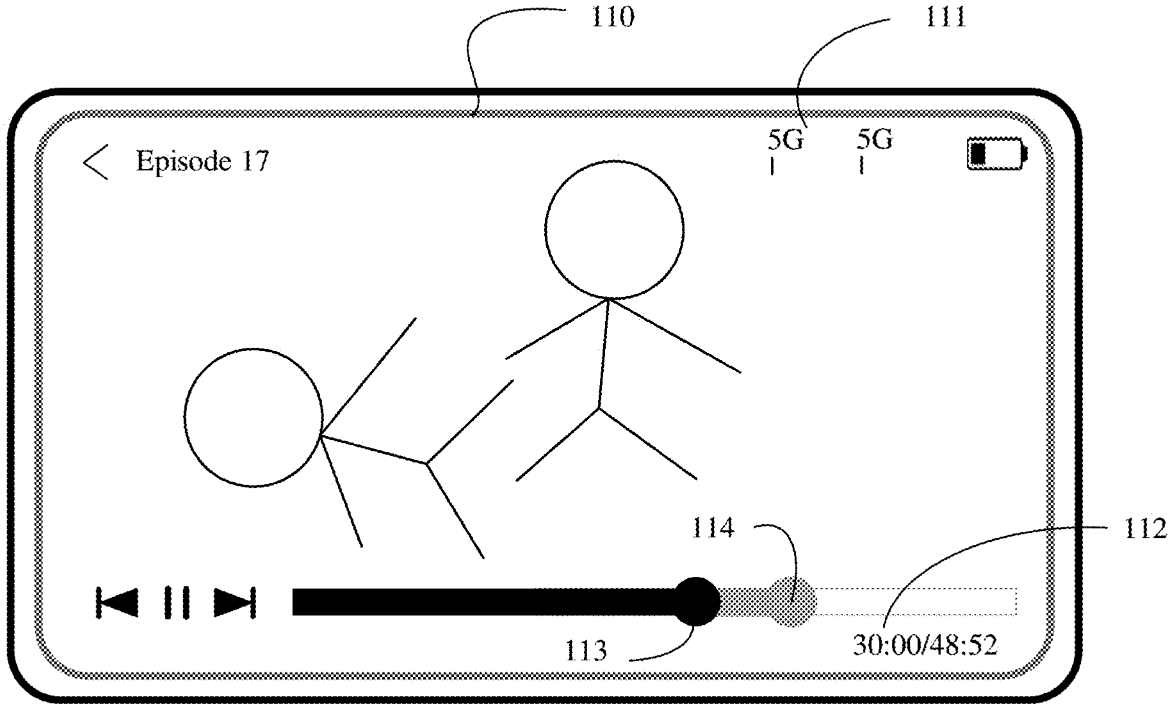
Figure 1G:
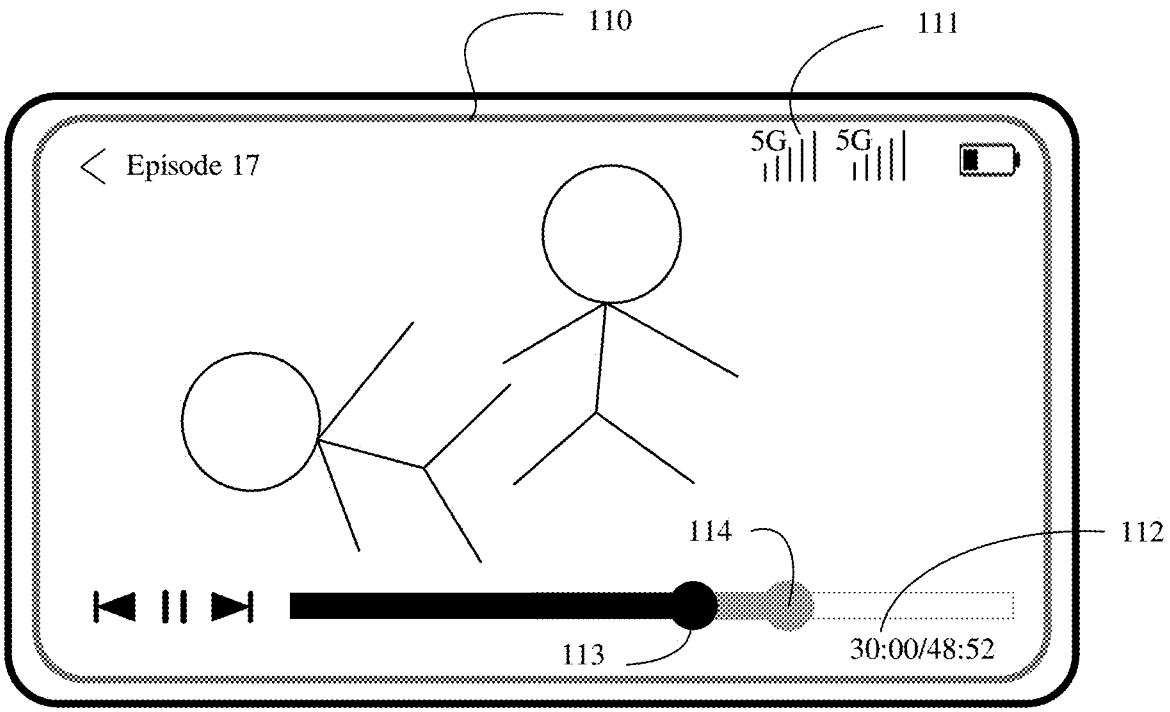

In specific implementation, falling to a lower network standard may occur when the user passes through the abnormal area. In this case, when the user reaches the abnormal point, the user interface displayed by the electronic device 100 is, for example, the user interface no shown in FIG. 1E, and the signal quality identifier 111 in the user interface no is used to represent that the electronic device accesses a 2G network with five signal bars (namely, full bars). Poor signal quality may also occur when the user passes through the abnormal area. In this case, when the user reaches the abnormal point, the user interface displayed by the electronic device 100 is, for example, the user interface no shown in FIG. 1F, and the signal quality identifier 111 in the user interface no is used to represent that the electronic device accesses the 5G network with one signal bar. Poor application experience quality may also occur when the user passes through the abnormal area. In this case, when the user reaches the abnormal point, the user interface displayed by the electronic device 100 is, for example, the user interface no shown in FIG. 1G. Although the signal quality identifier 111 in the user interface no represents that the electronic device accesses the 5G network with five signal bars (namely, full bars), QoE of the application is poor. As a result, the download rate is low. In the foregoing three cases, the third rate is less than the first rate, and that the third rate is less than the first rate is, for example, that the quantity of request times in the unit time is less than the first quantity of request times, and an amount of data downloaded in the unit time is less than a first data amount.

Figure 1H:
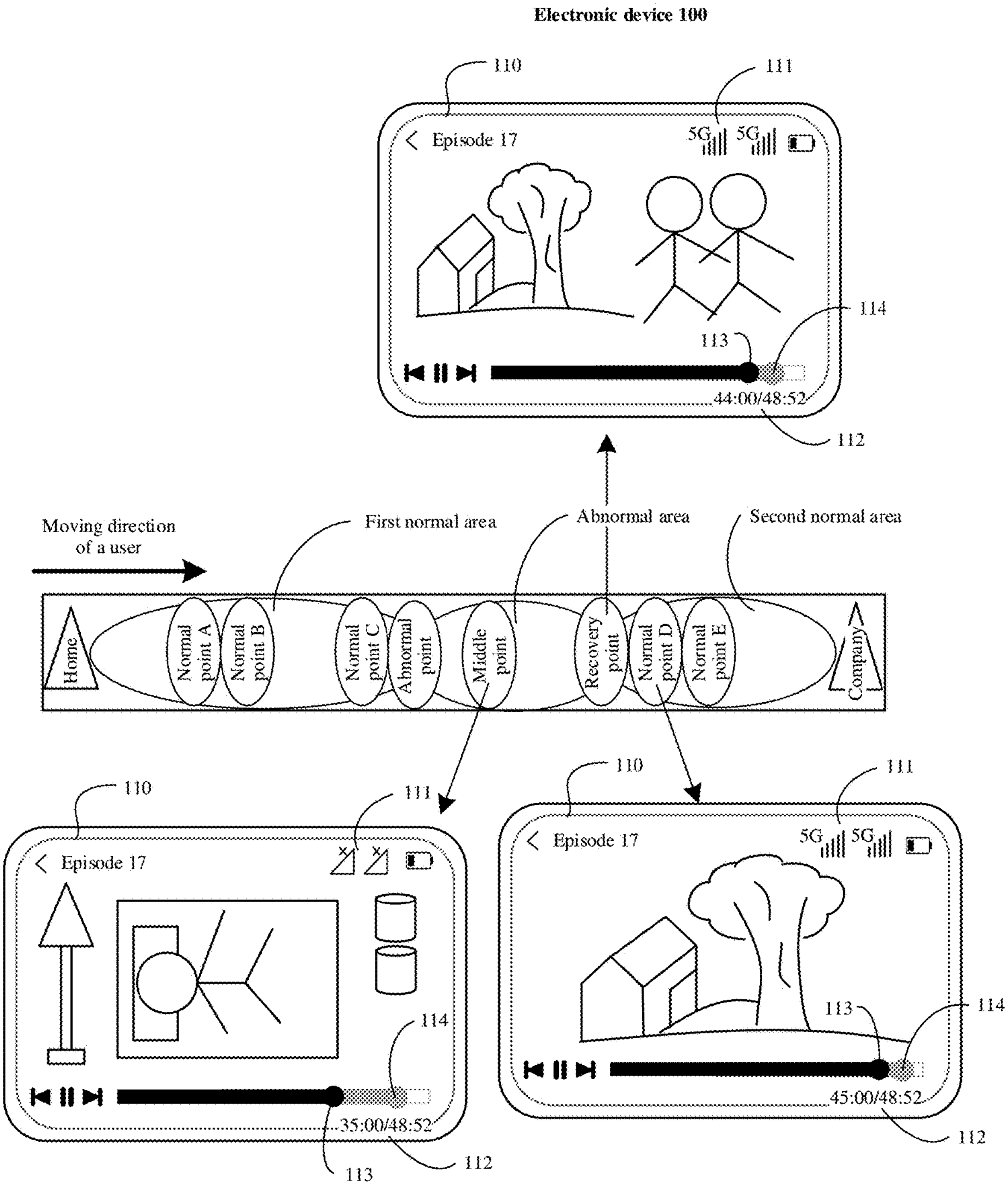

As shown in FIG. 1H, when the user continues to move from the abnormal point for 5 minutes to the middle point, the user may continue to watch the video. In this case, the black dot 113 in the user interface no moves, and the time identifier 112 also changes. However, because the second rate in the abnormal area is 0, that is, the video data cannot be downloaded, the gray dot 114 in the user interface no does not move. The third resolution is less than or equal to the second resolution, or the third frame rate is less than or equal to the second frame rate, or the third bit rate is less than or equal to the second bit rate, or the third quantity of request times is less than or equal to the second quantity of request times. When the user reaches the middle point, the black dot 113 in the user interface no is used to indicate that the video is played to 35 minutes, and the gray dot 114 is still used to indicate that the video is cached to 45 minutes. Therefore, when the user continues to move from the middle point for 10 minutes, the black dot 113 and the time identifier 112 can continue to move, and the user can continue to watch the video.

As shown in FIG. 1H, assuming that duration for the user to reach the recovery point from the middle point is 9 minutes, when the user reaches the recovery point, the black dot 113 in the user interface no is used to indicate that the video is played to 44 minutes, and the gray dot 114 is still used to indicate that the video is cached to 45 minutes. In the process in which the user moves from the recovery point to the company (namely, when the user passes through the second normal area), the signal quality identifier 111 in the user interface no is used to represent that the electronic device accesses the 5G network with the five signal bars (namely, full bars). The signal quality is good, and the video application may download the video data based on the first cache policy. In other words, a rate for downloading the video data is recovered to the first rate, or a resolution of the video data is recovered to the first resolution, or a frame rate of the video data is recovered to the first frame rate, or a bit rate of the video data is recovered to the first bit rate. Optionally, a quantity of request times in the unit time is recovered to the first quantity of request times. Optionally, that the rate for downloading the video data is recovered to the first rate may be specifically that the quantity of request times in the unit time is recovered to the first quantity of request times. The user may also continue to watch the video on the video application. When the user reaches the normal point D, the black dot 113 in the user interface no displayed by the electronic device 100 is used to indicate that the video is played to 45 minutes.

In some embodiments, if the user stops moving or deviates from the current route before reaching the abnormal area, the control component may send, to the video application, first indication information in which the type is the second value, to notify the video application that first indication information previously sent is invalid. For example, when the user reaches the normal point C, the video application receives the first indication information in which the type is the first value, and performs the pre-cache operation, that is, caches the video data based on the second cache policy. However, when the user stops moving from the normal point C to the abnormal point, or does not move from an offset route to the abnormal point, the control component may send, to the video application, the first indication information in which the type is the second value. The video application receives the first indication information in which the type is the second value, and stops performing the pre-cache operation, that is, caches the video data based on the first cache policy.

It is assumed that the pre-cache operation is to reduce a bit rate of the downloaded video data (for example, reduce the bit rate to $$\frac{1}{2}$$

times or $$\frac{1}{3}$$

times of the original bit rate). For example, the second bit rate is $$\frac{1}{3}$$

times of the first bit rate. In this case, an amount of data played in the video data per unit time may be increased to three times of the original bit rate. In this case, for a process in which the user moves from the normal point C to the company, refer to FIG. 1I to FIG. 1K.

Figure 1I:
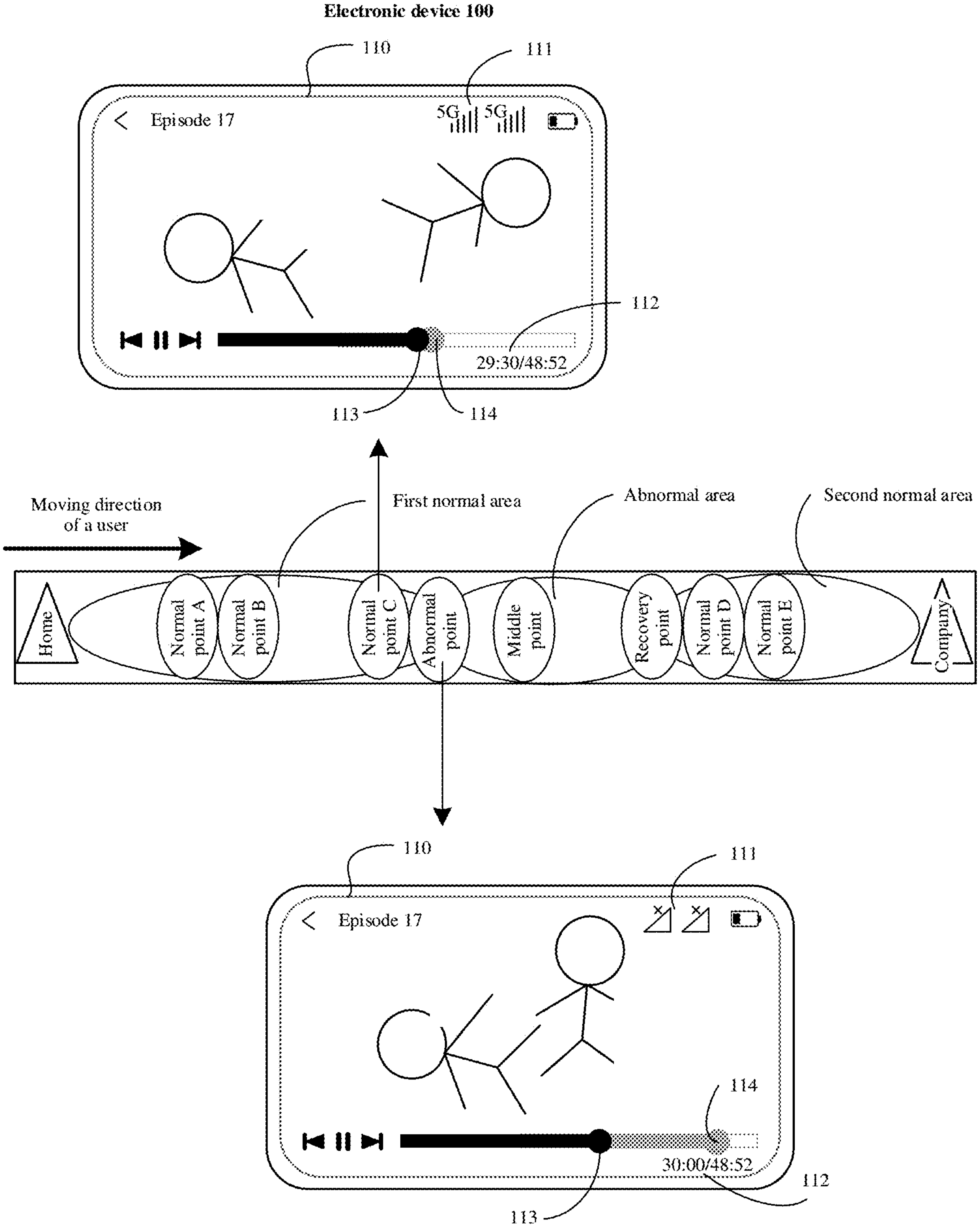

As shown in FIG. 1I, assuming that the video application performs the pre-cache operation in a period (namely, within $t_1$) in which the user moves from the normal point C to the abnormal point, video data whose duration is 15 minutes is downloaded within $t_1$. Therefore, when the user reaches the abnormal point, the black dot 113 in the user interface no is used to indicate that the video is played to 30 minutes, and the gray dot 114 is used to indicate that the video is cached to 45 minutes. In this case, duration of cached content (15 minutes) is greater than the first use duration (300 s). Starting from this moment, that is, when the user passes through the abnormal area, for a working manner of the video application, refer to the description in FIG. 1D. Details are not described again.

As shown in FIG. 1I, when the user reaches the abnormal point and actually passes through the abnormal area, the third bit rate is less than the first bit rate, or the third resolution is less than the first resolution, or the third bit rate is less than the first bit rate, or the third frame rate is less than the first frame rate, or the third resolution is less than or equal to the second resolution, or the third code rate is less than or equal to the second code rate, or the third frame rate is less than or equal to the second frame rate. Therefore, definition of the user interface no is poor, and the definition is less than definition in the first normal area, or the definition is less than or equal to definition during the period from the normal point C to the abnormal point. Optionally, the third quantity of request times is less than the first quantity of request times or the second quantity of request times.

Figure 1J:
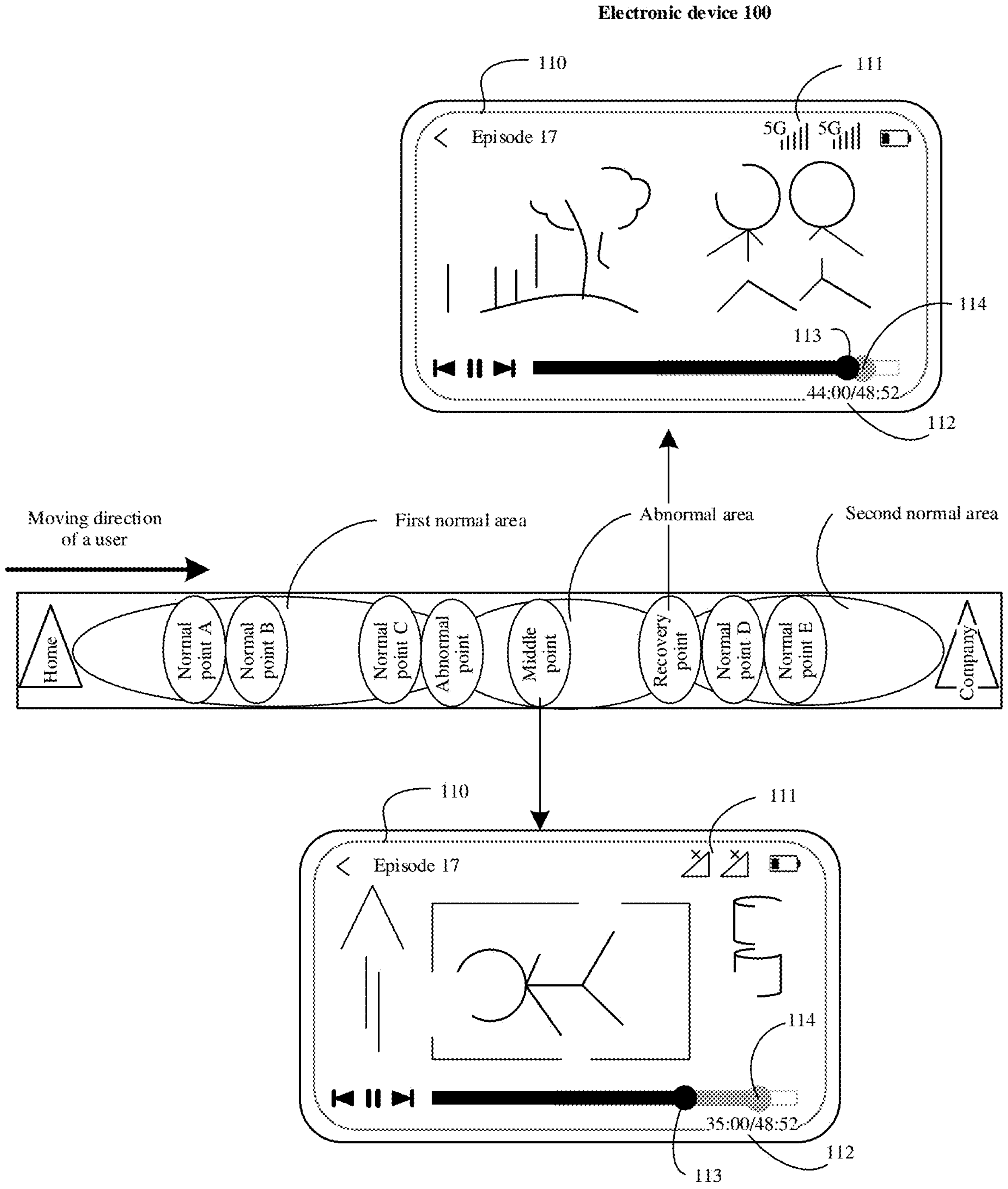

As shown in FIG. 1J, when the user continues to move from the abnormal point for 5 minutes to the middle point, the user may continue to watch the video. In this case, the black dot 113 in the user interface no moves, and the time identifier 112 also changes. However, because the second rate in the abnormal area is 0, that is, the video data cannot be downloaded, the gray dot 114 in the user interface no does not move. When the user reaches the middle point, the black dot 113 in the user interface no is used to indicate that the video is played to 35 minutes, and the gray dot 114 is still used to indicate that the video is cached to 45 minutes. Therefore, when the user continues to move from the middle point for 10 minutes, the black 113 and the time identifier 112 can continue to move, and the user can continue to watch the video. A resolution, a frame rate, or a bit rate of the video data played by the video application when the user passes through the abnormal area is the second resolution, the second frame rate, or the second bit rate. The second bit rate is less than the first bit rate, or the second resolution is less than the first resolution, or the second frame rate is less than the first frame rate. Therefore, the definition of the user interface no is poor.

As shown in FIG. 1J, assuming that duration for the user to reach the recovery point from the middle point is 9 minutes, when the user reaches the recovery point, the black dot 113 in the user interface no is used to indicate that the video is played to 44 minutes, and the gray dot 114 is still used to indicate that the video is cached to 45 minutes. In this case, the resolution, the frame rate, or the bit rate of the video data played by the video application are still the second resolution, the second frame rate, or the second bit rate. Therefore, definition of the user interface 110 is poor. In the process in which the user moves from the recovery point to the company (namely, when the user passes through the second normal area), the signal quality identifier 111 in the user interface no is used to represent that the electronic device accesses the 5G network with the five signal bars (namely, full bars). The signal quality is good, the video application may continue to work normally based on the first cache policy, and the user may also continue to watch the video on the video application.

Figure 1K:
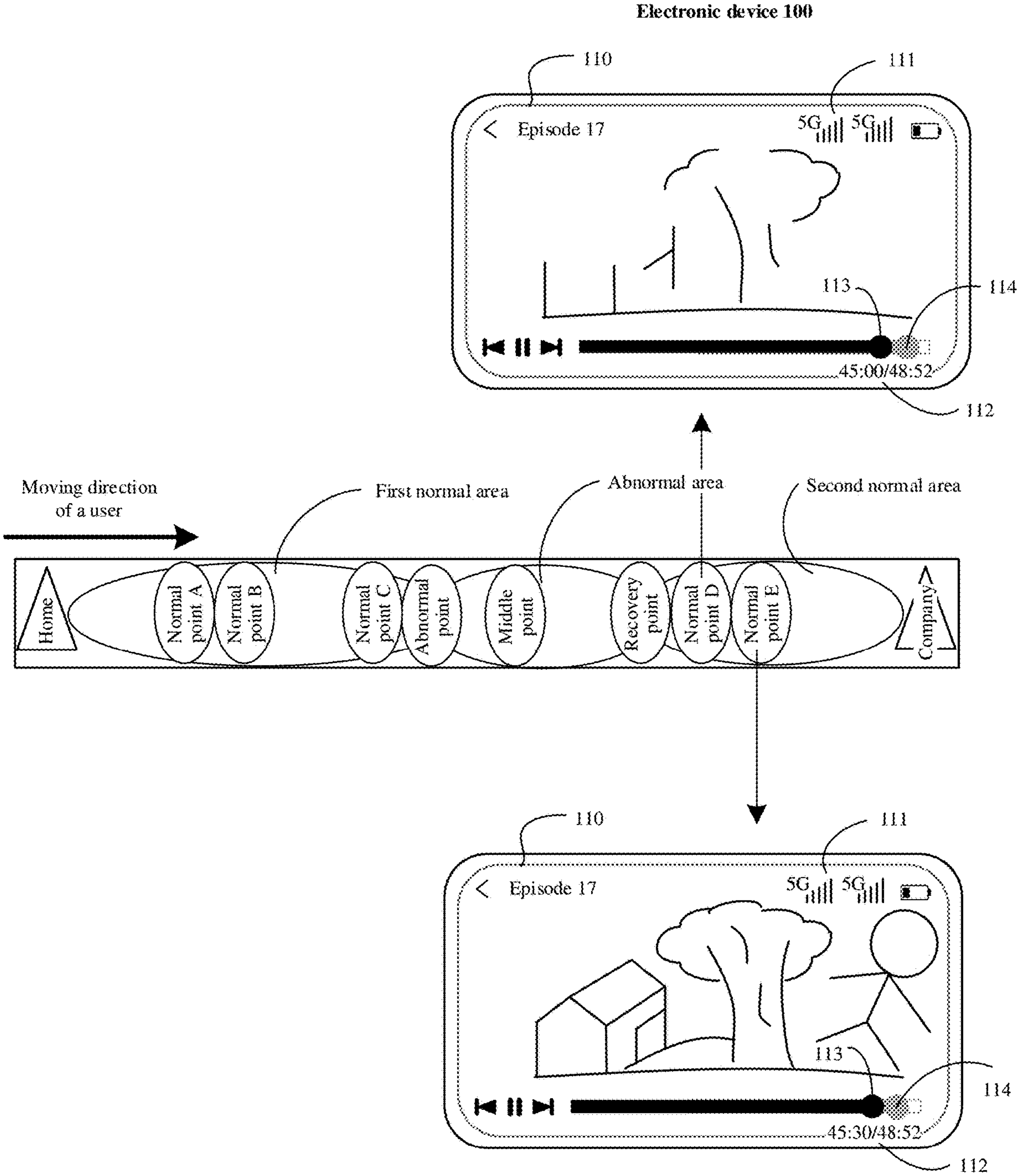

As shown in FIG. 1K, when the user continues to move from the recovery point for one minute to reach the normal point D, the black dot 113 in the user interface no is used to indicate that the video is played to 45 minutes, and the signal quality identifier 111 in the user interface no is used to indicate that the electronic device accesses the 5G network with five signal bars (namely, full bars), and the signal quality is good. Although the signal quality is good in this case, the video application downloads the data for 10 minutes when the user moves from the normal point C to the abnormal point, but the user plays only the video for 9 minutes when the user moves from the abnormal point to the recovery point. Therefore, when the user continues to move from the recovery point for one minute to the normal point D, the resolution, the bit rate, or the frame rate of the video played on the video application is still the second resolution, the second bit rate, or the second frame rate, and the definition of the user interface no is still poor. In a subsequent process in which the user moves from the normal point D to the company, video data played by the video application may be downloaded when the video application is in the second normal area. A resolution, a frame rate, or a bit rate of the video data is the first resolution, the first frame rate, or the first bit rate. Therefore, definition of the user interface no is normal. For example, when a normal point E is reached, the black dot 113 in the user interface no is used to indicate that the video is played to 45 minutes and 30 seconds.

This is not limited to the example in FIG. 1K. In specific implementation, the video application may re-download video data after 44 minutes based on the first cache policy from the moment at which the user continues to move from the recovery point, and a bit rate of the video data is the first bit rate, a frame rate of the video data is the first frame rate, or a resolution of the video data is the first resolution. After a specific period of time (for example, 5 seconds, 10 seconds, or 30 seconds), a bit rate of video data played by the video application is the first bit rate, or a frame rate of the video data is the first frame rate, or a resolution of the video data is the first resolution. Therefore, definition of the displayed user interface is normal.

It may be understood that, in FIG. 1B to FIG. 1C, when the user is at the abnormal point or the middle point (that is, when the user passes through the abnormal area), the gray dot 114 in the user interface no is used to indicate that the video is cached to 35 minutes. In addition, when the user is at the middle point in FIG. 1C, the black dot 113 coincides with the gray dot 114. In FIG. 1D, FIG. 1H, and FIG. 1I and FIG. 1J, when the user is at the abnormal point or the middle point (that is, when the user passes through the abnormal area), the gray dot 114 in the user interface no is used to indicate that the video is cached to 45 minutes. Therefore, in FIG. 1B and FIG. 1C, the user cannot continue to watch the video during the period from the middle point for 9 minutes to the recovery point. However, in FIG. 1D, FIG. 1H, and FIG. 1I and FIG. 1J, the user may continue to watch the video during the period from the middle point for 9 minutes to the recovery point.

In some embodiments, the user may tap a next episode before entering the abnormal area, so that the video application plays video data of an $18^{th}$ episode. Assuming that the user taps the next episode at the normal point C, a process in which the user moves from the normal point C to the abnormal point is shown in FIG. 1L or FIG. 1M.

Figure 1L:
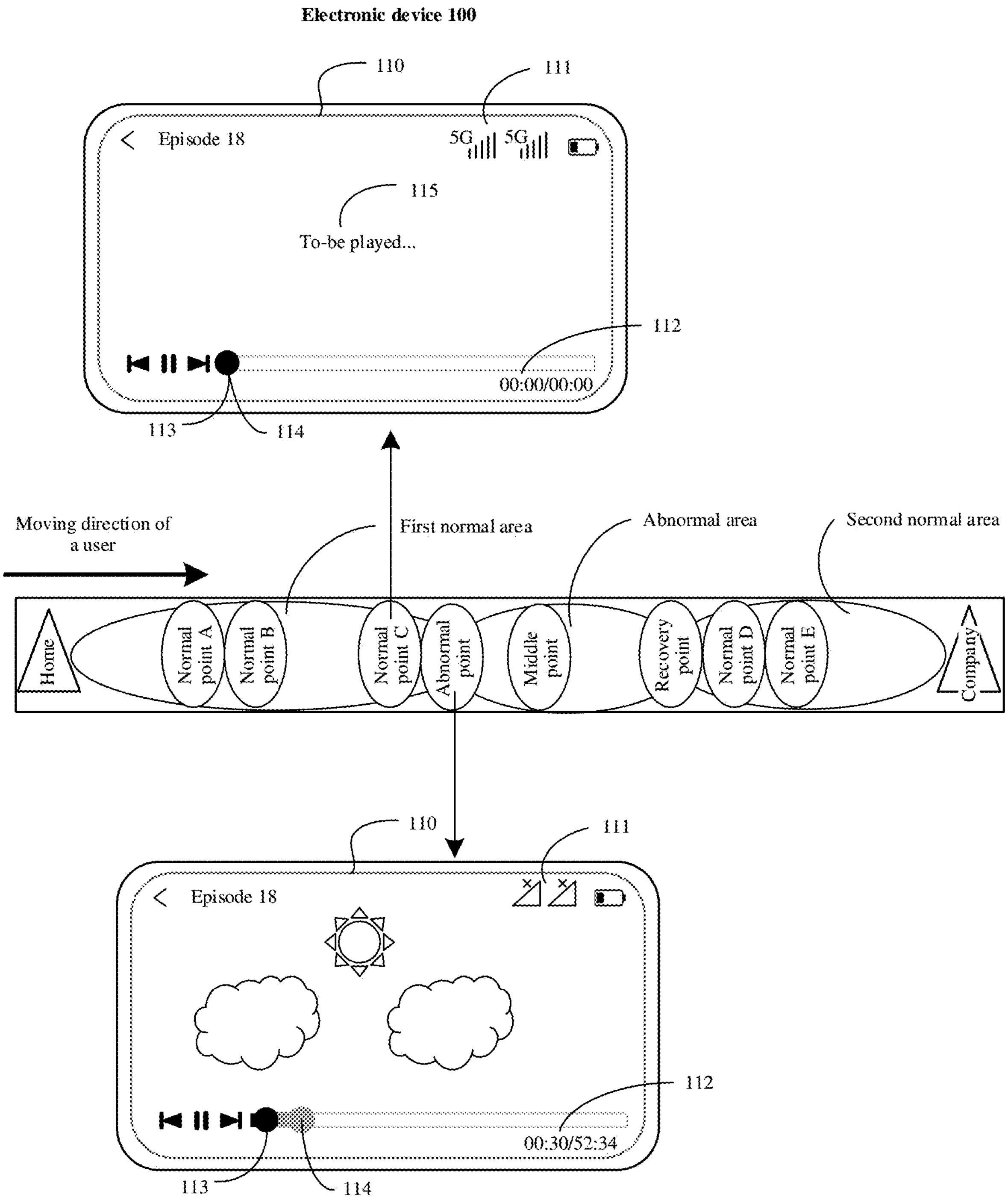

As shown in FIG. 1L, when the user opens the video application on the electronic device 100 before leaving from home, the video application does not send the registration message to the control component. When the user reaches the normal point C, the user taps the next episode. In this case, the user interface no does not play video data, and a prompt 115 "To be played . . . " included in the user interface no is used to prompt the user that the video of the 18th episode is to be played. The time identifier 112 in the user interface 110 is not successfully obtained, and therefore is "00:00/00:00". The black dot 113 coincides with the gray dot 114, which indicates that the time for playing and caching the video is 0. During the period in which the user moves from the normal point C to the abnormal point (namely, within 30 seconds), the video application keeps downloading video data of 10 seconds per second. When the user reaches the abnormal point, the video application has downloaded video data of 300 seconds (namely, 5 minutes). Therefore, in the user interface no, the black dot 113 is used to indicate that the video is played to 30 seconds, and the gray dot 114 is used to indicate that the video is cached to 5 minutes.

Figure 1M:
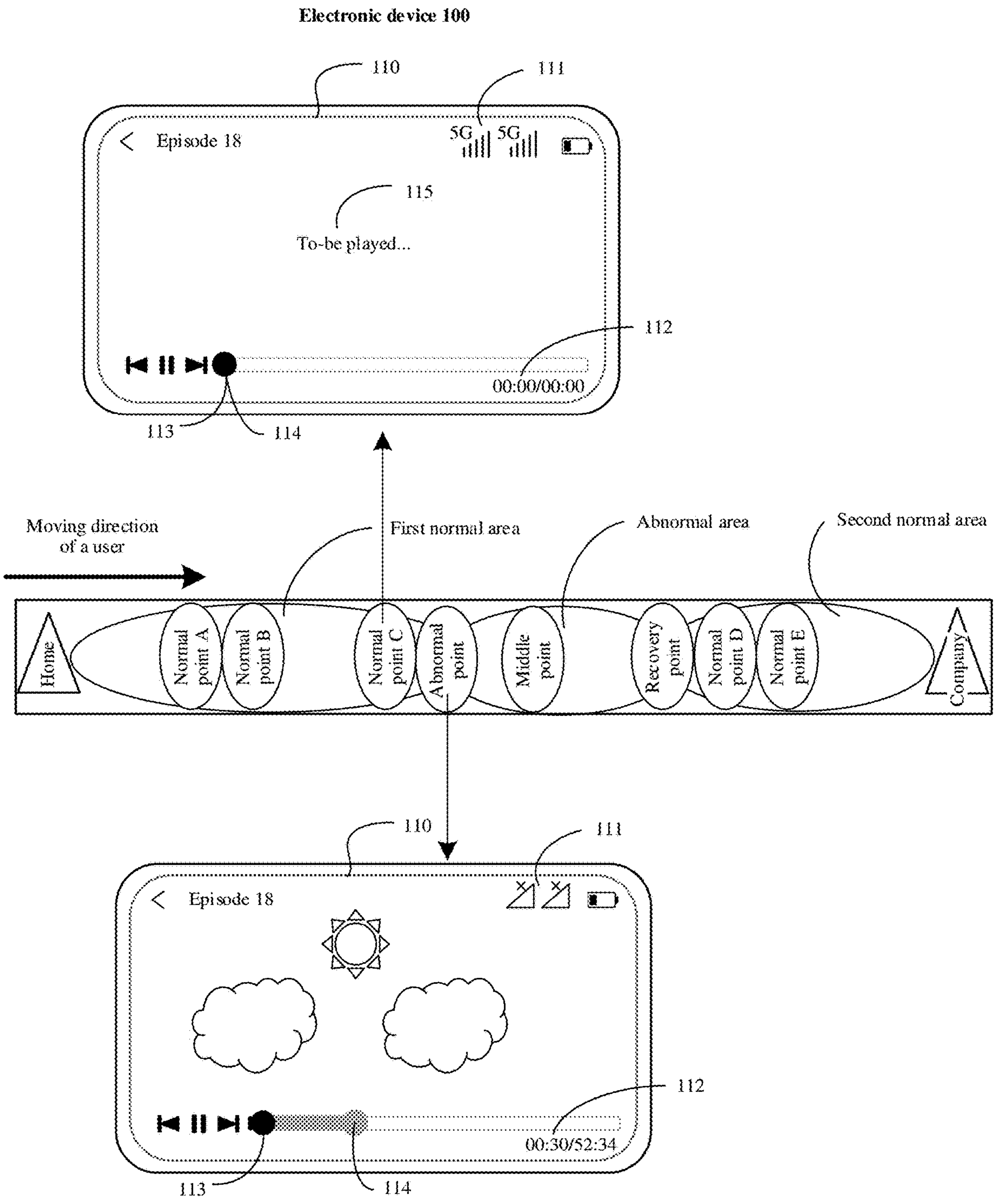

As shown in FIG. 1M, when the user opens the video application on the electronic device 100 before leaving from home, the video application sends the registration message to the control component. A user operation and the user interface no when the user reaches the normal point C are consistent with those in FIG. 1L, and details are not described again. However, in the period in which the user moves from the normal point C to the abnormal point (namely, within the 30 seconds), the video application performs the pre-cache operation. It is assumed that the pre-cache operation is, as shown in FIG. 1D and FIG. 1H, increasing the download rate by three times of the original download rate, or as shown in FIG. 1I and FIG. 1J, decreasing the bit rate of the downloaded video data to $$\frac{1}{3}$$

of the original bit rate. When the user reaches the abnormal point, the video application downloads video data of 10 minutes. Therefore, in the user interface no, the black dot 113 is used to indicate that the video is played to 30 seconds, and the gray dot 114 is used to indicate that the video is cached to 15 minutes. Within the same download duration, duration of the downloaded video data in FIG. 1M is greater than duration of the downloaded video data in FIG. 1L.

In some embodiments, the first indication information includes the first time $t_1$ and the second time $t_2$, or includes the third time $t_3$. The pre-cache operation performed by the video application is used to download, before the abnormal area is reached, the video data whose play duration is greater than or equal to duration of the abnormal area, so as to ensure that the user can normally watch the video when passing through the abnormal area. The duration of the abnormal area may be obtained based on a difference between the first time $t_1$ and the second time $t_2$, or may be directly obtained based on the third time $t_3$.

In some embodiments, when the video application plays the video, each time the video application requests data from a server of the video application, the video application may increase a quantity of data request times by one, and record the quantity of data request times. When a video of a next episode is played, the currently recorded quantity of data request times may be cleared, and the foregoing record process is restarted for the currently played video. Other content (for example, audio, a web page, or a game) is similar, for example, when playing a next song, an audio application clears a currently recorded quantity of data request times, and re-records a quantity of data request times for the currently played song.

This is not limited to the examples in FIG. 1A to FIG. 1M. In specific implementation, the user interface no displayed by the electronic device 100 may not include the gray dot 114, but an actual cache status may be consistent with a cache status represented by the gray dot 114.

It may be understood that, for content cached by another application (for example, audio data of an audio application, text data, picture data, video data, and audio data of a web application and a game application), during downloading, a first cache policy and a second cache policy are similar. For example, a first cache policy for the audio application includes at least one of the following: downloading the data of the target application at a first download rate, downloading the data of the target application at a first sampling frequency, downloading the data of the target application by using a first quantity of sampling bits, downloading the data of the target application by using a first quantity of sound channels, and requesting the data of the target application by using a first quantity of request times. A second cache policy for the audio application includes at least one of the following: downloading the data of the target application at a second download rate, downloading the data of the target application at a second sampling frequency, downloading the data of the target application by using a second quantity of sampling bits, downloading the data of the target application by using a second quantity of sound channels, and requesting the data of the target application by using a second quantity of request times.

For example, data of a news application includes first-type data (namely, picture data) and second-type data (namely, text data), and a first cache policy for the news application includes at least one of the following: downloading the data of the target application at a first download rate, downloading the data of the target application at a first resolution, and caching the first-type data and the second-type data. A second cache policy for the news application includes at least one of the following: downloading the data of the target application at a second download rate, downloading the data of the target application at a second resolution, and caching the first-type data and skipping caching the second-type data.

In this embodiment of this application, enabling and disabling of a prediction function may be preset by a system, for example, the function may be enabled by default, or may be customized by the user. For example, the user may enable an "Enable the prediction function" option in a setting interface displayed by the electronic device 100. In this case, applications on the electronic device 100 send the registration message to the control component during installation or running, and the control component keeps performing the prediction process and obtains the first indication information in a process in which the user moves. Then, the control component may send the first indication information to the foregoing application that sends the registration message, so that the application performs the pre-cache operation. For example, the setting interface displayed by the electronic device 100 may include "Enable the prediction function" options of different applications, and the user may enable or disable an "Enable the prediction function" option for any application in the setting interface. It may be understood that, when an "Enable the prediction function" option of at least one application in the setting interface is enabled, the control component keeps performing the prediction process and obtains the first indication information in the moving process of the user. However, when an "Enable the prediction function" option of each application in the setting interface is disabled, the control component may stop performing the prediction process. The user may enable an "enable prediction function" option of the video application in the setting interface. In this case, the video application may send the registration message to the control component during installation or running, so that the control component sends the first indication information to the video application, the video application can perform the pre-cache operation based on the first indication information, and the user can normally use the video application when passing through the abnormal area.

The electronic device 100 in embodiments of this application may be a device such as a mobile phone, a tablet computer, a desktop computer, a laptop computer, a notebook computer, an ultra-mobile personal computer (UMPC), a handheld computer, a netbook, a personal digital assistant (PDA), a wearable electronic device, or a smart screen.

Next, an example electronic device provided in the following embodiments of this application is described.

Figure 2:
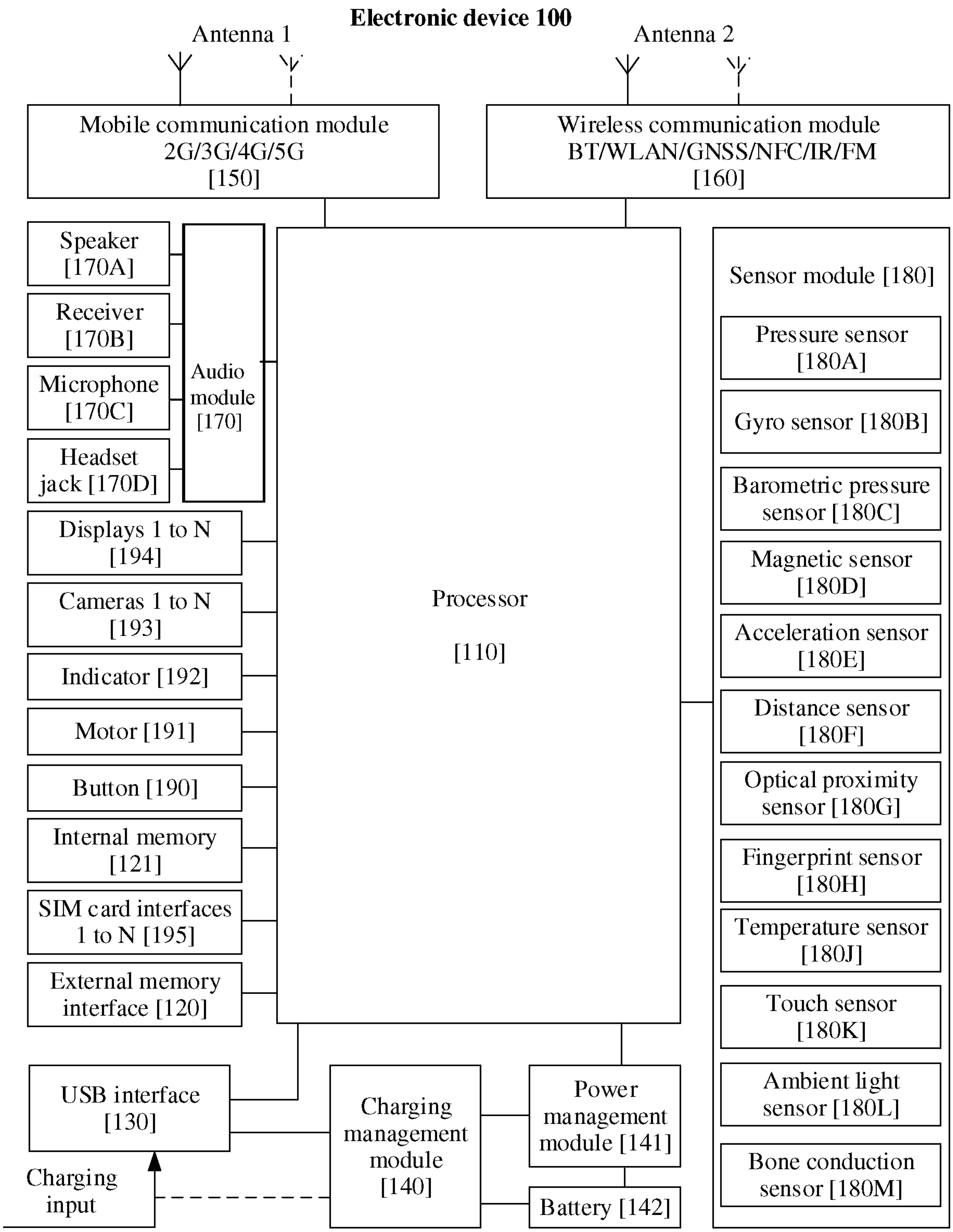
FIG. 2 to FIG. 4 are schematic diagrams of structures of some electronic devices according to an embodiment of this application.

FIG. 2 is a schematic diagram of a structure of the electronic device 100.

The electronic device 100 may include a processor no, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor no may include one or more processing units. For example, the processor no may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor no. In some embodiments, at least some functional modules of the mobile communication module 150 may be disposed in a same device as at least some modules of the processor no.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transferred to the AP. The AP outputs a sound signal through an audio device (which is not limited to the speaker 170A, the receiver 170B, and the like), or displays an image or a video on the display 194. In some embodiments, the modem processor may be an independent component. In some other embodiments, the modem processor may be independent of the processor no, and is disposed in a same device as the mobile communication module 150 or another functional module.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The foregoing GNSS may include a global positioning system (GPS), a global navigation satellite system (GLONASS), a BeiDou navigation satellite system (BDS), a quasi-zenith satellite system (QZSS), and/or a satellite based augmentation system (SBAS).

In some embodiments, the GNSS may alternatively be implemented by using an independent component. For example, the electronic device 100 further includes a positioning module. The positioning module may obtain position information of the electronic device 100 by using a GNSS (for example, a GPS): longitude and latitude information, optionally, direction (angle) information (for example, a northeast direction), optionally, and speed information.

In some embodiments, the modem processor may obtain cell information of the electronic device 100 by using the mobile communication module 150 and the wireless communication module 160, for example, an identity (cell id) of a serving cell, a cell id of a neighboring cell, and a signal quality parameter of the serving cell and/or a signal quality parameter of the neighboring cell. The signal quality parameter is, for example, but is not limited to, a packet loss rate, a signal-to-noise ratio, RSRP, or RSRQ.

In some embodiments, the AP may receive the cell information sent by the modem processor, to obtain the position information of the electronic device based on the cell information: the longitude and latitude information, optionally, the direction (angle) information (for example, 20 degrees north to east), and optionally, the speed information.

In some embodiments, the AP may receive a service abnormality notification event, for example, a notification that is reported by the modem processor and that indicates a network disconnection, falling to a lower network standard, or RSRP or RSRQ less than a preset threshold. The AP may also collect statistics on a network quality parameter (for example, a bandwidth or a delay) of at least one application to obtain a comprehensive value QoE, where the QoE is used to represent quality and performance of a service such as a network or a service experienced by a user. When the AP receives a service abnormality notification message and determines that the QoE is lower than a first QoE level, the AP may determine that a network service is abnormal and a service of the application is abnormal. The AP may further receive the position information sent by the positioning module or the modem processor, and the cell information sent by the modem processor. Then, the AP may perform a learning process, that is, identify and collect statistics on an abnormal area based on the foregoing information, to obtain a data file (which may also be referred to as an abnormal area database subsequently) of the abnormal area. The abnormal area database includes at least one record, and each record is used to identify an abnormal area and information including the abnormal area. For an example of a record (that is, information about an abnormal area in the record) in the abnormal area database, refer to Table 2 in FIG. 7. Details are not described temporarily. For specific implementation of the learning process, refer to descriptions in FIG. 6 and FIG. 7. Details are not described temporarily.

In some other embodiments, the AP may also send the foregoing information to a cloud server by using the mobile communication module 150 and the wireless communication module 160, and the cloud server performs the foregoing learning process. It may be understood that the cloud server may receive related information of a path route of the user sent by at least one electronic device. Therefore, the abnormal area recorded in the abnormal area database and obtained by the cloud server through learning may be an abnormal area that the electronic device 100 does not pass through.

In this embodiment of this application, the processor 110 may perform service abnormality prediction (a prediction process for short) based on the abnormal area database obtained in a learning process, cell information obtained in real time, and optionally, the location information obtained in real time, and obtain first indication information. The processor 110 may perform a pre-cache operation based on the first indication information in a process of sending a request message to a server of the target application. For descriptions of the first indication information, refer to the descriptions of the first indication information in FIG. 1A to FIG. 1M. Details are not described again.

The pre-cache operation may include at least one of the following: increasing a download rate, reducing an amount of data used in downloaded data in a unit time, and increasing a quantity of data request times in a unit time. Increasing the download rate may include increasing a quantity of data request times in a unit time, and/or increasing a data amount requested in a single request message. For example, reducing the amount of data used in the downloaded data in the unit time may be reducing a data amount played in downloaded video data in the unit time, for example, reducing a resolution, a frame rate, and a bit rate of the downloaded video data. For example, reducing the amount of data used in the downloaded data in the unit time may also be reducing a data amount played in downloaded audio data in the unit time, for example, reducing a sampling rate, a quantity of sampling bits, and a quantity of channels of the downloaded audio data.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and perform graphic rendering. The processor no may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement an audio function, such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or voice information is received through the electronic device 100, the receiver 170B may be put close to a human ear to listen to a voice.

In addition, for descriptions of components in the electronic device 100, refer to related descriptions in paragraphs [0054] to [0104] of the specification numbered CN110519451A and entitled "POWER-OFF MANAGEMENT AND CONTROL METHOD FOR ELECTRONIC DEVICE AND APPARATUS". Details are not described herein again.

Figure 3:
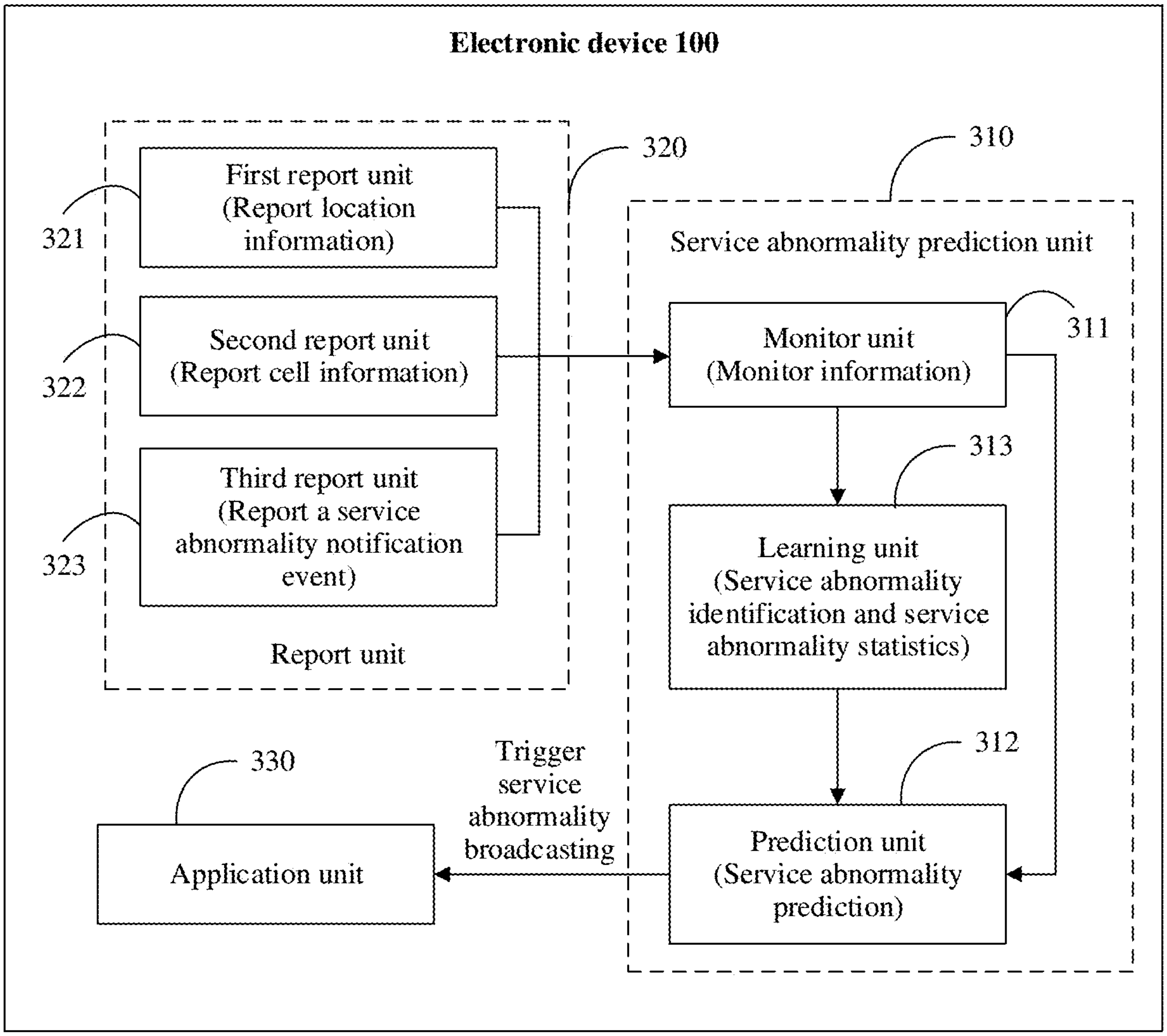

FIG. 3 is a schematic diagram of a structure of another electronic device 100 according to an embodiment of this application. The electronic device 100 may include a service abnormality prediction unit 310, a report unit 320, and an application unit 330. The service abnormality prediction unit 310 may include a monitor unit 311 and a prediction unit 312, and optionally, may further include a learning unit 313. The report unit 320 may include a first report unit 321, a second report unit 322, and a third report unit 323. The service abnormality prediction unit 310, the report unit 320, and the application unit 330 may all belong to the processor no shown in FIG. 2. For example, the service abnormality prediction unit 310 and the application unit 330 belong to an AP, the first report unit 321 is a positioning module or an AP, the second report unit 322 is a modem processor, and the third report unit 323 is an AP. The units included in the electronic device 100 are described as follows.

The monitor unit 311 is configured to monitor information. The monitored information may include location information sent by the first report unit 321, cell information sent by the second report unit 322, and a service abnormality notification event sent by the third report unit 323. For example, the location information includes longitude and latitude information, direction information, and speed information. The cell information includes a cell id of a serving cell, a cell id of a neighboring cell, and a signal quality parameter (such as a packet loss rate, a signal-to-noise ratio, RSRP, and RSRQ) of the serving cell and/or a signal quality parameter of the neighboring cell. The service abnormality notification event includes a notification message in which RSRP or RSRQ is less than a preset threshold, and a notification message in which QoE is less than a first QoE level.

In some embodiments, the information monitored by the monitor unit 311 may be sent to the learning unit 313 to perform a learning process. Specifically, the learning unit 313 may identify and collect statistics on an abnormal area based on the information, to obtain an abnormal area database. The abnormal area database includes at least one record, and each record is used to identify an abnormal area and information including the abnormal area. For an example of a record (that is, information about an abnormal area in the record) in the abnormal area database, refer to Table 2 in FIG. 7. Details are not described temporarily. In some other embodiments, the information monitored by the monitor unit 311 may also be sent to a cloud server to perform a learning process. For detailed description of the learning process, refer to embodiments shown in FIG. 6 and FIG. 7. Details are not described temporarily.

The prediction unit 312 is configured to obtain first indication information based on real-time information monitored by the monitor unit 311, and the abnormal area database (which may also be referred to as a historical record) sent by the cloud server or the learning unit 313. In addition, the prediction unit 312 may trigger service abnormality broadcasting, so as to send the first indication information to the application unit 330.

Specifically, for an area, such as the ground, in which positioning can be implemented, the abnormal area database may include valid location information, and the monitor unit 311 may also monitor real-time valid location information. Therefore, the prediction unit 312 may perform the prediction process based on the abnormal area database, real-time cell information sent by the monitor unit 311, and real-time location information, and obtain the first indication information. For description of the process, refer to embodiments shown in FIG. 8A and FIG. 8B to FIG. 11. Details are not described temporarily. However, for an area, such as a subway or a tunnel, in which positioning cannot be implemented, the abnormal area database does not include valid location information, and the monitor unit 311 cannot monitor real-time valid location information. Therefore, the prediction unit 312 may perform the prediction process based on the abnormal area database and the real-time cell information sent by the monitor unit 311, and obtain the first indication information. For description of the process, refer to the embodiment shown in FIG. 12. Details are not described temporarily. For description of the first indication information, refer to the description of the first indication information in FIG. 1A to FIG. 1M. Details are not described again.

Specifically, the application unit 330 may include at least one target application. For description of the target application, refer to descriptions in FIG. 1A to FIG. 1M and FIG. 4 and FIG. 5. Details are not described temporarily. After receiving the first indication information, the target application in the application unit 339 performs a pre-cache operation. For description of the pre-cache operation, refer to descriptions of the pre-cache operation in FIG. 1A to FIG. 1M. Details are not described again.

In some embodiments, after performing the prediction process and obtaining the first indication information, the prediction unit 312 may trigger service abnormality broadcasting, so as to send the first indication information to the application unit 330.

In some other embodiments, the prediction unit 312 may also trigger service abnormality broadcasting only when duration, of entering the abnormal area, obtained through prediction, is within a first preset time range, so as to send the first indication information to the application unit 330. The first preset time range may be a range of small duration, for example, [25 seconds, 35 seconds] or [so seconds, 70 seconds]. Alternatively, the first preset time range may be determined based on scene information. For example, a first preset time range on a route to a company is [25 seconds, 35 seconds], and a first preset time range on a home return route is [50 seconds, 70 seconds]. This implementation can avoid a case in which the electronic device is affected and user experience is affected because the target application performs the pre-cache operation early, for example, power consumption of the electronic device is high and traffic consumption is high due to an increase in a download rate, and definition of a subsequently displayed video image is low due to a reduction in a resolution, a frame rate, or a bit rate of downloaded video data. Optionally, if the prediction unit 312 obtains the first indication information based on the real-time location information of the electronic device 100, when the first indication information is sent to the application unit 330, a distance between the abnormal area and the current location of the electronic device that performs prediction is short, for example, duration for entering the abnormal area from the current location is 30 seconds, in this case, there is a low probability that a user changes a route, that is, there is a high probability that the user enters the abnormal area. This improves prediction accuracy.

It may be understood that a software system of the electronic device 100 may use a layered architecture, an event-driven architecture, a microkernel architecture, a micro service architecture, or a cloud architecture. In this embodiment of this application, a layered architecture is used as an example to describe the software system of the electronic device 100.

Figure 4:
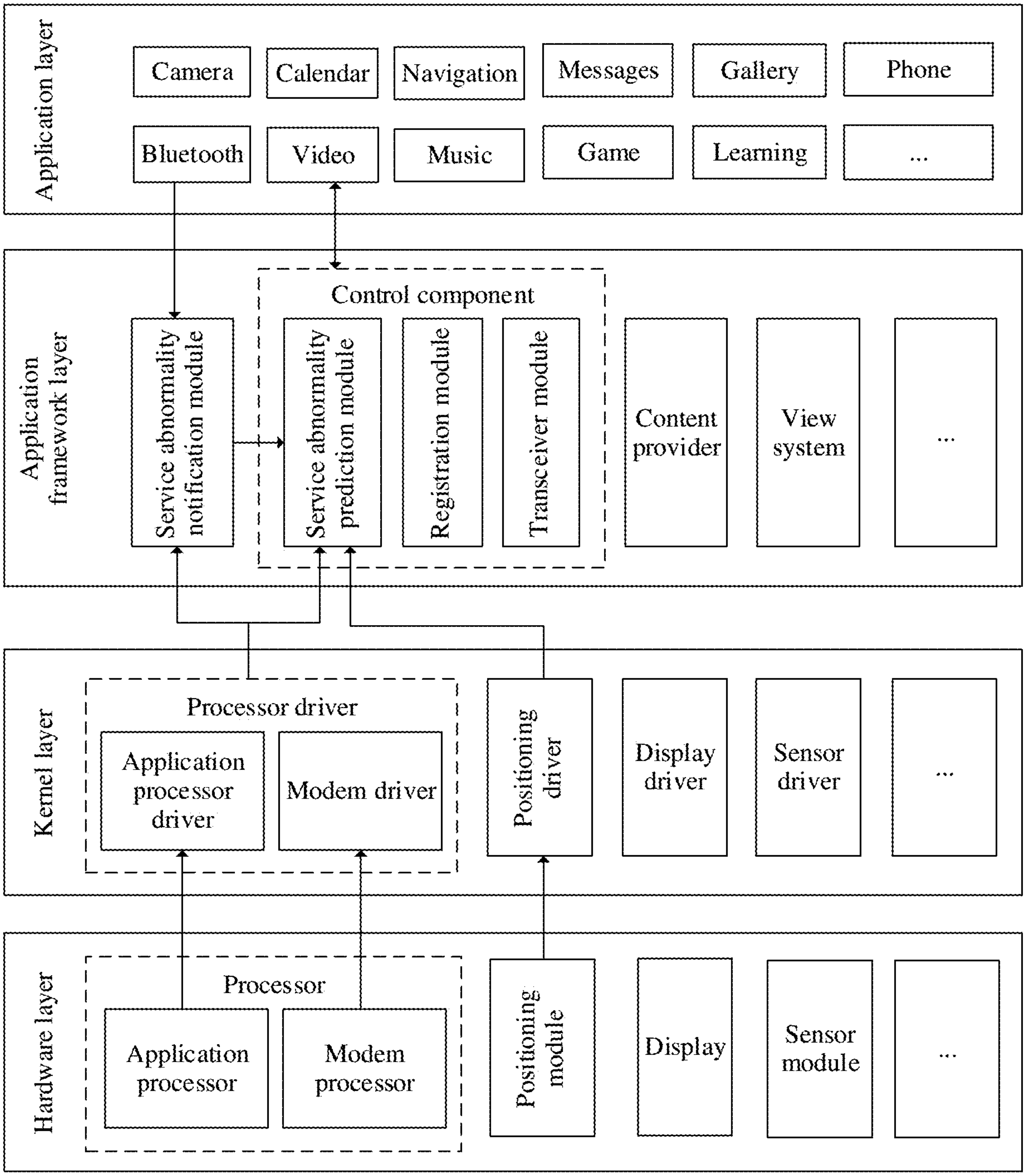

FIG. 4 is a schematic diagram of a structure of the software system of the electronic device 100 according to this embodiment of this application. The software system may be an Android system, or may be an HMS system, or may be a software system such as a Microsoft Windows operating system, an operating system kernel (Linux), or a mobile device operating system (IOS).

In the layered architecture, the software system is divided into several layers, and each layer has a clear role and task. The layers communicate with each other through a software interface. In some embodiments, the software system is divided into four layers: an application layer, an application framework layer, a kernel layer, and a hardware layer from top to bottom.

The application layer may include a series of application packages. As shown in FIG. 4, the application package may include applications such as Camera, Calendar, Navigation, Messages, Gallery, phone, Bluetooth, Video, Music, Game, and Learning. An example in which the video application is a target application is described in FIG. 4. In other words, when being installed or running, the video application sends a registration message to a registration module at the application framework layer. The registration message is used to obtain first indication information from a service abnormality prediction module at the application framework layer. For description of the first indication information, refer to the description of the first indication information in FIG. 1A to FIG. 1M. Details are not described again.

The application framework layer provides an application programming interface (API) and a programming framework for an application at the application layer. The application framework layer includes some predefined functions. As shown in FIG. 4, the application framework layer may include a service abnormality notification module, a control component, a content provider, a view system, and the like. The control component may include the registration module, the service abnormality prediction module, and a transceiver module. For example, if the software system shown in FIG. 4 is an HMS system, the control component may be HMS HiD2D in the HMS.

The service abnormality notification module may be configured to receive a notification message (which may also be referred to as a service abnormality prediction notification event) of a service abnormality and a network service abnormality of an application. For example, the service abnormality notification module may receive a notification message that is sent by an application at the application layer and that indicates that a service of an application is abnormal, for example, QoE is lower than a first QoE level. QoE may be a value obtained through synthesis based on parameters such as a bandwidth and a delay of an application. The service abnormality notification module may also receive a notification message that is reported by a processor driver (for example, a modem driver) at the kernel layer and that indicates a network service abnormality, for example, a network disconnection, falling to a lower network standard, a signal-to-noise ratio, RSRP, or RSRQ being lower than a preset threshold, or a packet loss rate being higher than a preset threshold.

The registration module may be configured to receive the registration message sent by the video application at the application layer, so as to determine the video application as the target application. Alternatively, the registration module may notify the service abnormality prediction module and the transceiver module in the control component that the target application is the video application, so that the service abnormality prediction module and the transceiver module subsequently send the first indication information to the target application.

The service abnormality prediction module may be configured to perform a prediction process based on an abnormal area database and cell information reported by the processor driver (for example, the modem driver) at the kernel layer in real time. For description of the prediction process, refer to embodiments shown in FIG. 8A and FIG. 8B to FIG. 11. Details are not described temporarily. Optionally, the service abnormality prediction module may further perform a prediction process with reference to location information reported in real time by the processor driver (for example, the modem driver) or a positioning driver at the kernel layer. For description of the prediction process, refer to the embodiment shown in FIG. 12. Details are not described temporarily.

The transceiver module may be configured to send the first indication information obtained by the service abnormality prediction module to the video application at the application layer. After receiving the first indication information, the video application may perform a pre-cache operation before the electronic device 100 reaches the abnormal area. For description of the pre-cache operation, refer to descriptions of the pre-cache operation in FIG. 1A to FIG. 1M. Details are not described again.

In some embodiments, the abnormal area database may be obtained by the service abnormality prediction module by performing the learning process. Specifically, the service abnormality prediction module may monitor at least one of the following messages: location information reported by the processor driver (for example, the modem driver) or the positioning driver at the kernel layer, and cell information such as a cell id of a serving cell, a cell id of a neighboring cell, and a signal quality parameter (such as RSRP, RSRQ, a packet loss rate, and a signal-to-noise ratio) of the current cell and/or a signal quality parameter of the neighboring cell that are reported by the processor driver (for example, the modem driver) at the kernel layer, and the notification message, of the service abnormality, reported by the service abnormality notification module. Then, the service abnormality prediction module may identify and collect statistics on the abnormal area based on the foregoing messages, to obtain the abnormal area database. This is not limited thereto. In specific implementation, a cloud server may alternatively obtain a message monitored by the at least one electronic device 100 and perform a learning process, to obtain the abnormal area database. For detailed description of the learning process, refer to embodiments shown in FIG. 6 and FIG. 7. Details are not described temporarily.

It may be understood that when performing the learning process or a prediction process, the service abnormality prediction module may obtain scene information of a user's path route from an application (for example, HUAWEI Assistant) at the application layer. This is not limited thereto. The scene information may alternatively be obtained by another module at the application framework layer, or the scene information may be obtained through automatic identification. This is not limited in this embodiment of this application. The scene information may include but is not limited to a route type (such as a route to a company, a route back home, or a play route), a route start point (such as a home or a company), a route end point, and the like.

It may be understood that the service abnormality prediction module at the application framework layer may be the service abnormality prediction unit 310 in FIG. 3, the service abnormality notification module at the application framework layer, and the processor driver and the positioning driver at the kernel layer may be the report unit 320 in FIG. 3. The video application at the application layer may be the application unit 330 in FIG. 3. The service abnormality notification module may be the third report unit 323 in FIG. 3, the processor driver may be the second report unit 322 in FIG. 3, or may be the first report unit 321, and the positioning driver may be the first report unit 321 in FIG. 3.

A window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history, a bookmark, a phone book, and the like.

The view system includes visual controls such as a control for displaying a text and a control for displaying a picture. The view system may be used to construct an application. A display interface may include one or more views. For example, a display interface including an SMS message notification icon may include a text display view and a picture display view.

The kernel layer is a layer between hardware and software. The kernel layer includes at least the processor driver, the positioning driver, a display driver, and a sensor driver. The hardware layer is a hardware structure of the electronic device 100, and may include at least a processor, a positioning module, a display, and a sensor module. The processor driver may be configured to drive the processor at the hardware layer, the positioning driver may be configured to drive the positioning module at the hardware layer, the display driver may be configured to drive the display at the hardware layer, and the sensor driver may be configured to drive a plurality of sensors at the hardware layer. In some embodiments, the positioning module may alternatively be integrated into the processor, and the positioning driver may alternatively be integrated into the processor driver.

In some embodiments, the processor at the hardware layer may include an application processor and a modem processor, and the processor driver at the kernel layer may also include an application processor driver and a modem driver. The application processor driver at the kernel layer is configured to drive the application processor at the hardware layer, and the modem driver at the kernel layer is configured to drive the modem processor at the hardware layer.

In some embodiments, the software system shown in FIG. 4 is an Android system, and an Android runtime and a system library may be included between the application framework layer and the kernel layer. The Android runtime includes a kernel library and a virtual machine.

The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and abnormality management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

Figure 5:
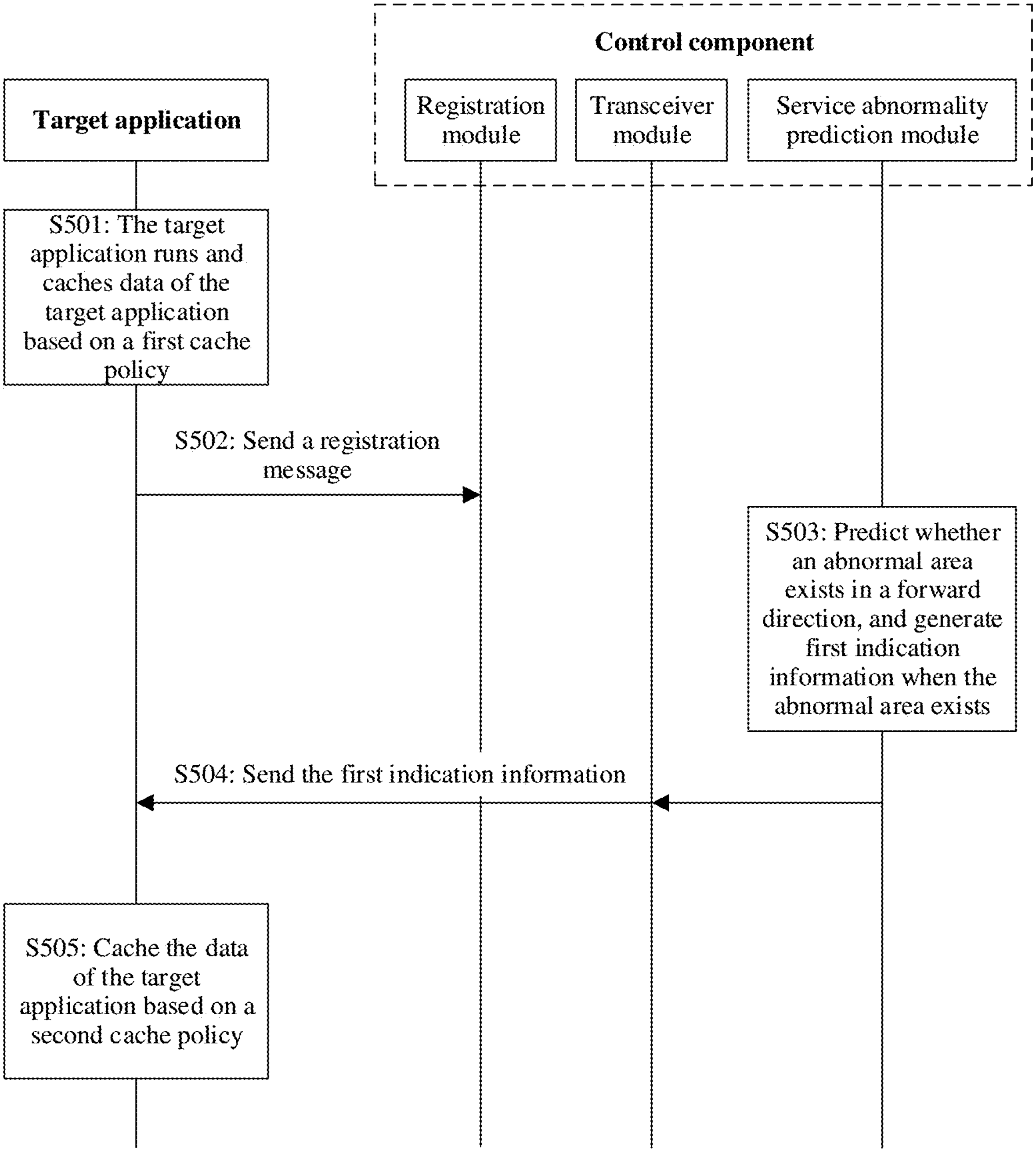
FIG. 5 is a schematic flowchart of a data caching method according to an embodiment of this application.

A data caching method provided in an embodiment of this application is described below with reference to a scenario in which a user passes through an abnormal area (the application scenario shown in FIG. 1A to FIG. 1M). Specifically, as shown in FIG. 5, the method may include but is not limited to the following steps.

S501: A target application at an application layer runs and caches data of the target application based on a first cache policy.

Specifically, the first cache policy includes at least one of the following: downloading the data of the target application at a first download rate; downloading the data of the target application at a first bit rate; downloading the data of the target application at a first resolution; downloading the data of the target application at a first frame rate; requesting the data of the target application by using a first quantity of request times, where the first quantity of request times is a quantity of request times in a unit time; caching first-type data and second-type data, where the first type is different from the second type; downloading the data of the target application at a first sampling frequency; downloading the data of the target application by using a first quantity of sampling bits; and downloading the data of the target application by using a first quantity of sound channels. For a specific example, refer to descriptions of the first cache policy in FIG. 1A to FIG. 1M. Details are not described again.

S502: The target application at the application layer sends a registration message to a registration module at an application framework layer.

Specifically, the target application may send the registration message to the registration module during installation, startup, foreground running, background running, switching from background running to foreground running, or switching from foreground running to background running. The registration message is used to obtain first indication information obtained by a service abnormality prediction module. Optionally, the target application may further send a deregistration message to the registration module during foreground running, background running, switching from background running to foreground running, or switching from foreground running to background running. The deregistration message is used to cancel obtaining of the first indication information obtained by the service abnormality prediction module. For example, the target application sends the registration message to the registration module during switching from background running to foreground running, and sends the deregistration message to the registration module during switching from foreground running to background running.

Specifically, the registration message is used to register a first notification event. For example, after receiving the registration message sent by a video application, the registration module determines the video application as a target application on which the first notification event is registered, and notifies the service abnormality prediction module and a transceiver module in a control component. Therefore, after generating the first indication information, the service abnormality prediction module sends, via the transceiver module, the first indication information to the video application on which the first notification event is registered (that is, performs S504). The deregistration message is used to cancel registration of a first notification event. For example, after receiving the deregistration message sent by a video application, the registration module determines the video application as a target application on which the first notification event is not registered, and notifies the service abnormality prediction module and a transceiver module in a control component. Therefore, after generating the first indication information, the service abnormality prediction module does not send the first indication information to the video application via the transceiver module.

For example, during installation or running of the video application, a function: registered signal quality prediction registeredSignalQualityPrediction( ) at the application framework layer is invoked, to send the registration message to the registration module through the function.

S503: The service abnormality prediction module predicts whether an abnormal area exists in a forward direction of an electronic device, and generates the first indication information when the abnormal area exists.

Specifically, the abnormal area is at least one of the following areas: an area whose signal quality is lower than a preset threshold; a network-disconnected area; a standard falling area, where the standard falling may be changing from a first network standard (for example, 5G) to a second network standard (for example, 2G) lower than the first network standard; and an area whose quality of experience QoE is lower than a first QoE level. A lower QoE level indicates poorer user experience. For example, there are three QoE levels: 0, 1, and 2. 0 indicates poor user experience, 1 indicates average user experience, and 2 indicates good user experience. The first QoE level is 1, and the abnormal area is an area whose QoE level is 0.

For an area, such as the ground, in which location information can be obtained, the service abnormality prediction module may perform a prediction process based on an abnormal area database, cell information obtained in real time, and location information, to obtain the first indication information. For details of the prediction process, refer to embodiments shown in FIG. 8A and FIG. 8B to FIG. 11. Details are not described temporarily. For an area, such as a subway or a tunnel, in which location information cannot be obtained the service abnormality prediction module may perform a prediction process based on an abnormal area database and cell information obtained in real time, to obtain the first indication information. For details of the prediction process, refer to the embodiment shown in FIG. 12. Details are not described temporarily. For descriptions of the abnormal area and the first indication information, refer to descriptions of the first indication information in FIG. 1A to FIG. 1M. Details are not described again.

In some embodiments, a first location exists between the abnormal area and a current location, no other cell exists between the current location and the first location, and the first location is a location at which the control component sends the first indication information, or the abnormal area is an area whose distance from the current location is within a first distance range. The first location is, for example, the normal point C in FIG. 1A to FIG. 1M, or a preset point in FIG. 6 and FIG. 9 to FIG. 11.

In some embodiments, when duration, of entering the abnormal area from the current location of the electronic device, obtained through prediction is within a first preset time range, the control component sends the first indication information to the target application via the transceiver module. For descriptions of the first preset time range, refer to descriptions of the first preset time range in FIG. 1A to FIG. 1M. Details are not described again.

S504: The service abnormality prediction module sends the first indication information to the target application in a form of a broadcast message via the transceiver module.

For example, the transceiver module may send the first indication information to the video application through a function: send broadcast sendBroadcast( ) at the application framework layer.

Specifically, the first indication information may include a type, and optionally, may further include first time information $t_1$, and optionally, may further include second time information $t_2$, and optionally, may further include third time information $t_3$. If the type is a first value, it indicates that the abnormal area exists. If the type is a second value, it indicates that a previously sent broadcast message is invalid. $t_1$ may be a moment of entering the abnormal area, or may be duration from the current location to entering the abnormal area. $t_2$ may be a moment of leaving the abnormal area, or may be duration from the current location to leaving the abnormal area. $t_3$ may be duration from entering the abnormal area to leaving the abnormal area, namely, duration of the abnormal area. For examples of parameters included in the first indication information, refer to the following Table 1.

TABLE 1

First indication information

| Parameter name | Parameter type | Description |
|---|---|---|
| type | Integer (integer, int) | The value 0 indicates that a previously sent broadcast message is invalid, and $t_1$ and $t_2$ are invalid; and<br>the value 1 indicates that an abnormal area exists, and $t_1$ and $t_2$ are valid. |
| $t_1$ | int | Predicted duration of entering an abnormal area from current time, the unit is second, and a value range is [0, 120]. |
| $t_2$ | int | Predicted duration from entering an abnormal area to leaving the abnormal area, the unit is second, and a value range is [0, 300]. |

type=1 indicates that the type in FIG. 1A to FIG. 1M is the first value and the abnormal area exists. type=0 indicates that the type in FIG. 1A to FIG. 1M and FIG. 2 is the second value, and type=0 indicates that the previously sent broadcast message indicating that the abnormal area exists is invalid. Alternatively, the first indication information may include only $t_2$, or include $t_2$ and the type, or include only $t_1$, or include $t_1$ and the type, or include $t_1$ and $t_2$, or include $t_1$, $t_2$, and the type. This is not limited in this embodiment of this application.

S505: After receiving the first indication information, the target application caches data of the target application based on a second cache policy.

Specifically, when receiving the first indication information in which the type is the first value, the target application performs a pre-cache operation, that is, caches the data of the target application based on the second cache policy. The second cache policy includes at least one of the following: downloading the data of the target application at a second download rate, where the second download rate is greater than the first download rate; downloading the data of the target application at a second bit rate, where the second bit rate is less than the first bit rate; downloading the data of the target application at a second resolution, where the second resolution is less than the first resolution; downloading the data of the target application at a second frame rate, where the second frame rate is less than the first frame rate; requesting the data of the target application by using a second quantity of request times, where the second quantity of request times is a quantity of request times in a unit time, and the second quantity of request times is greater than the first quantity of request times; caching the first-type data but skipping caching the second-type data; downloading the data of the target application at a second sampling frequency, where the second sampling frequency is less than the first sampling frequency; downloading the data of the target application by using a second quantity of sampling bits, where the second quantity of sampling bits is less than the first quantity of sampling bits; and downloading the data of the target application by using a second quantity of sound channels, where the second quantity of sound channels is less than the first quantity of sound channels. For an example of the second cache policy and descriptions of the pre-cache operation, refer to the descriptions of the second cache policy and the pre-cache operation in FIG. 1A to FIG. 1M.

Specifically, in response to receiving the first indication information, the target application caches the data of the target application based on the second cache policy. Optionally, within second preset duration in which the first indication information is received, the step of caching the data of the target application based on the second cache policy is started. The second preset duration may be duration less than 1 second, such as 5 milliseconds, 10 milliseconds, or 30 milliseconds, or may be 1 second, 3 seconds, or 5 seconds. The second preset duration is the preset execution duration in FIG. 1A to FIG. 1M.

In some embodiments, the target application performs the pre-cache operation within the first time $t_1$ after receiving the first indication information. This is not limited thereto. Alternatively, the target application may perform the pre-cache operation within $0.5\times t_1$ after receiving the first indication information. This is not limited in this embodiment of this application.

In some embodiments, after receiving the first indication information, the target application caches, based on the second cache policy, the data of the target application whose play duration is third preset duration (namely, the duration of the abnormal area), so as to ensure that the user can normally use the target application when passing through the abnormal area. The third preset duration is duration (namely, a difference between $t_1$ and $t_2$) obtained based on the first time information $t_1$ and the second time information $t_2$, or the third preset duration is duration indicated by the third duration information.

The following shows an example of a process in which different types of target applications perform a pre-cache operation.

For example, a target application is a video application. To ensure that a user can normally use the video application in an abnormal area, for example, normally watch the video displayed in the user interface no in FIG. 1A to FIG. 1M, the video application determines, based on first indication information, to download video data whose duration is $(t_1+t_2)$ within $t_1$. An example of an expression of a data amount $D_1$ of the video data whose duration is $(t_1+t_2)$ is as follows:

$$D_1=(t_1+t_2)\times F\times I-C$$

F is a frame rate of the video data, I is a resolution of the video data, and C is a data amount of a currently cached video.

Correspondingly, an example of a rate $R_1$ at which the video application caches the video data is as follows:

$$R_1=\frac{D_1}{t_1}=\frac{(t_1+t_2)\times F\times I-C}{t_1}$$

Therefore, the pre-cache operation may include at least one of the following: increasing $R_1$, decreasing I, and decreasing F. Correspondingly, a process in which the video application caches the video data may meet at least one of the following: $R_1$ is greater than a download rate before $t_1$, I is less than a resolution of cached content before $t_1$, and F is less than a frame rate of cached content before $t_1$. That $R_1$ is greater than the download rate before $t_1$ may be specifically as follows: A frequency of sending a request message to a server of the target application is greater than a frequency before $t_1$, and/or an amount of data requested to be downloaded in a single request message is greater than an amount of data before $t_1$.

For example, a target application is an audio application. To ensure that a user can normally use the audio application in an abnormal area, the audio application may determine, based on first indication information, to download audio data whose duration is $t_2$ within $t_1$. An example of an expression of a data amount $D_2$ of the audio data whose duration is $(t_1+t_2)$ is as follows:

$$D_2=t_2\times H\times B\times S-Q$$

H is a sampling frequency of the audio data, B is a quantity of sampling bits of the audio data, S is a quantity of channels (for example, 8) of the audio data, and Q is a data amount of currently cached audio.

Correspondingly, an example of a rate $R_2$ at which the audio application caches the audio data is as follows:

$$R_2 = \frac{D_2}{t_1} = \frac{t_2 \times H \times B \times S - Q}{t_1}$$

Therefore, the pre-cache operation may include at least one of the following: increasing $R_2$, decreasing H, decreasing B, and decreasing S. Correspondingly, a process in which the audio application caches the audio data may meet at least one of the following: $R_2$ is greater than a download rate before $t_1$, H is less than a sampling frequency of cached content before $tt_1$, B is less than a quantity of sampling bits of the cached content before $t_1$, and S is less than a quantity of sound channels of the cached content before $t_1$.

For example, a target application is a reading application. To ensure that a user can normally use the reading application in an abnormal area, for example, normally read a document, the reading application may determine, within $t_1$ based on first indication information, to download an amount $D_3$ of data read by the user within duration $(t_1+t_2)$. $D_3$ may be determined by the reading application based on a reading habit of the user, and the reading habit is, for example, that the user reads 0.3 pages of a document per second. Therefore, the pre-cache operation may be increasing a rate of downloading $D_3$ within $t_1$.

For example, a target application is a news application, and a user interface of the news application may include a text and a picture. To ensure that a user can normally use the news application in an abnormal area, the news application may determine, within $t_1$ based on first indication information, to download an amount $D_4$ of data viewed by the user within duration $(t_1+t_2)$. $D_4$ may be determined by the news application based on a habit of viewing news by the user. For example, if 0.2 pieces of news are viewed per second, and news that does not include a picture is preferred to be viewed. The pre-cache operation may include at least one of the following: increasing a download rate, and caching only a text but not caching a picture.

For example, a target application is a game application. To ensure that a user can normally use the game application in an abnormal area, the game application may determine, within $t_1$ based on the first indication information, to download an amount $D_5$ of data used by the user within duration $(t_1+t_2)$. Data cached by an online game application is, for example, but is not limited to, data that can be cached in advance, such as game mall data and friend data. Data cached by the game application may be determined by the game application based on a habit of using the game application by the user. For example, the user prefers to use a game mall instead of viewing friend data. The pre-cache operation may be caching only game mall data but skipping caching friend data.

In the method shown in FIG. 5, the target application caches the data of the target application based on different cache policies before and after receiving the first indication information. Use duration of an amount of data downloaded in a unit time based on the first cache policy before the first indication information is received is less than use duration of an amount of data downloaded in a unit time based on the second cache policy after the first indication information is received. In other words, after receiving the first indication information used to indicate that the abnormal area exists in the forward direction, the target application caches the data based on the second cache policy, so as to increase use duration of the amount of the data downloaded in the unit time, so that the user can normally use the target application as much as possible when passing through the abnormal area. This avoids service freezing and improves user experience.

In some embodiments, the electronic device 100 may perform the learning process. The following describes the foregoing learning process with reference to an application scenario shown in FIG. 6 and a schematic flowchart shown in FIG. 7.

Figure 6:
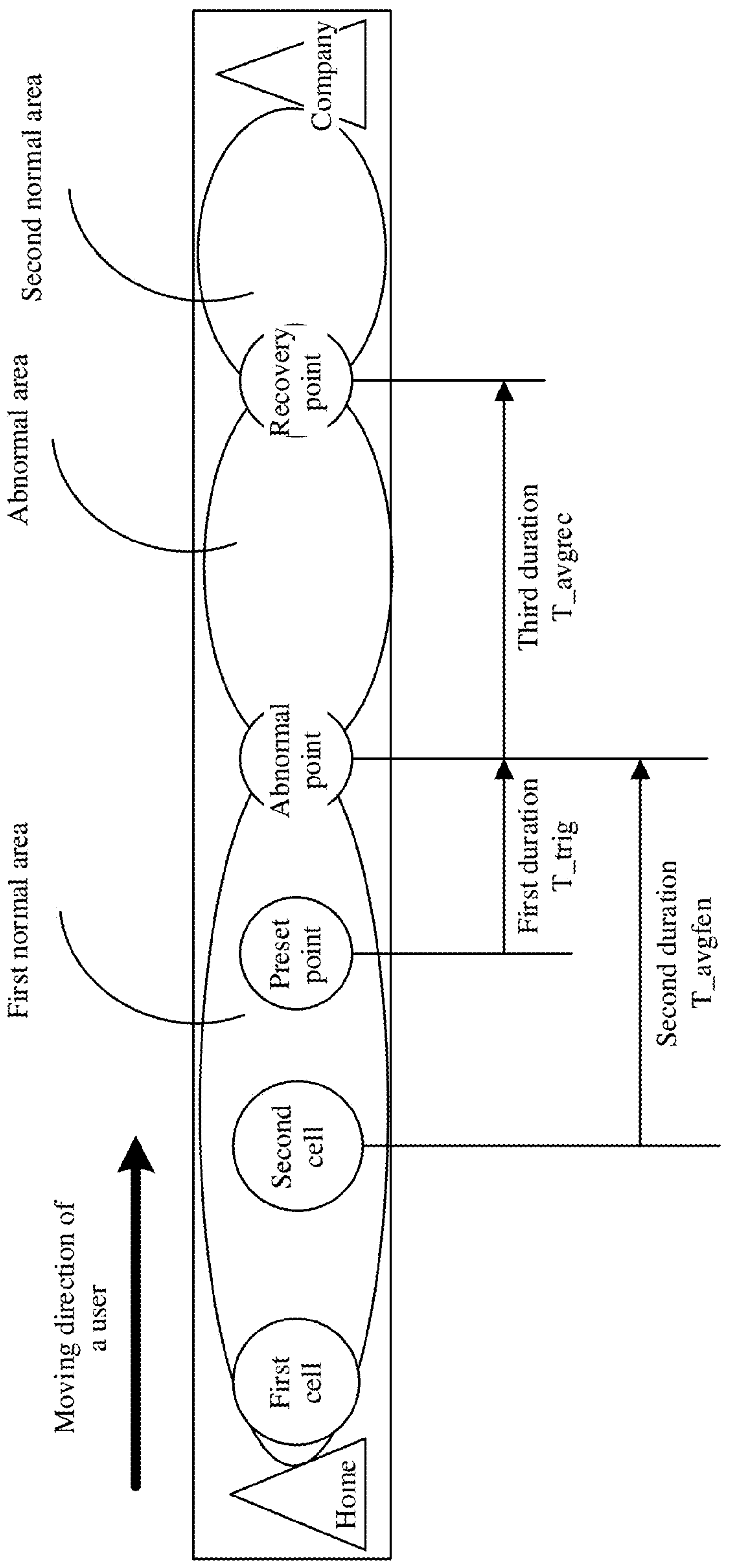
FIG. 6 is a schematic diagram of another application scenario according to an embodiment of this application.

FIG. 6 is a schematic diagram of another application scenario in which a user passes through an abnormal area according to an embodiment of this application. The application scenario shown in FIG. 6 is similar to the application scenario shown in FIG. 1A to FIG. 1M. For details, refer to descriptions of FIG. 1A to FIG. 1M. An example in which a first cell and a second cell exist between a home and an abnormal point is described in FIG. 6. The first cell and the second cell may be a single cell, or may be a cell group including a plurality of cells (for example, neighboring cells). This is not limited thereto. In specific implementation, there may be more or fewer cells.

In some embodiments, as shown in FIG. 6, a preset point (for example, the normal point C in FIG. 1A to FIG. 1M and the first location in FIG. 5) exists between the second cell and an abnormal point. The preset point is a preset location at which a control component sends first indication information to a target application. It may also be understood as a location at which the target application starts to perform a pre-cache operation. Preset duration that an electronic device 100 is from the preset point to the abnormal point is first duration T_trig. The first duration may be any duration in the first preset time range shown in FIG. 3, for example, 30 seconds. For details, refer to the description of the first preset time range in FIG. 3. This is not limited thereto. T_trig may also be equal to duration from the second cell to the abnormal point, that is, the preset point is any point in the second cell. T_trig may also be equal to duration from the first cell to the abnormal point, that is, the preset point is any point in the first cell. T_trig may also be less than duration of reaching the abnormal point from the second cell, but greater than duration of reaching the abnormal point from the first cell, that is, the preset point may be between the first cell and the second cell. A specific moment at which the electronic device performs the pre-cache operation is not limited in this embodiment of this application.

Figure 7:
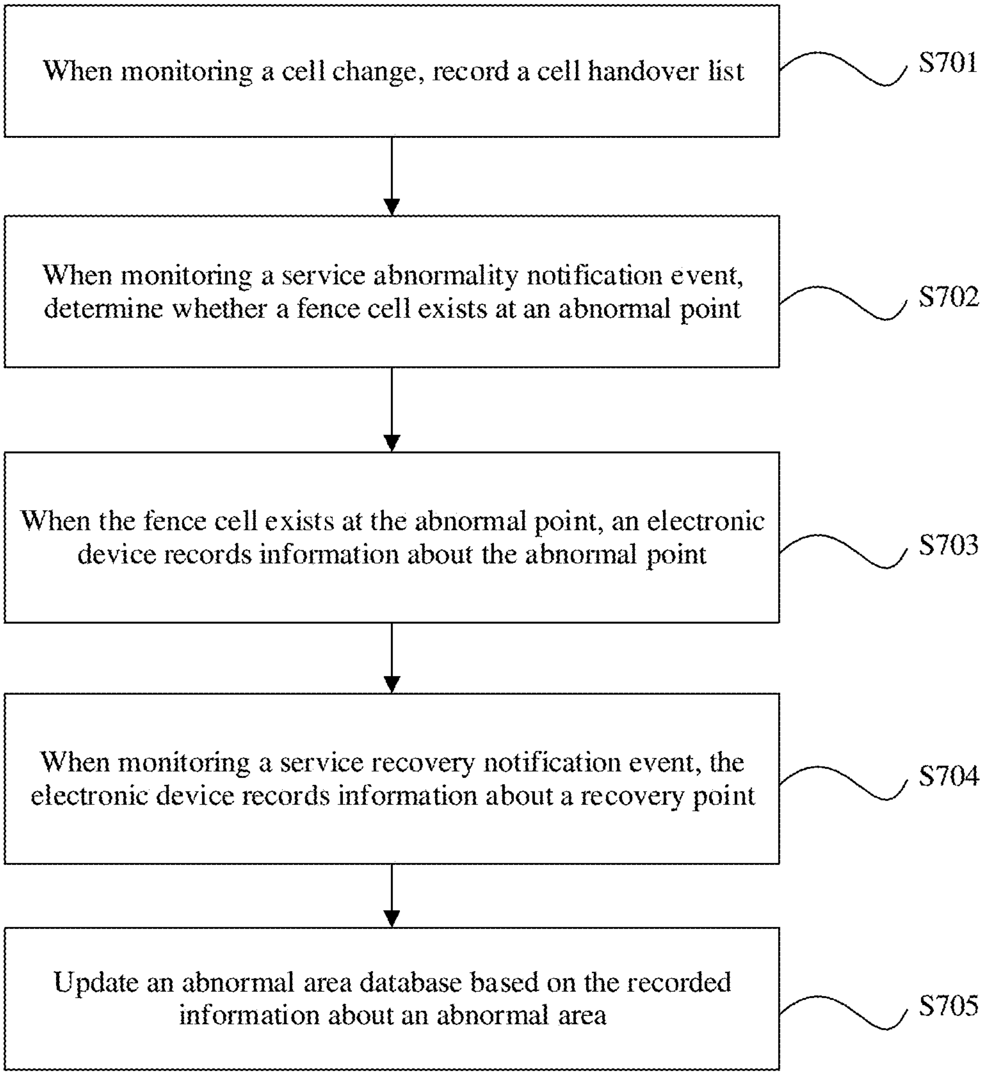
FIG. 7 is a schematic flowchart of a learning process according to an embodiment of this application.

FIG. 7 is a schematic flowchart of a learning process according to an embodiment of this application. The learning process may include but is not limited to the following steps.

S701: When monitoring a cell change, an electronic device records a cell handover list.

Specifically, a cell may include a serving cell of the electronic device 100, and optionally, may further include a neighboring cell. Optionally, the cell may further include signal quality parameters (such as RSRP, RSRQ, packet loss rates, and signal-to-noise ratios) of the serving cell and the neighboring cell. Correspondingly, the cell handover list recorded by the electronic device may include an identifier of a serving cell, optionally, may further include an identifier of a neighboring cell, and optionally, may further include the signal quality parameters of the serving cell and the neighboring cell.

For example, as shown in FIG. 6, in a process in which a user moves from a home to a company, the electronic device 100 monitors a message: whether the cell changes, cell information, a service abnormality notification event, and a service recovery notification event. In a process in which the user moves from the home to the abnormal point, the electronic device 100 monitors the cell change that the first cell changes to the second cell, and records the cell handover list with the first cell and the second cell. Optionally, the electronic device 100 may further record information about the first cell and the second cell.

However, it should be noted that the cell handover list may record information of a cell without ping-pong handover, namely, cell information that appears for the first time. For example, in a process in which the user moves from the first cell to the second cell, if the cell change is monitored as from the first cell to the second cell and then to the first cell, the recorded cell handover list is with the first cell and the second cell.

S702: When monitoring the service abnormality notification event, the electronic device determines whether a fence cell exists at an abnormal point.

Specifically, the service abnormality notification event may include but is not limited to: a network disconnection, falling to a lower network standard, a signal-to-noise ratio, RSRP, or RSRQ being less than a preset threshold, QoE being less than a first QoE level, a packet loss rate being greater than a preset threshold, and the like. When monitoring the service abnormality notification event, the electronic device 100 considers that a current location is the abnormal point.

Specifically, the fence cell may be one or more cells, and is used to measure duration of reaching the abnormal point and determine a path route, so that the electronic device 100 subsequently performs corresponding prediction processes for different routes. In this embodiment of this application, descriptions are provided by using an example in which two cells are used as the fence cells. It may be understood that because one line is determined by two points, accuracy of determining a current route by using the two fence cells is higher. There is no need to record excessive cell information, and this reduces a storage pressure and a processing pressure of the electronic device 100. A fence cell that is farther away from the abnormal point or a preset point is referred to as a first fence cell, and a fence cell that is closer to the abnormal point or a preset point is referred to as a second fence cell.

The electronic device may determine, based on the cell handover list recorded in S701, whether at least two cells exist outside the abnormal point or the preset point. When the two cells exist, two cells closest to the abnormal point or the preset point are determined as the fence cells. For example, as shown in FIG. 6, when the user moves from the home to the abnormal point, the user passes through the first cell and the second cell, and the electronic device 100 records information about the first cell and the second cell in the cell handover list. When the user reaches the abnormal point, the electronic device 100 monitors the service abnormal notification event. Then, the electronic device 100 may determine, based on the cell handover list, that the first cell and the second cell exist outside the abnormal point, and therefore determine the first cell and the second cell as the fence cells of the abnormal point. If the cells do not exist, information about an abnormal area is not recorded. For example, the abnormal point is adjacent to a start point of the route (for example, the home in FIG. 6), and the user reaches the abnormal point before passing through another cell when leaving. Therefore, the information about the abnormal area is not recorded. The information about the abnormal area may include information about the abnormal point and information about a recovery point.

S703: When the fence cell exists at the abnormal point, the electronic device records information about the abnormal point.

Specifically, the information about the abnormal point may include but is not limited to: information about the fence cell, duration of reaching the abnormal point from the first fence cell, duration of reaching the abnormal point from the second fence cell, a service abnormality type, and a quantity of service abnormality occurrence times. Optionally, the information about the abnormal area may further include location information about the abnormal point. The service abnormality type and the quantity of service abnormality occurrence times may be obtained from the monitored service abnormality notification event when the electronic device passes through the abnormal area. For example, the quantity of service abnormality occurrence times is a quantity of service abnormal notification events received in a process from entering the abnormality area to leaving the abnormal area.

For example, as shown in FIG. 6, when the user passes through the abnormal area, the electronic device 100 records the information about the abnormal point: identity information of the second cell, a signal quality parameter, and duration (second duration T_avgfen) from the second cell to the abnormal point, and the service abnormality type and the quantity of service abnormality occurrence times in the service abnormality notification event monitored when the abnormal area is passed through. If the route shown in FIG. 6 is a route on the ground or the like on which location information can be obtained, the information about the abnormal point recorded by the electronic device 100 may further include longitude and latitude information, direction information, and speed information about the abnormal point.

S704: When monitoring the service recovery notification event, the electronic device records information about the recovery point.

Specifically, the information about the recovery point may include but is not limited to duration from the abnormal point to the recovery point, and optionally, may further include location information about the recovery point. For example, as shown in FIG. 6, when the user reaches the recovery point, the electronic device 100 monitors the service recovery notification event, and the electronic device 100 records the information about the recovery point: duration from the abnormal point to the recovery point (third duration T_avgrec). If the route shown in FIG. 6 is the route on the ground or the like on which the location information can be obtained, the information about the recovery point recorded by the electronic device 100 may further include latitude and longitude information, direction information, and speed information about the recovery point.

S705: The electronic device updates an abnormal area database based on the recorded information about the abnormal area.

Specifically, the information about the abnormal area includes the information about a start point (namely, the abnormal point) in the abnormal area and information about an end point (namely, the recovery point) of the abnormal area. The electronic device 100 may update an original record in the abnormal area database or add a new record to the database based on the recorded information about the abnormal area. It is assumed that a record of the route (namely, a route to a company) from the home to the company of the user exists in the abnormal area database. An example of the record is shown in Table 2 below.

TABLE 2

| Record of the abnormal area on the route to the company | | |
|---|---|---|
| Field name | Field description | Value |
| weakPointId | The value, as a sequence number of the abnormal area, is a positive integer. | 1 |
| scene | The value, as scene information, is an integer. | 0 |
| weakType | The value, as the service abnormality type, is an integer. | 0 |
| weakLoc | A longitude, a latitude, a speed, and a direction of the abnormal point | 116.2, 40.6, 17.79, 23 |
| recoverLoc | A longitude, a latitude, a speed, and a direction of the recovery point | 116.3, 40.2, 18.6, 25 |
| firstFenceCell | Identity (cell id) of the first fence cell | 26362929 |
| secondFenceCell | Identity (cell id) of the second fence cell | 26571825 |
| count | Quantity of times of passing through the abnormal area | 3 |
| timeStamp | Timestamp when the abnormal area was entered last time | 1599102391 |
| historyTimeFence2Weak | Duration from the second fence cell to the abnormal point in the latest five times | 57, 47, 48, 0, 0 |
| historyTimeWeak2Recover | Duration from the abnormal point to the recovery point in the last five times | 34, 33, 32, 0, 0 |
| avgTimeFenceToWeak | Average duration from the second fence cell to the abnormal point | 49 |
| avgTimeWeakToRecover | Average duration from the abnormal point to the recovery point | 33 |

scene=0 indicates that the route type is a route to a company. For example, scene=1 indicates that the route type is a route back home, and scene=2 indicates that the route type is a play route. weakType=0 indicates that the service abnormality type is network disconnection. For example, weakType=1 indicates that the service abnormality type is falling to a lower network standard, weakType=2 indicates that the service abnormality type is poor signal quality (for example, RSRP and RSRQ each are less than a preset threshold), and weakType=3 indicates that QoE is lower than a first QoE level.

weakLoc="116.2, 40.6, 17.79, 23" indicates that the longitude of the abnormal point is 116.2, the latitude is 40.6, the speed is 17.79 (for example, unit: km/h), and a direction angle is 23 degrees north-east. recoverLoc="116.3, 40.2, 18.6, 25" indicates that the longitude of the recovery point is 116.3, the latitude is 40.2, the speed is 18.6 (for example, unit: km/h), and a direction angle is 25 degrees north-east. A representation manner such as precision, a unit, and a value of the location information is not limited in this embodiment of this application.

firstFenceCell is the cell id of the first fence cell, secondFenceCell is the cell id of the second fence cell, and a cell id is a unique identity. timestamp="1599102391" indicates that the last time when the abnormal area is entered is "2020-09-0311:06:30".

historyTimeFence2Weak="57, 47, 48, 0, 0" indicates that duration from the second fence cell to the abnormal point in last three historical records are 57 seconds, 47 seconds, and 48 seconds, respectively. historyTimeWeak2Recover="34, 33, 32, 0, 0" indicates that duration from the abnormal point to the recovery point in last three historical records are 34 seconds, 33 seconds, and 32 seconds respectively. "o" indicates that the abnormal area is not passed through. Therefore, the abnormal area may be passed through for three times based on the foregoing two historical records, and corresponding count="3".

avgTimeFenceToWeak="49" indicates that the average duration from the second fence cell to the abnormal point is 49 seconds. In some embodiments, avgTimeFenceToWeak may be obtained by averaging values of historyTimeFence2Weak. A specific calculation process is shown as follows:

$$avgTimeFenceToWeak = \frac{57 + 47 + 48}{3} = 49$$

Similarly, avgTimeWeakToRecover="33" indicates that the average duration from the abnormal point to the recovery point is 33 seconds. In some embodiments, avgTimeWeakToRecover may be obtained by averaging values of historyTimeWeak2Recover. A specific calculation process is as follows:

$$avgTimeWeakToRecover = \frac{34 + 33 + 32}{3} = 33$$

In specific implementation, avgTimeFenceToWeak may also be obtained by removing a maximum value and a minimum value from the values of historyTimeFence2Weak and then performing average, and avgTimeWeakToRecover may also be obtained by removing a maximum value and a minimum value from the values of historyTimeWeak2Recove and then performing average. This is not limited in this embodiment of this application.

In some embodiments, the electronic device 100 does not pass through the area, such as the ground, in which the location information can be obtained, but an area, such as a subway or a tunnel, in which location information cannot be obtained. In this case, recoverLoc="0, 0, 0, 0", and weakLoc="0, 0, 0, 0" in a record of the abnormal area obtained through learning.

This is not limited to the case listed in Table 2. In specific implementation, characteristic information of the abnormal area may further include duration for reaching the abnormal point from the first fence cell, a timestamp for leaving the recovery point for the last time, and the like. This is not limited in this embodiment of this application. Descriptions are provided below by using an example in which the information about the abnormal area included in the abnormal area database is the information shown in Table 2.

Based on Table 2, assuming that the electronic device 100 passes the abnormal area on the route to the company for the fourth time, the electronic device 100 may update the record shown in Table 2 based on the information about the abnormal area on the route to the company recorded this time, or add a record of the abnormal area to the database. Specific examples are as follows.

Example 1: Assuming that scene, weakLoc, recoverLoc, firstFenceCell, and secondFenceCell that are recorded when the electronic device 100 passes the abnormal area on the route to the company for the fourth time remain unchanged, count may be updated to 4, and timeStamp may be updated to a timestamp at which the service abnormality notification event is detected, that is, a timestamp at which the abnormal point is reached this time. Assuming that recorded duration from the second cell to the abnormal point is T_fen=50, historyTimeFence2Weak may be updated to "57, 47, 48, 50, 50", and avgTimeFenceToWeak may be updated. An update process is as follows:

First, calculate an average value of updated historyTimeFence2Weak. A calculation process is as follows:

$$\text{t\_newfence} = \frac{57 + 47 + 48 + 50}{4} = 50.5$$

Then, obtain updated avgTimeFenceToWeak. A calculation process is as follows:

$$\text{avgTimeFenceToWeak} = (1-a) \times \text{avgTimeFenceToWeak} + a \times t\text{\_newfence}$$

A value range of a is [0,1], for example, a=0.6.

Processes of updating historyTimeWeak2Recover and avgTimeWeakToRecover are similar to those of updating historyTimeFence2Weak and avgTimeFenceToWeak. A calculation process of updated avgTimeWeakToRecover is as follows:

$$\text{avgTimeWeakToRecover} = (1-b) \times \text{avgTimeWeakToRecover} + b \times t\text{\_newrecover}$$

t_newrecover is obtained by averaging updated values of historyTimeWeak2Recove. A value range of b is the same as that of a. a and b can be the same or different.

In specific implementation, when the average value of updated historyTimeFence2Weak or the average value of updated historyTimeFence2Weak is calculated, a maximum value and a minimum value may be removed first, and then average is performed. This is not limited in this embodiment of this application.

Example 2: Assuming that when the electronic device 100 passes through the abnormal area on the route to the company for the fourth time, firstFenceCell and secondFenceCell obtained through detection remain unchanged, and a difference between a location (namely, the abnormal point) at which a service abnormality prediction notification event is detected and weakLoc in Table 2 is less than a preset threshold, for example, if the distance is less than 100 meters, the electronic device 100 may obtain updated weakLoc based on the abnormal point detected this time and the weakLoc in Table 2, for example, obtain a middle location of the two locations.

Similarly, assuming that when the electronic device 100 passes through the abnormal area on the route to the company for the fourth time, firstFenceCell and secondFenceCell obtained through detection remain unchanged, and a difference between the location (namely, the recovery point) at which the service abnormality prediction notification event is detected and recoverLoc in Table 2 is less than a preset threshold, for example, if the distance is less than 100 meters, the electronic device 100 may obtain updated recoverLoc based on a recovery point detected this time and recoverLoc in Table 2, for example, obtain a middle location of the two locations.

It may be understood that manners of updating weakLoc and updating recoverLoc may be the same or may be different.

Example 3: Assuming that when the electronic device 100 passes through the abnormal area on the route to the company for the fourth time, firstFenceCell and secondFenceCell obtained through detection remain unchanged, and a difference between a location (namely, the abnormal point) at which a service abnormality prediction notification event is detected and weakLoc in Table 2 is greater than a preset threshold, for example, if the distance is greater than 100 meters, the electronic device 100 may re-add, to the database, a record of the abnormal area detected this time.

Similarly, assuming that when the electronic device 100 passes through the abnormal area on the route to the company for the fourth time, firstFenceCell and secondFenceCell obtained through detection remain unchanged, and a difference between a location (namely, a recovery point) at which the service abnormality prediction notification event is detected and recoverLoc in Table 2 is greater than a preset threshold, for example, if the distance is greater than 100 meters, the electronic device 100 may re-add, to the database, the record of the abnormal area detected this time.

It may be understood that the preset threshold corresponding to weakLoc may be the same as or different from the preset threshold corresponding to recoverLoc.

Example 4: Assuming that when the electronic device 100 passes through the abnormal area on the route to the company for the fourth time, it is detected that a cell id of either of the two cells closest to the abnormal point is not firstFenceCell or secondFenceCell in Table 2, the electronic device 100 may re-add, to the database, a record of the abnormal area detected this time.

Example 5: The electronic device 100 may periodically delete, from the abnormal area database, a record whose timeStamp is less than a preset threshold, for example, delete, every other month, a record that is of the abnormal area and that is not updated in three months.

This is not limited to the examples listed above. In specific implementation, assuming that when the electronic device 100 passes through the abnormal area on the route to the company for the fourth time, a detected scene (for example, the play route) is not the scene (namely, the route to the company) in Table 2, the electronic device 100 may re-add, to the database, a record of the abnormal area detected this time. This is not limited in this embodiment of this application.

This is not limited to the learning process shown in FIG. 7. In specific implementation, the electronic device may not record the cell handover list or determine the fence cell. The electronic device may obtain location information of the electronic device when detecting the service abnormality notification event. Optionally, the electronic device may further obtain at least one piece of the following information: time of entering the abnormal area, time of leaving the abnormal area, and duration of the abnormal area, and then update the abnormal area database based on the obtained location information and at least one piece of the foregoing information. This is not limited in this embodiment of this application.

It may be understood that the electronic device 100 may perform the method shown in FIG. 7 each time passing through the same route, so as to obtain the authentic and reliable information about the abnormal area. This facilitates performing a subsequent prediction process and improves accuracy of first indication information.

The following describes the prediction process. For the prediction process performed by the electronic device 100 in the area, such as the ground, in which the location information can be obtained, refer to embodiments shown in FIG. 8A and FIG. 8B to FIG. 11. For the prediction process performed by the electronic device 100 in the area, such as the subway or the tunnel, in which the location information cannot be obtained, refer to an embodiment shown in FIG. 12.

Figure 8A:
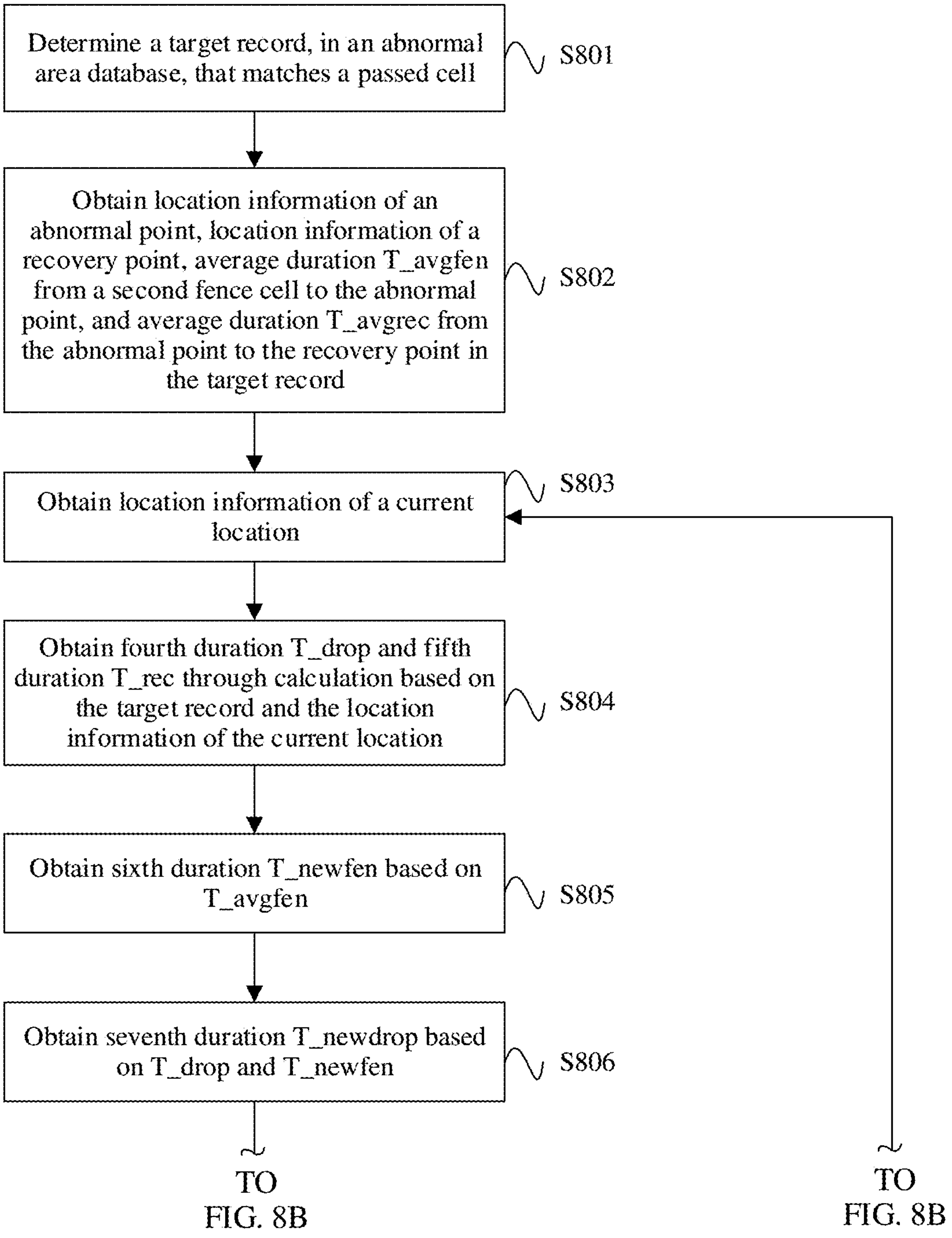
FIG. 8A and FIG. 8B are a schematic flowchart of a prediction process according to an embodiment of this application.
Figure 8B:
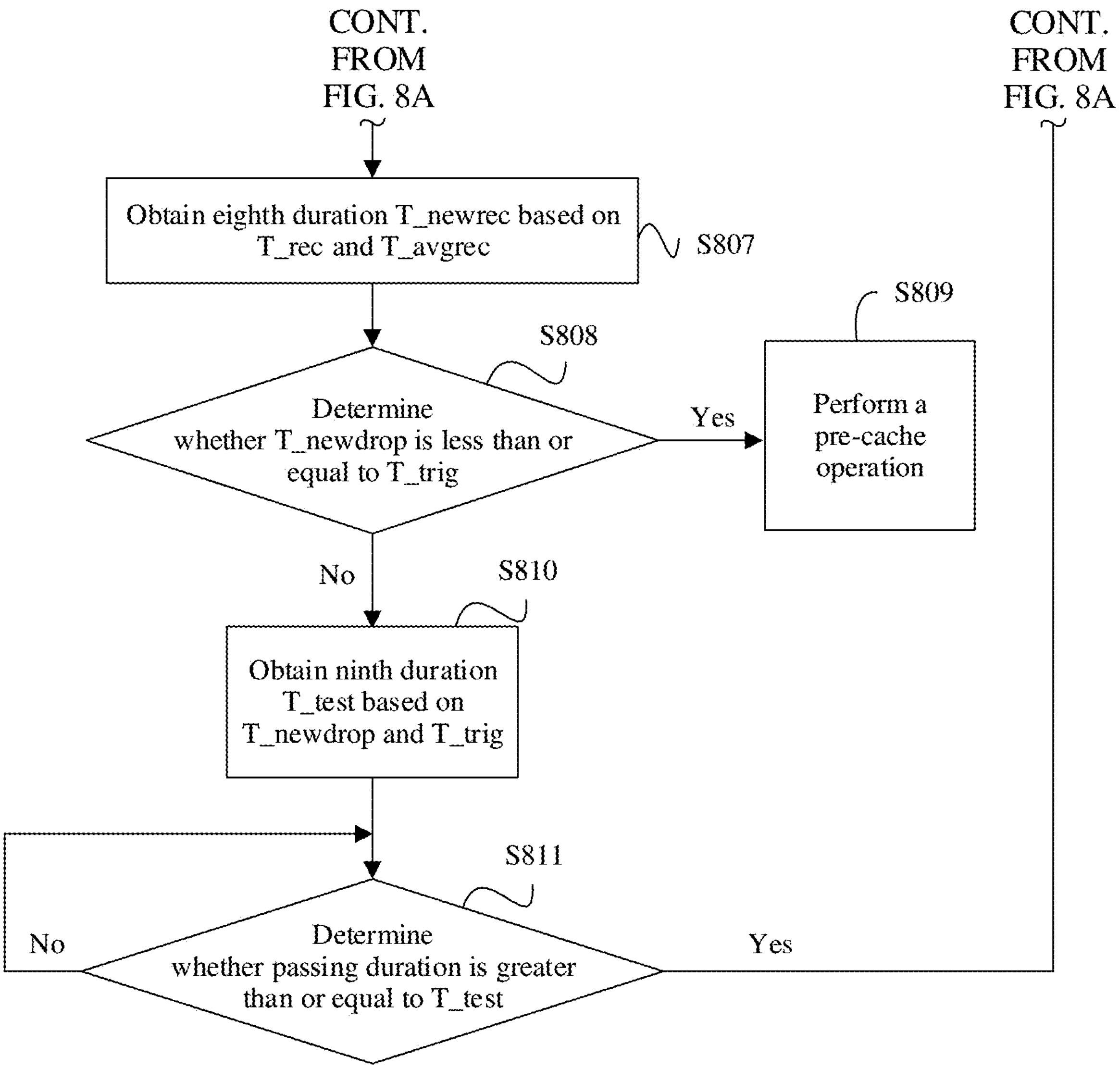

FIG. 8A and FIG. 8B are a schematic flowchart of a prediction process according to an embodiment of this application. Descriptions are provided by using an example in which longitude and latitude information and speed information can be obtained in a passing area in FIG. 8A and FIG. 8B. The prediction process may include but is not limited to the following steps.

S801: An electronic device determines a target record, in an abnormal area database, that matches a passed cell.

Specifically, when the electronic device 100 determines that at least two cells have been passed through, the electronic device 100 may extract, from the abnormal area database, at least one record in which "count (quantity of times of passing through an abnormal area)" is greater than a preset threshold (for example, 3), and determine the target record from the at least one record. In the target record, "firstFenceCell (identity of a first fence cell)" and "secondFenceCell (identity of a second fence cell)" are identities of two consecutive cells that the electronic device 100 has passed through. When the target record exists, the electronic device boo determines that the electronic device 100 has passed through the fence cell in the target record, that is, scene information of the current route is scene information (for example, the route to the company in Table 2) in the target record.

In some embodiments, the electronic device 100 may also obtain scene information of a current route. If the scene information is "scene (scene information)" existing in the abnormal area database, and it is determined that the electronic device has passed through at least two cells, the electronic device may perform S801.

Figure 9:
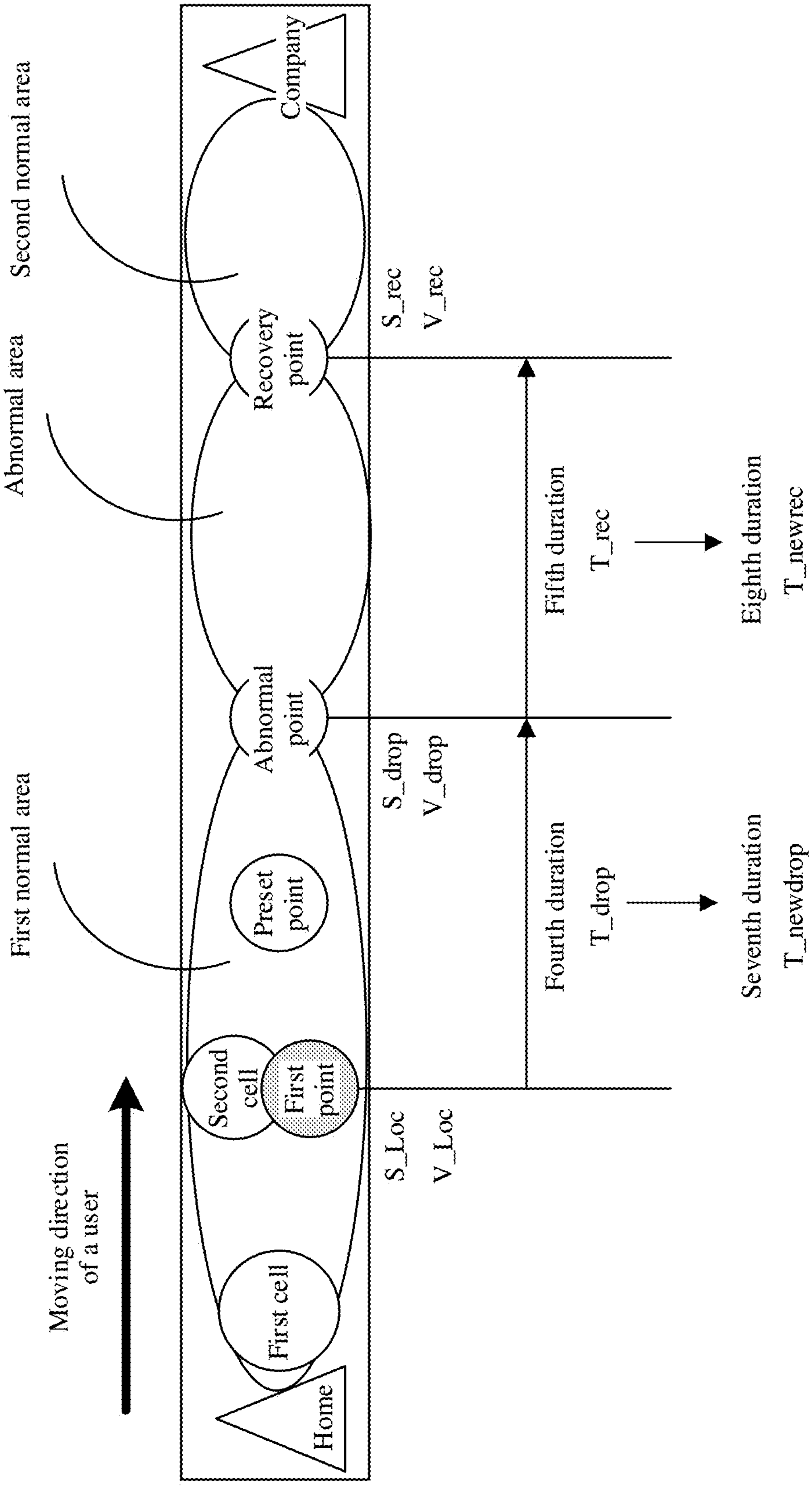
FIG. 9 to FIG. 11 are schematic diagrams of still some application scenarios according to an embodiment of this application.
Figure 10:
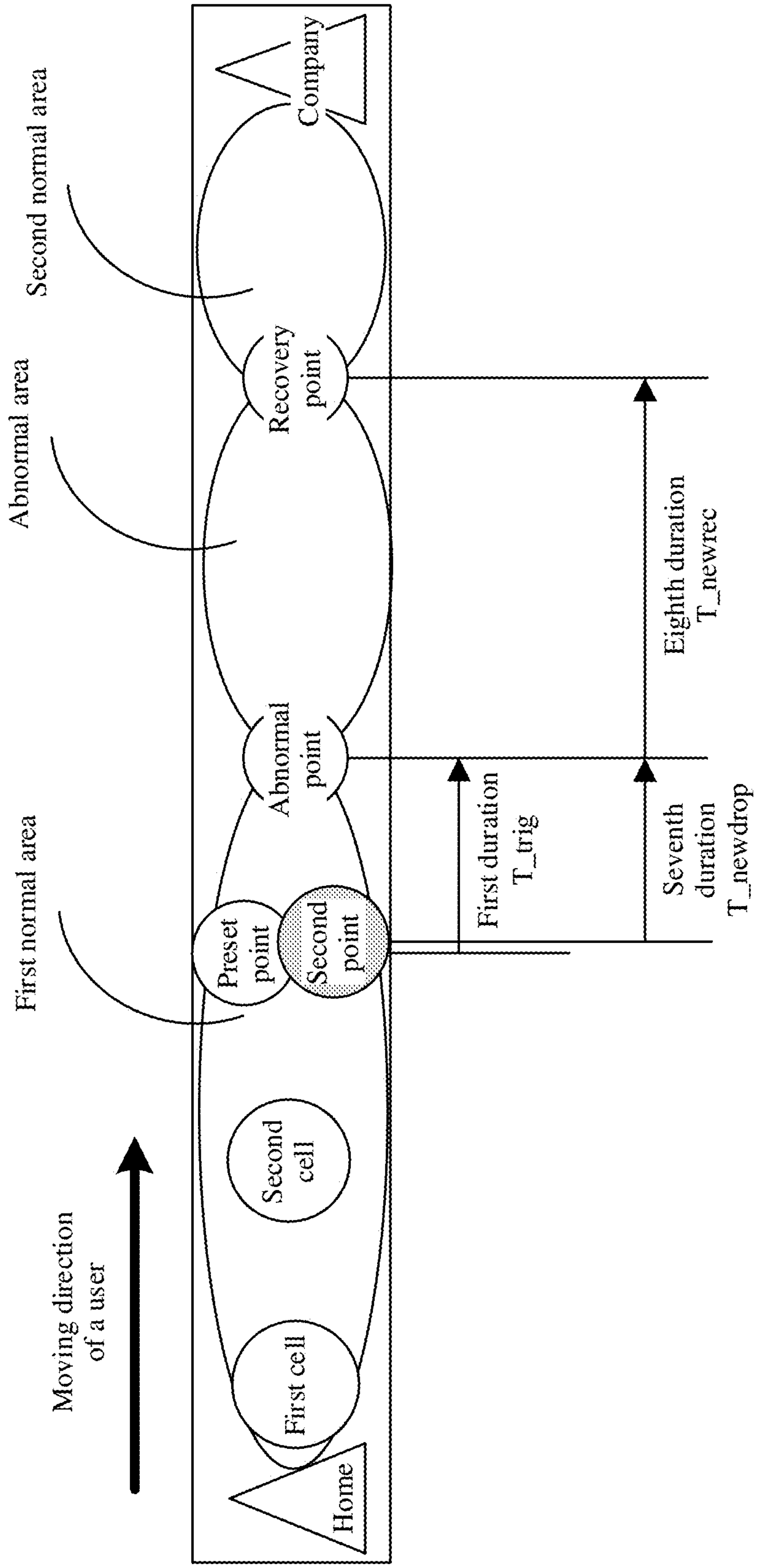
Figure 11:
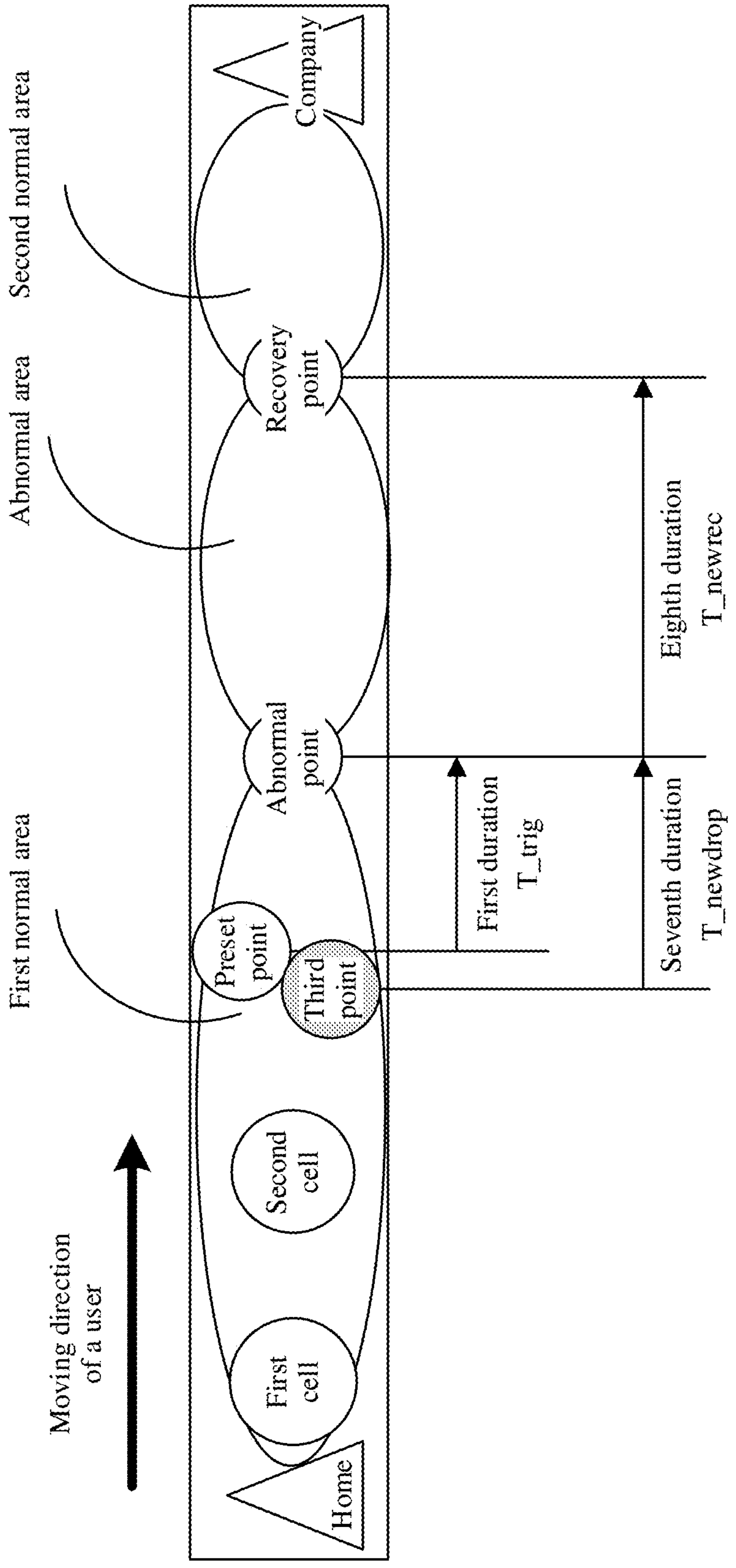

For example, FIG. 9 is a schematic diagram of still another application scenario in which a user passes through an abnormal area according to this embodiment of this application. The application scenario shown in FIG. 9 is similar to that in FIG. 1A to FIG. 1M and FIG. 6. For details, refer to descriptions in FIG. 1A to FIG. 1M and FIG. 6.

As shown in FIG. 9, in a process in which the user moves from home to a first point, the electronic device 100 passes through a first cell and a second cell. When the electronic device 100 reaches the second cell, the electronic device 100 may determine, from the abnormal area database, the target record in which "firstFenceCell" is an identity of the first cell and "secondFenceCell" is an identity of the second cell, namely, the target record in which the fence cells are the first cell and the second cell. Descriptions are provided below by using an example in which the record shown in Table 2 is the target record.

S802: The electronic device obtains location information about an abnormal point, location information about a recovery point, average duration T_avgfen from the second fence cell to the abnormal point, and average duration T_avgrec from the abnormal point to the recovery point in the target record.

Specifically, the electronic device obtains latitude and longitude information S_drop and speed information V_drop of the abnormal point and latitude and longitude information S_rec and speed information V_rec of the recovery point in the target record.

For example, if the target record is the record shown in Table 2, the obtained information is: weakLoc of the abnormal point, recoverLoc of the recovery point, the average duration avgTimeFenceToWeak (namely, T_avgfen in FIG. 6) from the second fence cell to the abnormal point, and the average duration avgTimeWeakToRecover (namely, T_avgrec in FIG. 6) from the abnormal point to the recovery point in Table 2. For duration required for the electronic device 100 to pass through the second cell, the abnormal point, and the recovery point in the target record, refer to the duration shown in FIG. 6.

S803: The electronic device obtains location information of a current location.

Specifically, when the user reaches the second cell (for example, the first point in the second cell shown in FIG. 9), the electronic device 100 obtains latitude and longitude information S_Loc and speed information V_Loc of the current location for the first time.

S804: The electronic device obtains fourth duration T_drop and fifth duration T_rec through calculation based on the target record and the location information of the current location.

Specifically, the fourth duration T_drop is duration that is from the current location to the abnormal point and obtained through calculation based on the target record, the longitude and latitude information about the current location, and the speed information; and the fifth duration T_rec is duration that is from the abnormal point to the recovery point and obtained through calculation based on the target record, the longitude and latitude information about the current location, and the speed information.

For example, as shown in FIG. 9, the fourth duration T_drop is duration that is from the first point to the abnormal point and that is obtained by the electronic device 100 through calculation. A calculation manner is as follows:

First, calculate a distance D_Loctodrop between the first point S_Loc and the abnormal point S_drop.

Then, calculate an average speed V_Loctodrop between the first point S_Loc and the abnormal point S_drop. An expression is as follows:

$$\text{V\_Loctodrop} = \frac{\text{V\_Loc} + \text{V\_drop}}{2}$$

Finally, obtain the fourth duration T_drop based on D_Loctodrop and V_Loctodrop. An expression is as follows:

$$\text{T\_drop} = \frac{\text{D\_Loctodrop}}{\text{V\_Loctodrop}}$$

The fifth duration T_rec is duration that is from the abnormal point to the recovery point and that is obtained by the electronic device 100 through calculation at the first point. A calculation manner is as follows:

First, calculate a distance D_droptorec between the abnormal point S_drop and the recovery point S_rec.

Then, calculate an average speed V_droptorec between the abnormal point S_drop and the recovery point S_rec. An expression is as follows:

$$V\_droptorec = \frac{V\_Loctodrop + (D\_droptorec \div T\_avgrec)}{2}$$

Finally, obtain the fifth duration T_rec based on D_droptorec and V_droptorec. An expression is as follows:

$$T\_rec = \frac{D\_droptorec}{V\_droptorec}$$

S805: The electronic device obtains sixth duration T_newfen based on the average duration T_avgfen from the second fence cell to the abnormal point in the target record.

Specifically, based on the target record, the sixth duration T_newfen from the current location to the abnormal point is obtained by subtracting the duration from the second cell to the current location from the average duration T_avgfen from the second cell to the abnormal point. For example, as shown in FIG. 9, if the current location is the first point in the second cell, that is, the duration from the second cell to the current location is 0, T_newfen=T_avgfen−0=T_avgfen.

S806: The electronic device obtains seventh duration T_newdrop based on the fourth duration T_drop and the sixth duration T_newfen.

Specifically, T_newdrop is duration that is from the current location to the abnormal point and obtained by the electronic device 100 through prediction at the first point. An example of an expression of T_newdrop is as follows:

$$T\_newdrop = c \times T\_drop + (1-c) \times T\_newfen$$

A value range of c is [0,1]. For example, c=0, c=0.6, or c=1.

S807: The electronic device obtains eighth duration T_newrec based on the fifth duration T_rec and the third duration T_avgrec.

Specifically, T_newrec is duration that is from the abnormal point to the recovery point and that is obtained by the electronic device 100 through prediction at the first point. An example of an expression of T_newrec is as follows:

$$T\_newrec = d \times T\_rec + (1-d) \times T\_avgrec$$

A value range of d is [0,1]. For example, d=0, d=0.6, or d=1. c and d may be the same or may be different.

For example, as shown in FIG. 9, when the electronic device 100 is at the first point, the duration, to the abnormal point, obtained through prediction is the seventh duration T_newdrop obtained based on the fourth duration T_drop obtained through calculation with reference to a real-time location and the sixth duration T_newfen obtained based on the target record. When the electronic device 100 is at the first point, the duration, from the abnormal point to the recovery point, obtained through prediction, is the eighth duration T_newrec obtained based on the fifth duration T_rec obtained through calculation with reference to a real-time location and the third duration T_avgrec based on the target record.

S808: The electronic device determines whether the seventh duration T_newdrop is less than or equal to first duration T_trig.

S809: The electronic device performs a pre-cache operation.

Specifically, the electronic device 100 determines whether T_newdrop≤T_trig is met. When the condition is met, the electronic device 100 determines that the electronic device at the current location (for example, the current location is the second point shown in FIG. 10) has passed a preset point, and the electronic device 100 performs the pre-cache operation on a target application based on first indication information (that is, performs S809). Otherwise, the electronic device 100 performs S810.

Specifically, that the electronic device performs the pre-cache operation based on the first indication information is that the target application receives the first indication information sent by a control component, and caches data of the target application based on a second cache policy. For descriptions of the first indication information, the second cache policy, and the pre-cache operation, refer to descriptions of the first indication information and the pre-cache operation in FIG. 1A to FIG. 1M, FIG. 3, and FIG. 5. Details are not described again.

It may be understood that a plurality of cases of the preset point are described in FIG. 6. For example, the preset point may be any point in the second cell, and preset duration is equal to the seventh duration T_newdrop obtained for the first time. In this case, the electronic device may directly perform S809, and does not need to perform S808 and S810.

In some embodiments, each time S803 is performed, the quantity Cnt of location obtaining times may be increased by 1. Specifically, an initial value of the quantity Cnt of location obtaining times is 0. When the user reaches the second cell, the electronic device 100 obtains latitude and longitude information S_Loc and speed information V_Loc of the current location for the first time. In this case, the quantity Cnt of location obtaining times is Cnt=Cnt+1=0+1=1.

On this basis, S808 may specifically include: The electronic device 100 determines whether (the quantity of location obtaining times) Cnt≥C_max (a first threshold) (for example, 5) is met and (T_newdrop−T_trig)>a second threshold Th (for example, 5 seconds). When the condition is met, the electronic device 100 considers that this prediction process is inaccurate and stops prediction. Otherwise, the electronic device 100 continues to perform the following operation: determining whether T_newdrop≤T_trig is met; and when the condition is met, the electronic device 100 performs the pre-cache operation on the target application based on the first indication information (that is, performs S809). Otherwise, the electronic device 100 performs S810. Alternatively, the electronic device 100 determines whether Cnt≤C_max and (T_newdrop−T_trig)≤Th are met. When the conditions are met, the electronic device 100 determines that although the electronic device at the current location does not pass through the preset point, the current location (for example, the third point shown in FIG. 11) is very close to the preset point, and the electronic device 100 performs the pre-cache operation on the target application based on the first indication information (that is, performs S809). Otherwise, the electronic device 100 performs S810.

In this embodiment of this application, a limitation on the quantity of location obtaining times may be increased in the prediction process. This avoids unnecessary power consumption and overheads of the electronic device as much as possible while ensuring accuracy of the first indication information, and improves a battery life capability.

S810: The electronic device obtains ninth duration T_test based on the seventh duration T_newdrop and the first duration T_trig.

Specifically, the ninth duration T_test is duration from a current moment to time when S803 is performed next time. For example, the electronic device 100 may calculate T_test by using a dichotomy, and an expression of T_test is as follows:

$$T\_test = \frac{T\_newdrop - T\_trig}{2}$$

S811: The electronic device determines whether passing duration is greater than or equal to the ninth duration T_test.

Specifically, when the electronic device 100 determines that the passing duration is greater than or equal to T_test, that is, a moment for obtaining location information about the current location next time arrives, the electronic device 100 performs S803. Otherwise, the electronic device 100 continues to wait. For example, as shown in FIG. 9, a moment at which the user at the first point is a first moment, and a moment at which the user performs S803 next time is a moment at which the duration T_test passes from the first moment, that is, a sum of the first moment and T_test.

It should be noted that a sequence of S801 and S802 and S803 is not limited, or S801 and S802 and S803 may be simultaneously performed. A sequence of S804 to S806 and S807 is not limited, or S804 to S806 and S80 may be simultaneously performed. A sequence of S804 and S805 is not limited, or S804 and S805 may be simultaneously performed.

In the method shown in FIG. 8A and FIG. 8B, the electronic device can perform the prediction process based on a historical record in the abnormal area database and cell information and location information obtained in real time, and obtain the first indication information and a moment for sending the first indication information. This increases accuracy of determining whether the abnormal area exists, tries to avoid a case in which data is cached based on the second cache policy when no abnormal area exists or no abnormal area is detected when the abnormal area exists, and improves user experience.

If the first indication information includes the time of entering the abnormal area and the duration of the abnormal area, and the pre-cache operation performed by the target application may be determined based on the first indication information, for example, playing duration of the data downloaded through the pre-cache operation is the duration of the abnormal area, when real-time location information of the electronic device changes, for example, when a moving speed is fast or slow, different first indication information is obtained. Therefore, pre-cache operations determined based on the first indication information may also be different. Therefore, the pre-cache operation can be dynamically adjusted in different application scenarios, so as to ensure that the user can normally use the target application when passing through the abnormal area in the different application scenarios. This avoids service freezing and improves user experience.

Figure 12:
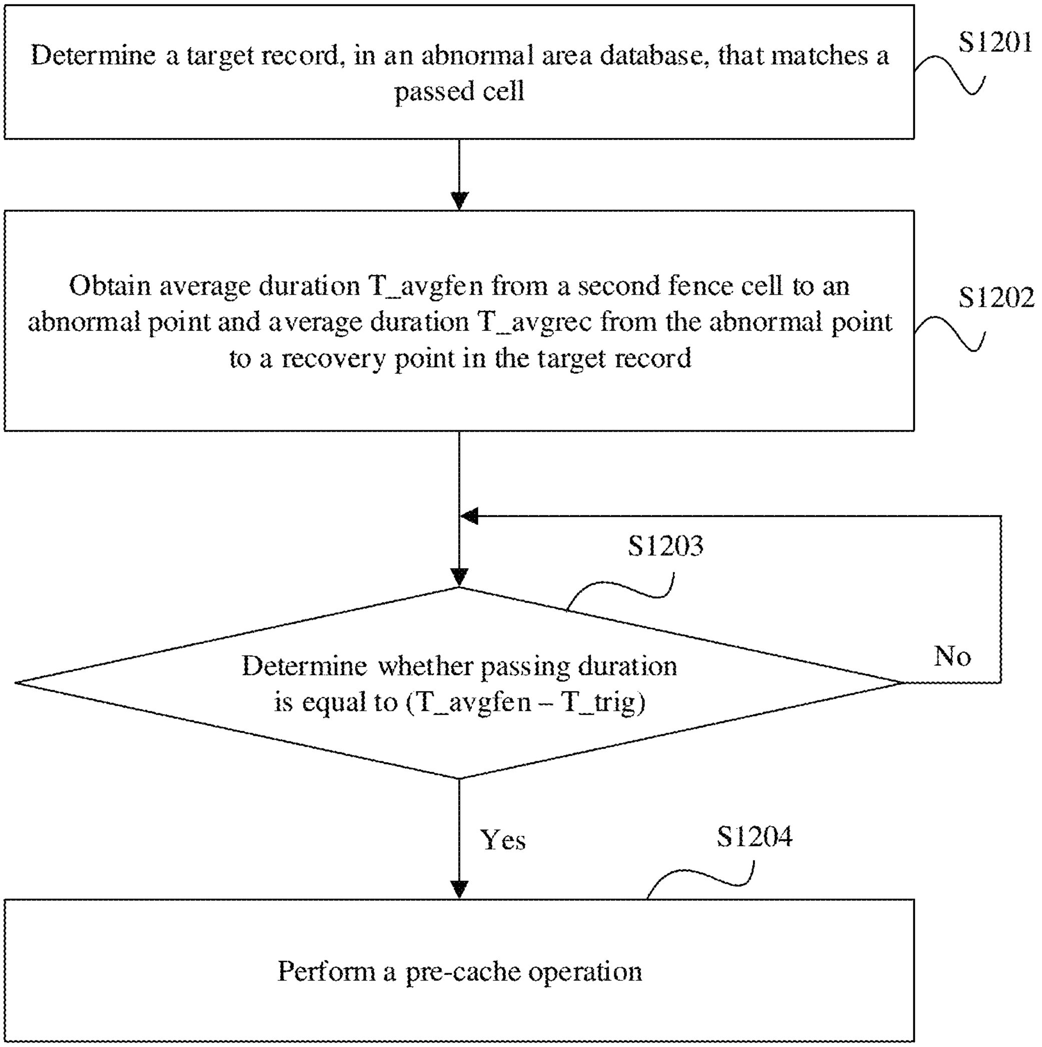
FIG. 12 is a schematic flowchart of another prediction process according to an embodiment of this application.

FIG. 12 is a schematic flowchart of another prediction process according to an embodiment of this application. Descriptions are provided by using an example in which longitude and latitude information and speed information cannot be obtained in a passing area in FIG. 12. The prediction process may include but is not limited to the following steps.

S1201: An electronic device determines a target record, in an abnormal area database, that matches a passed cell.

Specifically, S1201 is similar to S801 in FIG. 8A, and details are not described again.

S1202: The electronic device obtains average duration T_avgfen from a second fence cell to an abnormal point and average duration T_avgrec from the abnormal point to a recovery point in the target record.

For example, if the target record is the record shown in Table 2, the obtained information is: the average duration avgTimeFenceToWeak (namely, T_avgfen in FIG. 6) from the second fence cell to the abnormal point, and the average duration avgTimeWeakToRecover (namely, T_avgrec in FIG. 6) from the abnormal point to the recovery point. For duration required for the electronic device 100 to pass through the second cell, the abnormal point, and the recovery point in the target record, refer to the duration shown in FIG. 6.

S1203: The electronic device determines whether passing duration is equal to (T_avgfen−T_trig).

S1204: The electronic device performs a pre-cache operation.

Specifically, when the electronic device 100 determines that the passing duration is less than (T_avgfen−T_trig), that is, the electronic device 100 does not reach a preset point, the electronic device 100 continues to wait. For example, when the user is at the first point in the second cell shown in FIG. 9, the electronic device 100 performs S1202 and S1203. In this case, the passing duration is equal to 0. In FIG. 9, because the preset point is closer to the abnormal point than the second cell to the abnormal point, the duration T_trig from the preset point to the abnormal point is less than T_avgfen in the target record, namely, (T_avgfen−T_trig)>0. Therefore, if the duration is less than (T_avgfen−T_trig), the electronic device 100 continues to wait.

Specifically, that the electronic device performs the pre-cache operation based on first indication information is that the target application receives the first indication information sent by a control component, and caches data of the target application based on a second cache policy. For descriptions of the first indication information, the second cache policy, and the pre-cache operation, refer to descriptions of the first indication information and the pre-cache operation in FIG. 1A to FIG. 1M, FIG. 3, and FIG. 5. Details are not described again.

When the electronic device 100 determines that the passing duration is equal to (T_avgfen−T_trig), that is, when the electronic device 10 has reached the preset point (for example, the third point shown in FIG. 11), the electronic device 100 performs the pre-cache operation on the target application based on the first indication information (that is, performs S1204). Optionally, the first indication information includes the duration T_trig from the current location (namely, the preset point) to the abnormal point, and the duration T_avgrec from the abnormal point to the recovery point.

It may be understood that a plurality of cases of the preset point are described in FIG. 6. For example, the preset point may be any point in the second cell, and the first duration T_trig is equal to T_avgfen. In this case, the electronic device may directly perform S1204, and does not need to perform S1203.

In the method shown in FIG. 12, for the area in which the location information cannot be obtained, the electronic device can perform the prediction process based on a historical record in the abnormal area database and cell information obtained in real time, and obtain the first indication information. In addition, the pre-cache operation can be performed on the target application based on the first indication information, so that the target application can be normally used as much as possible when the abnormal area is passed through. This avoids service freezing and improves user experience.

The prediction processes shown in FIG. 8A and FIG. 8B and FIG. 12 are not limited. In specific implementation, the electronic device can obtain only current location information of the electronic device, determine, in the abnormal area database, whether an abnormal area record corresponding to the current location information exists, and generate the first indication information if the abnormal area record exists, and sends the first indication information. Alternatively, the electronic device can obtain both location information of the electronic device and current location information of the electronic device, determine, in the abnormal area database, whether an abnormal area record corresponding to the current cell information and the current location information exists, generate the first indication information if the abnormal area record exists, and send the first indication information. This is not limited in this embodiment of this application.

It may be understood that when passing through any route, the electronic device 100 may perform the learning process shown in FIG. 7 and/or the prediction process shown in FIG. 8A and FIG. 8B or FIG. 12.

Based on some embodiments shown in FIG. 1A to FIG. 1M and FIG. 2 to FIG. 12, the following describes a data caching method provided in this application.

Figure 13:
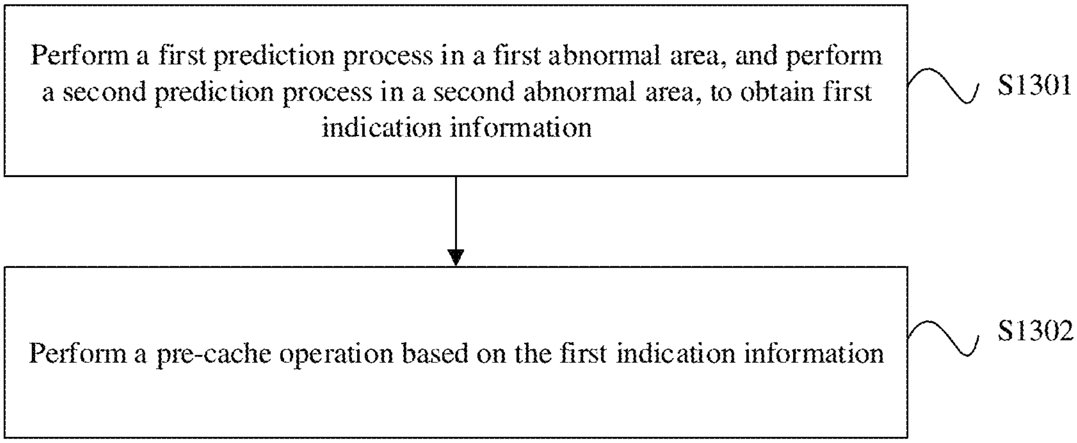
FIG. 13 is a schematic flowchart of another data caching method according to an embodiment of this application.

FIG. 13 shows the data caching method according to an embodiment of this application. The method may be applied to the electronic device 100 shown in FIG. 2 and the processor 110 in the electronic device 100. The method may also be applied to the electronic device 100 shown in FIG. 3. The method may also be applied to the software system shown in FIG. 4, for example, an Android system or an HMS system of the electronic device 100. The method may include but is not limited to the following steps.

S1301: An electronic device performs a first prediction process in a first abnormal area, and performs a second prediction process in a second abnormal area, to obtain first indication information.

Specifically, the first abnormal area is an area in which the electronic device can obtain location information. The electronic device may perform the first prediction process based on an abnormal area database, network information obtained in real time, and the location information, to obtain the first indication information. For specific implementation of the first prediction process, refer to embodiments shown in FIG. 8A and FIG. 8B to FIG. 1*i*. The second abnormal area is an area in which the electronic device cannot obtain location information. The electronic device may perform the second prediction process based on a database record of an abnormal area and network information obtained in real time, to obtain the first indication information. For specific implementation of the second prediction process, refer to the embodiment shown in FIG. 12.

In some embodiments, before S1301, the method may further include: Monitor information. Specifically, the monitored information may include but is not limited to: Location information such as longitude and latitude information, speed information, and direction information of the electronic device, cell information such as a cell id of a serving cell, a cell id of a neighboring cell, and a signal quality parameter of a current cell and/or a signal quality parameter of a neighboring cell of the electronic device, a network or service abnormal notification message such as RSRP and RSRQ being less than a preset threshold, or QoE being lower than a first QoE level.

In some embodiments, before S1301, the method may further include: Perform a learning process. Specifically, the electronic device may identify and collect statistics on the abnormal area based on the monitored information, to generate the abnormal area database. In some other embodiments, the abnormal area database may also be obtained by a cloud server by performing a learning process based on the monitored information sent by at least one electronic device. For detailed description of the learning process, refer to embodiments shown in FIG. 6 and FIG. 7. Details are not described again.

S1302: The electronic device performs a pre-cache operation based on the first indication information.

Specifically, that the electronic device performs the pre-cache operation based on the first indication information is that the target application receives the first indication information sent by a control component, and caches data of the target application based on a second cache policy. For details, refer to the foregoing descriptions of the pre-cache operation and the second cache policy in FIG. 1A to FIG. 1M, FIG. 3, and FIG. 5. Details are not described again.

Specifically, the first indication information may include a type, and optionally, may further include first time information $t_1$, and optionally, may further include second time information $t_2$, and optionally, may further include third time information $t_3$. If the type is a first value, it indicates that the abnormal area exists. If the type is a second value, it indicates that a previously sent broadcast message is invalid. $t_1$ may be a moment of entering the abnormal area, or may be duration from the current location to entering the abnormal area. $t_2$ may be a moment of leaving the abnormal area, or may be duration from the current location to leaving the abnormal area. $t_3$ may be duration from entering the abnormal area to leaving the abnormal area, namely, duration of the abnormal area. In the first prediction process shown in FIG. 8A and FIG. 8B to FIG. 11, the first time $t_1$ is the seventh duration T_newdrop, the second time $t_2$ is the eighth duration T_newrec, and the third time $t_3$ is a difference between the two. In the second prediction process shown in FIG. 12, the first time $t_1$ is the first duration T_trig, the second time $t_2$ is the third duration T_avgrec, and the third time $t_3$ is a difference between the two.

Specifically, the pre-cache operation may be performed on the target application. The target application is an online application having a cache mechanism, for example, an audio application, a video application, a learning application, or a reading application. Optionally, the target application is an application that registers a service abnormality prediction notification event during installation or running. For details, refer to descriptions of the target application in FIG. 1A to FIG. 1M and FIG. 2 to FIG. 5.

In the method shown in FIG. 13, the electronic device can perform different prediction processes in the area in which the location information can be obtained and the area in which the location information cannot be obtained. Therefore, the method can be well applicable to different application scenarios, and can improve accuracy of the first indication information as much as possible. The electronic device can perform the pre-cache operation based on the first indication information, so as to ensure that the electronic device can be normally used when passing through the abnormal area. This avoids service freezing, and improves user experience.

In addition, the abnormal area database used by the electronic device to perform the prediction process is obtained by the electronic device or the cloud server by learning historical monitored information. This ensures authenticity and reliability of data used in the prediction process, and further improves accuracy of the first indication information.

All or some of the foregoing embodiments may be implemented by using software, hardware, firmware, or any combination thereof. When software is used to implement the foregoing embodiments, all or some of embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk)), or the like.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

It is clearly that, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method, applied to an electronic device comprising a target application and a control component, the method comprising:

running, by the electronic device, the target application, and caching data of the target application based on a first cache policy, wherein the first cache policy comprises at least one of the following: downloading the data of the target application at a first download rate; downloading the data of the target application at a first bit rate; downloading the data of the target application at a first resolution; downloading the data of the target application at a first frame rate; requesting the data of the target application by using a first quantity of request times, wherein the first quantity of request times is a quantity of request times in a preset unit of time; caching first type data and second type data, wherein the first type is different from the second type; downloading the data of the target application at a first sampling frequency; downloading the data of the target application by using a first quantity of sampling bits; or downloading the data of the target application by using a first quantity of sound channels;

sending, by the target application when detecting that the target application is switched from background running to foreground running or is started, a registration message to the control component to obtain first indication information, the registration message containing registration information that identifies the target application and registers a first notification event;

receiving, by the target application, the first indication information sent by the control component; and caching data of the target application based on a second cache policy after the target application receives the first indication information, wherein the second cache policy comprises at least caching the first type data and skipping caching the second type data, wherein the control component comprises a service abnormality predictor and a transceiver, and wherein the first indication information indicates that an abnormal area exists in a forward direction of the electronic device, a first location exists between the abnormal area and a current location, no cell other than a current cell exists between the current location and the first location, and the abnormal area is an area whose distance from the current location is within a first distance range.

2. The method according to claim 1, wherein the abnormal area is at least one of the following areas: an area whose signal quality is lower than a preset threshold; a network-disconnected area; a standard falling area, wherein the standard falling is changing from a first network standard to a second network standard lower than the first network standard; or an area whose quality of experience (QoE) is lower than a first QoE level.

3. The method according to claim 2, wherein the first location is a location at which the control component sends the first indication information.

4. The method according to claim 2, further comprising:

sending, by the control component, the first indication information to the target application when a duration in which the electronic device enters the abnormal area from a current location falls within a first preset time range.

5. The method according to claim 2, further comprising:

obtaining current cell information of the electronic device; determining, using a data file of the abnormal area, whether an abnormal area record corresponding to the current cell information exists; and when the abnormal area exists, generating, by the control component, the first indication information; or obtaining current location information of the electronic device; determining, using a data file of the abnormal area, whether an abnormal area record corresponding to the current location information exists; and when the abnormal area exists, generating, by the control component, the first indication information; or obtaining the current cell information and the current location information of the electronic device; determining, using a data file of the abnormal area, whether an abnormal area record corresponding to the current cell information and the current location information exists; and when the abnormal area exists, generating, by the control component, the first indication information.

6. The method according to claim 2, further comprising:

obtaining current cell information and current location information of the electronic device;

determining whether an abnormal area record corresponding to the current cell information exists in a data file of the abnormal area; and generating, by the control component, the first indication information when the abnormal area record exists, wherein the current location information is used to determine a sending time for sending the first indication information.

7. The method according to claim 1, wherein after caching the data of the target application based on the second cache policy after the target application receives the first indication information, the method further comprises:

when the electronic device is in an abnormal area, using at least one of the following manners: downloading the data of the target application at a third download rate, wherein the third download rate is less than the first download rate; downloading the data of the target application at a third bit rate, wherein the third bit rate is less than or equal to a second bit rate; downloading the data of the target application at a third resolution, wherein the third resolution is less than or equal to a second resolution; downloading the data of the target application at a third frame rate, wherein the third frame rate is less than or equal to a second frame rate; or requesting the data of the target application by using a third quantity of request times, wherein the third quantity of request times is a quantity of request times in the preset unit of time, and the third quantity of request times is less than or equal to the first quantity of request times; and caching the data of the target application based on the first cache policy after leaving the abnormal area.

8. The method according to claim 1, wherein caching the data of the target application based on the first cache policy comprises:

stopping caching the data of the target application when a playing duration of an amount of the data of the target application that is cached based on the first cache policy is greater than a first preset duration; and wherein caching the data of the target application based on a second cache policy comprises:

continuing caching the data of the target application when a playing duration of an amount of the data of the target application that is cached based on the second cache policy is greater than the first preset duration.

9. The method according to claim 1, wherein caching the data of the target application based on the second cache policy after the target application receives the first indication information comprises:

caching the data of the target application based on the second cache policy in response to receiving the first indication information; or starting, within a second preset duration in which the first indication information is received, the caching of the data of the target application based on the second cache policy, wherein the second preset duration is less than 1 second.

10. The method according to claim 1, wherein:

the first indication information further comprises first time information, and the first time information indicates a time of entering an abnormal area; or the first indication information further comprises second time information, and the second time information indicates a time of leaving the abnormal area; or the first indication information further comprises third time information, and the third time information indicates a duration of the abnormal area.

11. The method according to claim 1, wherein:

the target application is a video application, and the second cache policy comprises at least one of the following: downloading the data of the target application at a second download rate, downloading the data of the target application at a second bit rate, downloading the data of the target application at a second resolution, downloading the data of the target application at a second frame rate, or requesting the data of the target application by using a second quantity of request times; or the target application is an audio application, and the second cache policy comprises at least one of the following: downloading the data of the target application at a second download rate, requesting the data of the target application by using the second quantity of request times, downloading the data of the target application at a second sampling frequency, downloading the data of the target application by using the second quantity of sampling bits, or downloading the data of the target application by using the second quantity of sound channels.

12. An electronic device, comprising a transceiver, at least one processor, and a memory, wherein the memory is configured to store a computer program, and the at least one processor is configured to invoke the computer program, and the computer program comprises instructions for:

running a target application, and caching data of the target application based on a first cache policy, wherein the first cache policy comprises at least one of the following: downloading the data of the target application at a first download rate; downloading the data of the target application at a first bit rate; downloading the data of the target application at a first resolution; downloading the data of the target application at a first frame rate; requesting the data of the target application by using a first quantity of request times, wherein the first quantity of request times is a quantity of request times in a preset unit of time; caching first type data and second type data, wherein the first type is different from the second type; downloading the data of the target application at a first sampling frequency; downloading the data of the target application by using a first quantity of sampling bits; or downloading the data of the target application by using a first quantity of sound channels;

sending, by the target application when detecting that the target application is switched from background running to foreground running or is started, a registration message to a control component to obtain first indication information, the registration message containing registration information that identifies the target application and registers a first notification event;

receiving, by the target application, first indication information sent by the control component; and caching data of the target application based on a second cache policy after the target application receives the first indication information, wherein the second cache policy comprises at least caching the first type data and skipping caching the second type data, wherein the control component comprises a service abnormality predictor and the transceiver, and wherein the first indication information indicates that an abnormal area exists in a forward direction of the electronic device, a first location exists between the abnormal area and a current location, no cell other than a current cell exists between the current location and the first location, and the abnormal area is an area whose distance from the current location is within a first distance range.

13. The electronic device according to claim 12, wherein the abnormal area is at least one of the following areas: an area whose signal quality is lower than a preset threshold; a network-disconnected area; a standard falling area, wherein the standard falling is changing from a first network standard to a second network standard lower than the first network standard; or an area whose quality of experience (QoE) is lower than a first QoE level.

14. The electronic device according to claim 13, wherein the first location is a location at which the first indication information is sent.

15. The electronic device according to claim 13, further comprising:

sending the first indication information to the target application when a duration in which the electronic device enters the abnormal area from a current location falls within a first preset time range.

16. The electronic device according to claim 13, further comprising:

obtaining current cell information of the electronic device;

determining, using a data file of the abnormal area, whether an abnormal area record corresponding to the current cell information exists; and when the abnormal area exists, generating the first indication information; or obtaining current location information of the electronic device;

determining, using a data file of the abnormal area, whether an abnormal area record corresponding to the current location information exists; and when the abnormal area exists, generating the first indication information; or obtaining the current cell information and the current location information of the electronic device;

determining, using a data file of the abnormal area, whether an abnormal area record corresponding to the current cell information and the current location information exists; and when the abnormal area exists, generating the first indication information.

17. The electronic device according to claim 13, further comprising:

obtaining current cell information and current location information of the electronic device;

determining whether an abnormal area record corresponding to the current cell information exists in a data file of the abnormal area; and generating the first indication information when the abnormal area record exists, wherein the current location information is used to determine a sending time for sending the first indication information.

18. The electronic device according to claim 12, wherein the computer program comprises instructions for, after caching the data of the target application based on the second cache policy after the target application receives the first indication information, performing:

when the electronic device is in an abnormal area, using at least one of the following manners: downloading the data of the target application at a third download rate, wherein the third download rate is less than the first download rate; downloading the data of the target application at a third bit rate, wherein the third bit rate is less than or equal to a second bit rate; downloading the data of the target application at a third resolution, wherein the third resolution is less than or equal to a second resolution; downloading the data of the target application at a third frame rate, wherein the third frame rate is less than or equal to a second frame rate; or requesting the data of the target application by using a third quantity of request times, wherein the third quantity of request times is a quantity of request times in the preset unit of time, and the third quantity of request times is less than or equal to the first quantity of request times; and caching the data of the target application based on the first cache policy after leaving the abnormal area.

19. The electronic device according to claim 12, wherein caching the data of the target application based on the first cache policy comprises:

stopping caching the data of the target application when a playing duration of an amount of the data of the target application that is cached based on the first cache policy is greater than a first preset duration; and wherein caching the data of the target application based on a second cache policy comprises:

continuing caching the data of the target application when a playing duration of an amount of the data of the target application that is cached based on the second cache policy is greater than the first preset duration.

20. The electronic device according to claim 12, wherein caching the data of the target application based on the second cache policy after the target application receives the first indication information comprises:

caching the data of the target application based on the second cache policy in response to receiving the first indication information; or starting, within a second preset duration in which the first indication information is received, the caching of the data of the target application based on the second cache policy, wherein the second preset duration is less than 1 second.

* * * * *